(12) United States Patent
Gao et al.

(10) Patent No.: US 11,762,178 B2
(45) Date of Patent: Sep. 19, 2023

(54) ZOOM LENS GROUP

(71) Applicant: ZHEJIANG SUNNY OPTICS CO.,LTD., Zhejiang (CN)

(72) Inventors: Yang Gao, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 353 days.

(21) Appl. No.: 17/134,217

(22) Filed: Dec. 25, 2020

(65) Prior Publication Data
US 2021/0325647 A1 Oct. 21, 2021

(30) Foreign Application Priority Data

Apr. 21, 2020 (CN) .......................... 202010316859.9

(51) Int. Cl.
| | |
|---|---|
| *G02B 15/177* | (2006.01) |
| *G02B 15/14* | (2006.01) |
| *G02B 13/00* | (2006.01) |
| *G02B 13/02* | (2006.01) |
| *G02B 13/06* | (2006.01) |

(52) U.S. Cl.
CPC ......... *G02B 15/177* (2013.01); *G02B 13/009* (2013.01); *G02B 13/0045* (2013.01); *G02B 13/02* (2013.01); *G02B 13/06* (2013.01); *G02B 15/1445* (2019.08)

(58) Field of Classification Search
CPC .......................... G02B 15/177; G02B 13/0045; G02B 13/009; G02B 13/02; G02B 13/06; G02B 15/1445; G02B 13/002; G02B 13/22; G02B 15/144
See application file for complete search history.

(56) References Cited

U.S. PATENT DOCUMENTS

| | | | |
|---|---|---|---|
| 2004/0156120 A1* | 8/2004 | Yoneyama | ..... G02B 15/145523 |
| | | | 359/680 |
| 2010/0149656 A1* | 6/2010 | Katakura | ....... G02B 15/144507 |
| | | | 359/686 |

FOREIGN PATENT DOCUMENTS

| | | | |
|---|---|---|---|
| JP | 3352227 B2 | * | 12/2002 |
| JP | 2007241184 A | * | 9/2007 |
| JP | 2018189766 A | * | 11/2018 |

* cited by examiner

*Primary Examiner* — Pinping Sun
*Assistant Examiner* — Jhein L Siclon
(74) *Attorney, Agent, or Firm* — Gang Yu

(57) ABSTRACT

The disclosure provides a zoom lens group, which sequentially includes, from an object side to an image side along an optical axis: a first lens group with negative refractive power, including a first lens and a second lens, wherein the first lens has negative refractive power, and an object-side surface thereof is a concave surface; a second lens group with positive refractive power; a third lens group with positive refractive power; and a fourth lens group with negative refractive power. A spacing distance of the first lens group and the second lens group on an optical axis, a spacing distance of the second lens group and the third lens group on the optical axis and a spacing distance of the third lens group and the fourth lens group on the optical axis are changed to switch the zoom lens group from a telephoto state to a wide-angle state.

10 Claims, 52 Drawing Sheets

Lateral color curve

ZOOM LENS GROUP

CROSS-REFERENCE TO RELATED APPLICATIONS

The disclosure claims priority to Chinese Patent Application No. 202010316859.9 filed to the National Intellectual. Property Administration, PRC (CNIPA) on Apr. 21, 2020, the disclosure of which is hereby incorporated by reference in its entirety.

TECHNICAL FIELD

The disclosure relates to the field of optical elements, and particularly to a zoom lens group.

BACKGROUND

With the development of photographing technologies and the rise of the Internet industry, requirements of users on photographing levels and photographing quality of mobile devices such as smart phones and video cameras have increased. At present, a general method adopted by lens producers in this field to optimize the imaging quality of lenses is to combine and match a super-definition main camera and ultra-wide-angle and telephoto lenses. However, for such combined and matched lenses on the present market, different lenses are required to be switched to complete zooming when different scenes are shot. For example, zooming of present rear cameras is mostly "baton" type zooming, namely untruly optically "continuous" zooming is implemented by switching of an ultra-wide-angle lens, a main camera and a telephoto lens. In addition, mounting multiple lenses in a mobile device may not only occupy a large inner space of the mobile device but also bring many problems such as high cost, large size and great increase of the weight.

How to reasonably distribute refractive power of a zoom lens group and optimize an optical parameter to achieve a purpose of truly optically "continuous" zooming of a single zoom lens group and meet requirements of the zoom lens group on machinability and miniaturization is one of many key issues urgent to be solved by optical lens designers.

SUMMARY

Some embodiments of the disclosure provides a zoom lens group, which sequentially includes, from an object side to an image side along an optical axis: a first lens group with negative refractive power, including a first lens and a second lens, wherein the first lens may have negative refractive power, and an object-side surface thereof may be a concave surface; a second lens group with positive refractive power, including a third lens and a fourth lens; a third lens group with positive refractive power, including a fifth lens and a sixth lens, wherein the fifth lens and the sixth lens are cemented to form a cemented lens; and a fourth lens group with negative refractive power, including a seventh lens. A spacing distance of the first lens group and the second lens group on the optical axis, a spacing distance of the second lens group and the third lens group on the optical axis and a spacing distance of the third lens group and the fourth lens group on the optical axis may be changed to switch the zoom lens group from a telephoto state to a wide-angle state.

In an implementation mode, the object-side surface of the first lens to an image-side surface of the seventh lens include at least one aspherical mirror surface.

In an implementation mode, an effective focal length F1 of the first lens group and an effective focal length F4 of the fourth lens group may meet $0.5<F1/F4<0.9$.

In an implementation mode, an effective focal length F2 of the second lens group and an effective focal length F3 of the third lens group may meet $0.5<F2/F3<1.0$.

In an implementation mode, a total effective focal length FT of the zoom lens group in the telephoto state and a total effective focal length FW of the zoom lens group in the wide-angle state may meet $1.9<FT/FW<3$.

In an implementation mode, the total effective focal length FT of the zoom lens group in the telephoto state, a total effective focal length FM of the zoom lens group in an intermediate state in a process of switching from the telephoto state to the wide-angle state, the total effective focal length FW of the zoom lens group in the wide-angle state and an effective focal length f11 of the first lens may meet $-1.3<(FT+FM+FW)/f11<-0.2$.

In an implementation mode, an effective focal length f31 of the fifth lens, an effective focal length f32 of the sixth lens, an effective focal length f21 of the third lens and an effective focal length f22 of the fourth lens may meet $0.6<(f31-f32)/(f21-f22)<1.0$.

In an implementation mode, a maximum field of view FOVT of the zoom lens group in the telephoto state may meet $10°<FOVT<15°$.

In an implementation mode, a curvature radius R7 of an object-side surface of the fourth lens and a curvature radius R8 of an image-side surface of the fourth lens may meet $0.3<(R7-R8)/(R7+R8)<0.5$.

In an implementation mode, a center thickness CT3 of the third lens on the optical axis, a center thickness CT4 of the fourth lens on the optical axis and a center thickness CT1 of the first lens on the optical axis may meet $0.4<(CT3+CT4)/CT1<0.6$.

In an implementation mode, the center thickness CT1 of the first lens on the optical axis and a spacing distance T12 of the first lens and the second lens on the optical axis may meet $9.0 \text{ mm}<CT1+T12<11.0 \text{ mm}$.

In an implementation mode, an effective focal length f12 of the second lens and a curvature radius R1 of the object-side surface of the first lens may meet $0.1<f12/R1<1.5$.

According to the disclosure, refractive power is reasonably distributed, and optical parameters are optimized, so that the provided zoom lens group may implement continuous zooming and is miniaturized, machinable and high in imaging quality.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
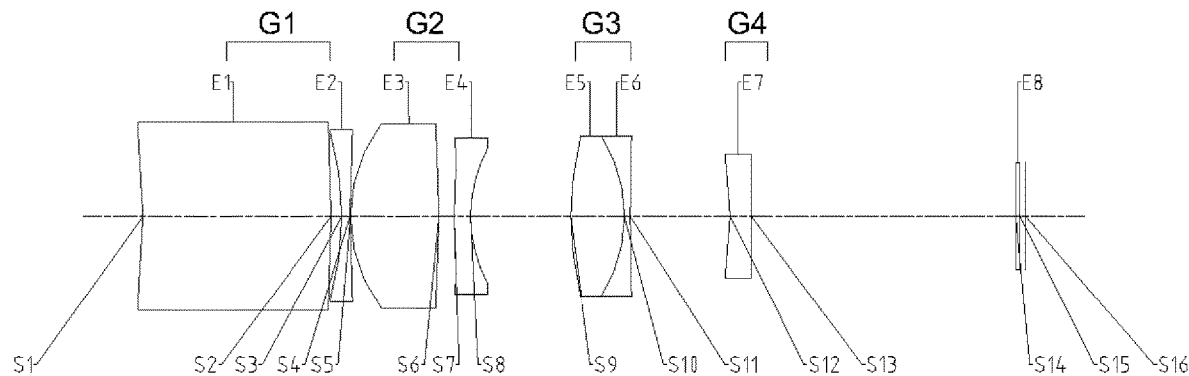
FIG. 1 shows a structure diagram of a zoom lens group in a telephoto state according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It is to be noted that, in the specification, expressions like first, second and third are adopted not to represent any limit to characteristics but only to distinguish one characteristic from another characteristic. Therefore, without departing from the teachings of the disclosure, a first lens discussed below may also be called a second lens or a third lens, and a first lens group may also be called a second lens group or a third lens group.

For convenient description, thicknesses, sizes and shapes of lenses are slightly magnified in the drawings. Specifically, spherical or aspherical shapes in the drawings are shown exemplarily. That is, spherical or aspherical shapes are not limited to the spherical or aspherical shapes shown in the drawings. The drawings are drawn only exemplarily but not strictly to scale.

In the disclosure, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, closest to a shot object, of each lens is called an object-side surface of the lens, and a surface, closest to an imaging surface, of each lens is called an image-side surface of the lens.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The characteristics, principles and other aspects of the disclosure will be described below in detail.

A zoom lens group according to an exemplary implementation mode of the disclosure may include four lens groups with refractive power, i.e., a first lens group, a second lens group, a third lens group and a fourth lens group respectively. A spacing distance of the first lens group and the second lens group on an optical axis, a spacing distance of the second lens group and the third lens group on the optical axis and a spacing distance of the third lens group and the fourth lens group on the optical axis may be changed to switch the zoom lens group from a telephoto state to a wide-angle state.

According to the exemplary implementation mode of the disclosure, the first lens group may have negative refractive power and include a first lens and a second lens. The first lens may have negative refractive power, and an object-side surface thereof may be a concave surface. The second lens group may have positive refractive power and include a third lens and a fourth lens. The third lens group may have positive refractive power and include a fifth lens and a sixth lens. The fifth lens and the sixth lens may be cemented to form a cemented lens. The fourth lens group may have negative refractive power and include a seventh lens. The four lens groups are sequentially arranged from an object side to an image side along the optical axis. The seven lenses are sequentially arranged from the object side to the image side along the optical axis.

A focal length of the whole zoom lens group may be regulated appropriately to achieve a continuous zooming characteristic of the zoom lens group. Apertures of the first lens and the second lens may be controlled to achieve the characteristic of small size of a system. A combination of positive and negative focal lengths of the third lens and the fourth lens may be controlled to optimize a system aberration. The fifth lens and the sixth lens may be controlled to form the cemented lens to achieve an effect of optimizing a color. The refractive power of each lens group and refractive power of each lens in each lens group may be reasonably distributed to control distances between the lens groups, so that spacing distances between adjacent lens groups of the four lens groups may be changed to realize a continuous zooming function when the whole system is switched from a telephoto state to a wide-angle state during work. A specific zooming process may be implemented in the following manner: refractive power of the system is reasonably distributed, and when the system is in the wide-angle state, a spacing of a zooming group formed by the first lens group and the second lens group is maximum and a spacing of a compensating group formed by the second lens group, the third lens group and the fourth lens group is minimum, so that purposes of minimum focal length and maximum field of view of the system are achieved; and when the system is switched from the wide-angle state to the telephoto state, the spacing of the zooming group formed by the first lens group and the second lens group is shortened and the spacing of the compensating group formed by the second lens group, the third lens group and the fourth lens group is prolonged. A ratio of a total effective focal length of the zoom lens group in the telephoto state to a total effective focal length of the zoom lens group in the wide-angle state may be continuously changed to complete a continuous zooming process of the zoom lens group. The first lens may be a prism and is configured to reflecting a light path to achieve a periscopic continuous zooming effect.

In the exemplary implementation mode, the zoom lens group according to the disclosure may meet $0.5<F1/F4<0.9$, wherein F1 is an effective focal length of the first lens group, and F4 is an effective focal length of the fourth lens group. When $0.5<F1/F4<0.9$ is met, contribution ranges of the refractive power of the first lens group and the fourth lens group may be reasonably controlled, and meanwhile, spherical aberration contribution rates of the first lens group and the fourth lens group may be reasonably controlled.

In the exemplary implementation mode, the zoom lens group according to the disclosure may meet $0.5<F2/F3<1.0$, wherein F2 is an effective focal length of the second lens group, and F3 is an effective focal length of the third lens group. More specifically, F2 and F3 may further meet $0.5<F2/F3<0.9$. When $0.5<F2/F3<1.0$ is met, aberration contributions of the two lens sets may be controlled, balancing of an aberration generated with a rear-end optical lens is facilitated, the system aberration is in a reasonable range, and achievement of high imaging quality of the optical imaging system is further facilitated.

In the exemplary implementation mode, the zoom lens group according to the disclosure may meet $1.9<FT/FW<3$, wherein FT is a total effective focal length of the zoom lens group in the telephoto state, and FW is a total effective focal length of the zoom lens group in the wide-angle state. When $1.9<FT/FW<3$ is met, implementation of the continuous zooming process of the optical imaging system is facilitated, and the optical imaging system has high imaging quality.

In the exemplary implementation mode, the zoom lens group according to the disclosure may meet $-1.3<(FT+FM+FW)/f11<-0.2$, wherein FT is the total effective focal length of the zoom lens group in the telephoto state, FM is a total effective focal length of the zoom lens group in an intermediate state in a process of switching from the telephoto state to the wide-angle state, FW is the total effective focal length of the zoom lens group in the wide-angle state, and f11 is an effective focal length of the first lens. When $-1.3<(FT+FM+FW)/f11<-0.2$ is met, the lens with negative refractive power in the first lens group is helped to balance with an aberration generated by a rear-end lens set with positive refractive power to further achieve high imaging quality and an effect of high resolving power.

In the exemplary implementation mode, the zoom lens group according to the disclosure may meet $0.6<(f31-f32)/(f21-f22)<1.0$, wherein f31 is an effective focal length of the fifth lens, f32 is an effective focal length of the sixth lens, f21 is an effective focal length of the third lens, and f22 is an effective focal length of the fourth lens. When $0.6<(f31-f32)/(f21-f22)<1.0$ is met, not only may high image quality of the optical system be ensured, but also high machinability of the system may be ensured.

In the exemplary implementation mode, the zoom lens group according to the disclosure may meet 10°<FOVT<15°, wherein FOVT is a maximum field of view of the zoom lens group in the telephoto state. More specifically, FOVT may further meet 10°<FOVT<12°. When 10°<FOVT<15° is met, achievement of a telephoto characteristic of a camera lens is facilitated.

In the exemplary implementation mode, the zoom lens group according to the disclosure may meet 0.3<(R7−R8)/(R7+R8)<0.5, wherein R7 is a curvature radius of an object-side surface of the fourth lens, and R8 is a curvature radius of an image-side surface of the fourth lens. When 0.3<(R7−R8)/(R7+R8)<0.5 is met, a shape of the fourth lens may be effectively restricted, and furthermore, aberration contribution rates of the object-side surface and image-side surface of the fourth lens may be effectively controlled to effectively balance an aperture band related aberration of the system and further effectively improve the imaging quality of the system.

In the exemplary implementation mode, the zoom lens group according to the disclosure may meet 0.4<(CT3+CT4)/CT1<0.6, wherein CT3 is a center thickness of the third lens on the optical axis, CT4 is a center thickness of the fourth lens on the optical axis, and CT1 is a center thickness of the first lens on the optical axis. When 0.4<(CT3+CT4)/CT1<0.6 is met, high machinability of the zoom lens group may be achieved.

In the exemplary implementation mode, the zoom lens group according to the disclosure may meet 9.0 mm<CT1+T12<11.0 mm, wherein CT1 is the center thickness of the first lens on the optical axis, and T12 is a spacing distance of the first lens and the second lens on the optical axis. More specifically, CT1 and T12 may further meet 10 mm<CT1+T12<11.0 mm. When 9.0 mm<CT1+T12<11.0 mm is met, high machinability of the zoom lens group may be achieved.

In the exemplary implementation mode, the zoom lens group according to the disclosure may meet 0.1<f12/R1<1.5, wherein f12 is an effective focal length of the second lens, and R1 is a curvature radius of the object-side surface of the first lens. When 0.1<f12/R1<1.5 is met, an aberration contribution rate of the object-side surface of the first lens may be effectively restricted to effectively balance the aperture band related aberration of the system and further effectively improve the imaging quality of the system.

In the exemplary implementation mode, the zoom lens group according to the disclosure may further include a diaphragm arranged between the first lens group and the second lens group. Optionally, the zoom lens group may further include an optical filter configured to correct a color and/or protective glass configured to protect a photosensitive element on the imaging surface.

The disclosure discloses a zoom lens group with characteristics of continuous zooming, miniaturization, high imaging quality and the like. The zoom lens group according to the implementation mode of the disclosure may adopt multiple lenses, for example, the abovementioned seven lenses. The refractive power of each lens, a surface type, a center thickness of each lens, on-axis distances between the lenses and the like may be reasonably configured to effectively converge incident light, reduce the optical total length of the imaging lens, improve the machinability of the imaging lens and ensure that the zoom lens group is more favorable for production and machining.

In the implementation mode of the disclosure, at least one of mirror surfaces of each lens is an aspherical mirror surface, namely at least one mirror surface in the object-side surface of the first lens to an image-side surface of the seventh lens is an aspherical mirror surface. An aspherical lens has a characteristic that a curvature keeps changing from a center of the lens to a periphery of the lens. Unlike a spherical lens with a constant curvature from a center of the lens to a periphery of the lens, the aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspherical mirror surface. Optionally, both the object-side surface and image-side surface of each lens in the first lens, the second lens, the third lens, the fourth lens, the fifth lens, the sixth lens and the seventh lens are aspherical mirror surfaces.

However, those skilled in the art should know that the number of the lenses forming the zoom lens group may be changed without departing from the technical solutions claimed in the disclosure to achieve each result and advantage described in the specification. For example, although descriptions are made in the implementation mode with seven lenses as an example, the zoom lens group is not limited to seven lenses. If necessary, the zoom lens group may further include another number of lenses.

Specific embodiments applied to the zoom lens group of the implementation mode will further be described below with reference to the drawings.

Embodiment 1

Figure 2:
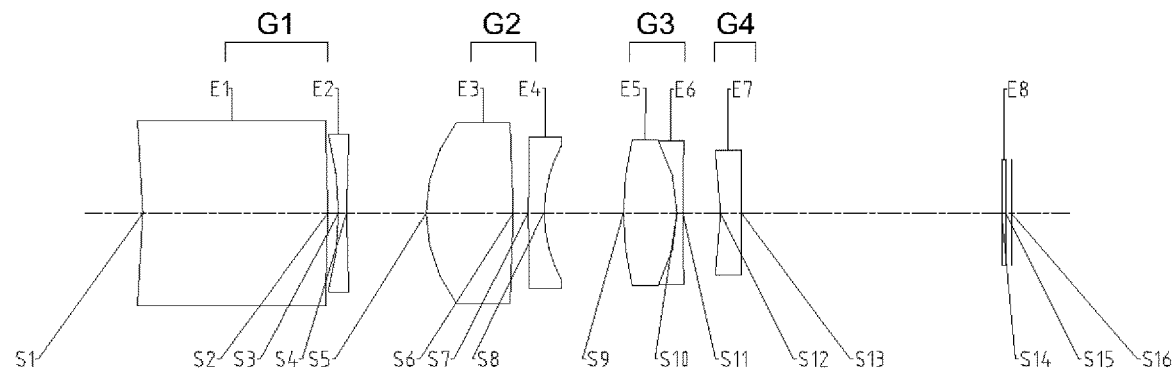
FIG. 2 shows a structure diagram of a zoom lens group in an intermediate state in a process of switching from a telephoto state to a wide-angle state according to embodiment 1 of the disclosure.
Figure 3:
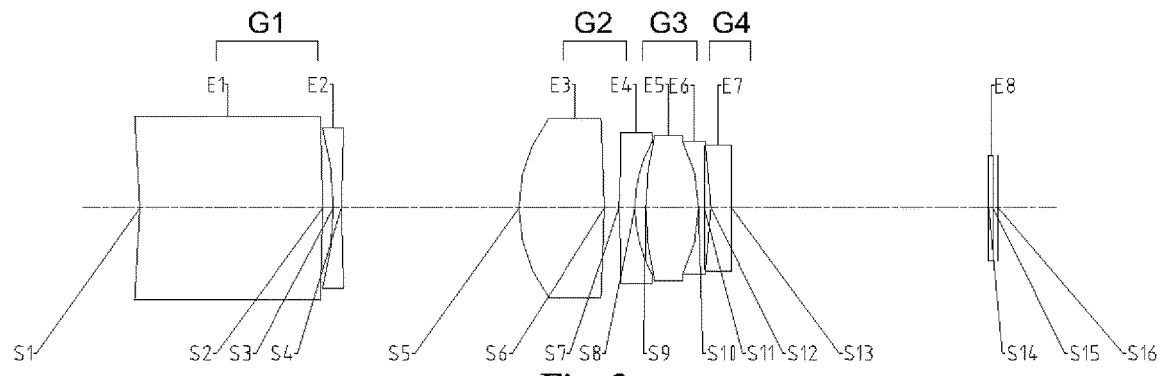
FIG. 3 shows a structure diagram of a zoom lens group in a wide-angle state according to embodiment 1 of the disclosure.

A zoom lens group according to embodiment 1 of the disclosure will be described below with reference to FIG. 1 to FIG. 6D. FIG. 1 is a structure diagram of a zoom lens group in a telephoto state according to embodiment 1 of the disclosure. FIG. 2 is a structure diagram of a zoom lens group in an intermediate state in a process of switching from a telephoto state to a wide-angle state according to embodiment 1 of the disclosure. FIG. 3 is a structure diagram of a zoom lens group in a wide-angle state according to embodiment 1 of the disclosure.

As shown in FIG. 1 to FIG. 3, the zoom lens group sequentially includes, from an object side to an image side, a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S16.

An object-side surface S1 of the first lens E1 is a concave surface, while an image-side surface S2 is a convex surface. An object-side surface S3 of the second lens E2 is a concave surface, while an image-side surface S4 is a concave surface. An object-side surface S5 of the third lens E3 is a convex surface, while an image-side surface S6 is a convex surface. An object-side surface S7 of the fourth lens E4 is a convex surface, while an image-side surface S8 is a concave surface. An object-side surface S9 of the fifth lens E5 is a convex surface, while an image-side surface S10 is a convex surface. An object-side surface S10 of the sixth lens E6 is a concave surface, while an image-side surface S11 is a concave surface. An object-side surface S12 of the seventh lens E7 is a concave surface, while an image-side surface S13 is a convex surface. The optical filter E8 has an object-side surface S14 and an image-side surface S15. Light from an object sequentially penetrates through each of the surfaces S1 to S15 and is finally imaged on the imaging surface S16.

Table 1 is a basic parameter table of the zoom lens group of embodiment 1, and units of the curvature radius and the thickness/distance therein are all millimeter (mm).

TABLE 1

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Spherical | −41.7939 | 9.6000 | 1.52 | 64.2 | |
| S2 | Spherical | −77.1421 | 0.5482 | | | |
| S3 | Spherical | −15.7855 | 0.4200 | 1.60 | 65.1 | |
| S4 | Spherical | 73.1640 | D4 | | | |
| S5(STO) | Spherical | 7.8000 | 4.5000 | 1.75 | 52.3 | |
| S6 | Spherical | −61.9783 | 0.7632 | | | |
| S7 | Aspherical | 18.1886 | 0.8327 | 1.67 | 20.4 | 0.0000 |
| S8 | Aspherical | 6.4634 | D8 | | | 0.0000 |
| S9 | Spherical | 16.2065 | 2.7599 | 1.69 | 40.1 | |
| S10 | Spherical | −7.6233 | 0.3000 | 1.55 | 72.0 | |
| S11 | Spherical | 132.5049 | D11 | | | |
| S12 | Spherical | −19.2922 | 1.0746 | 1.92 | 21.5 | |
| S13 | Spherical | −196.9215 | 13.4875 | | | |
| S14 | Spherical | Infinite | 0.2100 | 1.52 | 64.2 | |
| S15 | Spherical | Infinite | 0.2900 | | | |
| S16 | Spherical | Infinite | | | | |

In the example, a spacing distance D4 of the first lens group and the second lens group on the optical axis (i.e., a spacing distance from the image-side surface of the second lens E2 to the object-side surface of the third lens E3 on the optical axis), a spacing distance D8 of the second lens group and the third lens group on the optical axis (i.e., a spacing distance from the image-side surface of the fourth lens E4 to the object-side surface of the fifth lens E5 on the optical axis) and a spacing distance D11 of the third lens group and the fourth lens group on the optical axis (i.e., a spacing distance from the image-side surface of the sixth lens E6 to the object-side surface of the seventh lens E7 on the optical axis) are changed to switch the zoom lens group from the telephoto state to the wide-angle state or from the wide-angle state to the telephoto state. A total effective focal length f, F-number Fno and maximum field of view FOV of the zoom lens group, a total length TTL (i.e., a distance from the object-side surface S1 of the first lens E1 to the imaging surface S16 of the zoom lens group on the optical axis) and ImgH (ImgH is a half of a diagonal length of an effective pixel region on the imaging surface S16 of the zoom lens group) change with switching of the zoom lens group from the telephoto state to the wide-angle state or from the wide-angle state to the telephoto state.

Table 2 shows each parameter of the zoom lens group according to embodiment 1 in different states, units of f, TTL, ImgH, D4, D8 and D11 therein are all millimeter (mm), and the unit of FOV is degree)(°).

TABLE 2

| Each parameter | Telephoto state | Intermediate state | Wide-angle state |
|---|---|---|---|
| f | 29.90 | 21.94 | 15.17 |
| Fno | 3.81 | 3.34 | 2.77 |

TABLE 2-continued

| Each parameter | Telephoto state | Intermediate state | Wide-angle state |
|---|---|---|---|
| FOV | 10.4 | 14.2 | 20.6 |
| TTL | 45.00 | 45.00 | 45.00 |
| ImgH | 2.72 | 2.72 | 2.72 |
| D4 | 0.03 | 4.11 | 9.29 |
| D8 | 5.11 | 4.14 | 0.57 |
| D11 | 5.08 | 1.96 | 0.35 |

In embodiment 1, both the object-side surface S7 and image-side surface S8 of the fourth lens are aspherical surfaces, and a surface type of each aspherical lens may be defined through, but not limited to, the following aspherical surface formula:

$$x = \frac{ch^2}{1 + \sqrt{1-(k+1)c^2h^2}} + \sum A_i h^i, \quad (1)$$

wherein x is a distance rise between a position of the aspherical surface at a height h in a direction of the optical axis and an aspherical surface vertex; c is a paraxial curvature of the aspherical surface, c=1/R (namely, the paraxial curvature c is a reciprocal of the curvature radius R in Table 1); k is the conic coefficient; and Ai is an ith-order correction coefficient of the aspherical surface. Table 3 shows high-order coefficients $A_4$, $A_6$, $A_8$, $A_{10}$, $A_{12}$, $A_{14}$ and $A_{16}$ applied to the aspherical mirror surfaces S7 and S8 in embodiment 1.

TABLE 3

| Surface number | A4 | A6 | A8 | A10 | A12 | A14 | A16 |
|---|---|---|---|---|---|---|---|
| S7 | −2.1318E−03 | 5.8953E−05 | −1.1102E−06 | 5.4610E−09 | −1.8556E−10 | 3.3207E−12 | −1.7528E−13 |
| S8 | −1.6830E−03 | 7.8484E−05 | −4.6753E−07 | −1.0112E−09 | 1.0354E−10 | 5.3565E−12 | 0.0000E+00 |

Figure 4A:
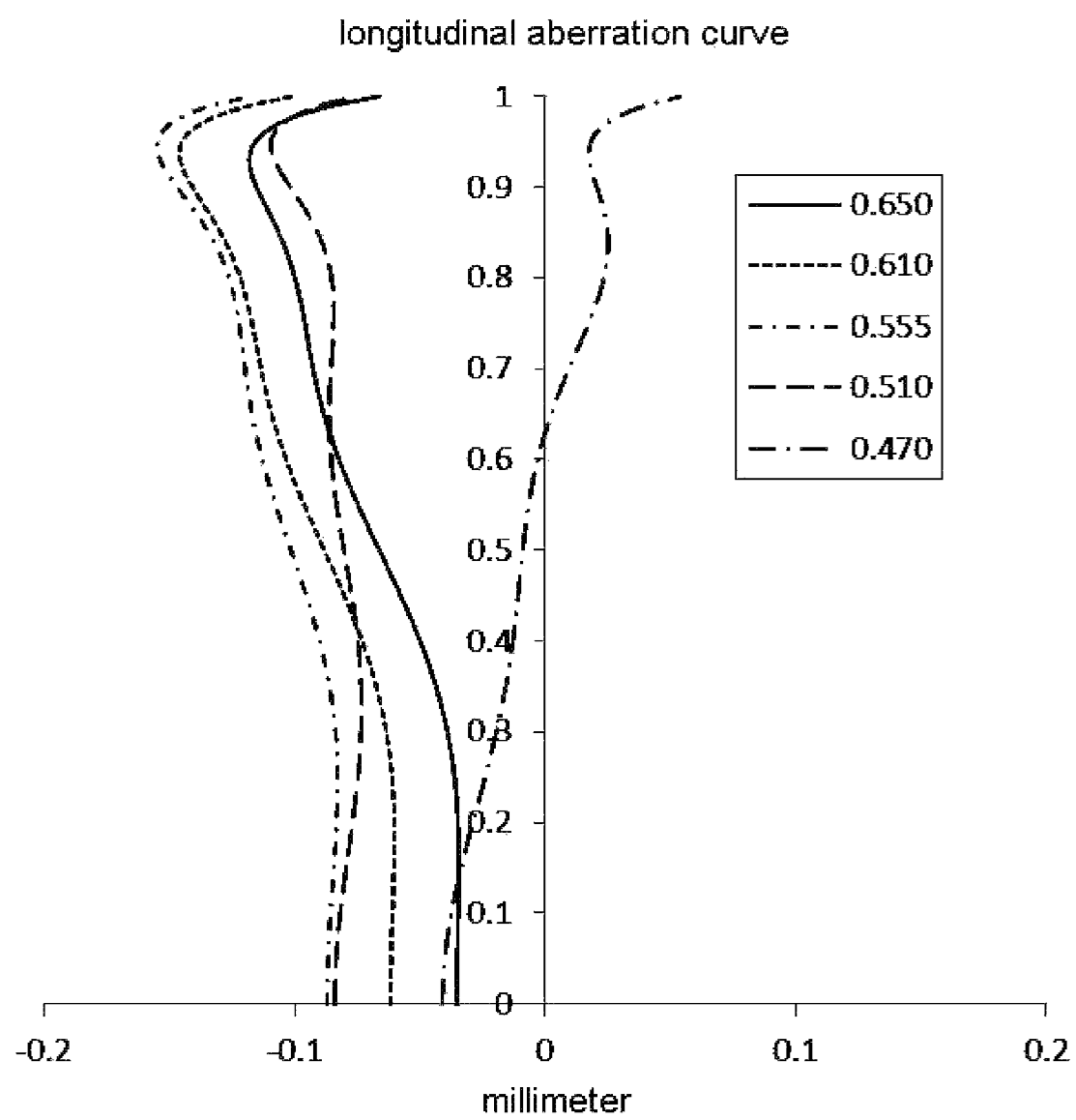
FIG. 4A to FIG. 4D show a longitudinal aberration curve, astigmatism curve, distortion curve and lateral color curve of a zoom lens group in a telephoto state according to embodiment 1 respectively.
Figure 4B:
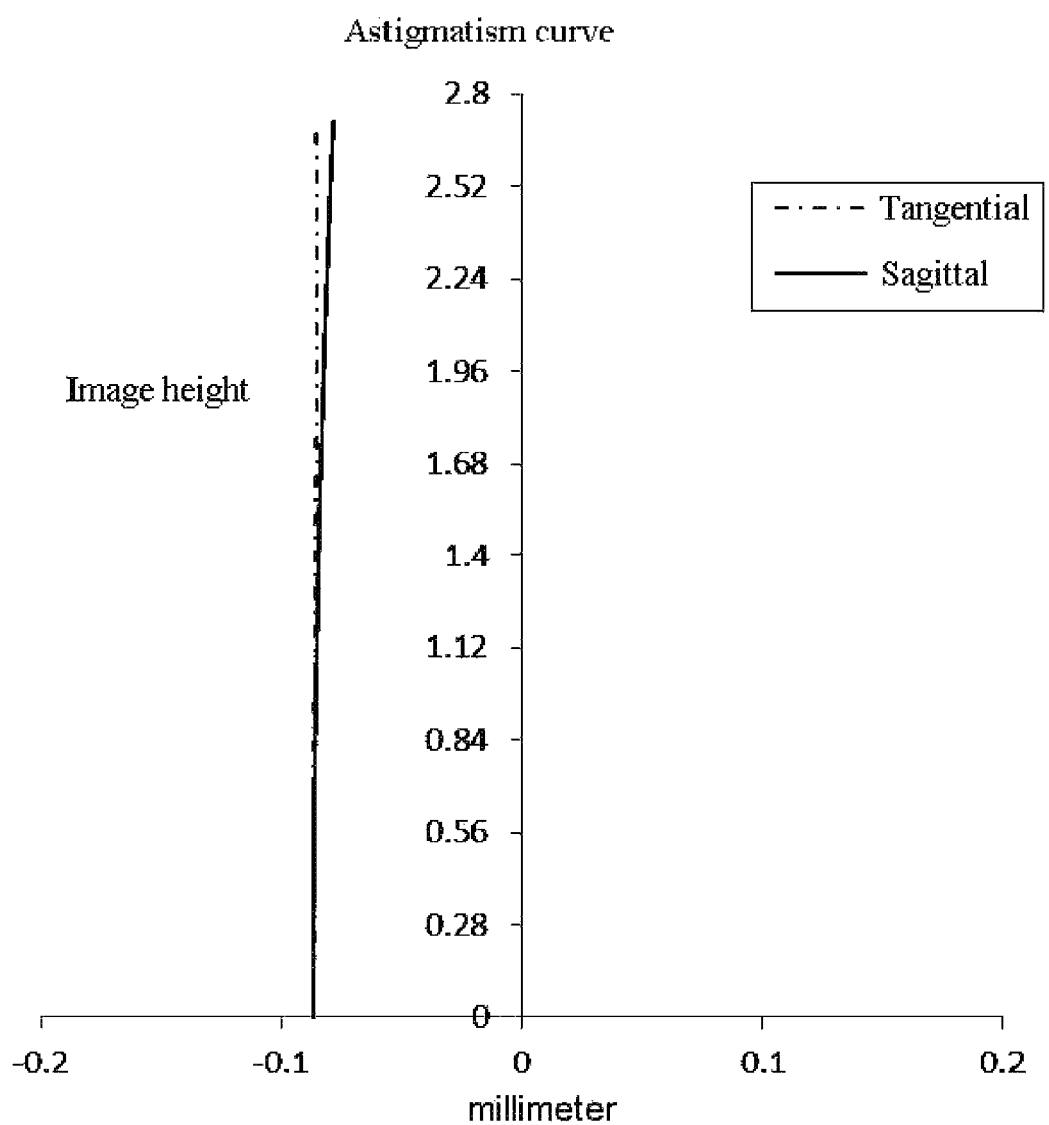
Figure 4C:
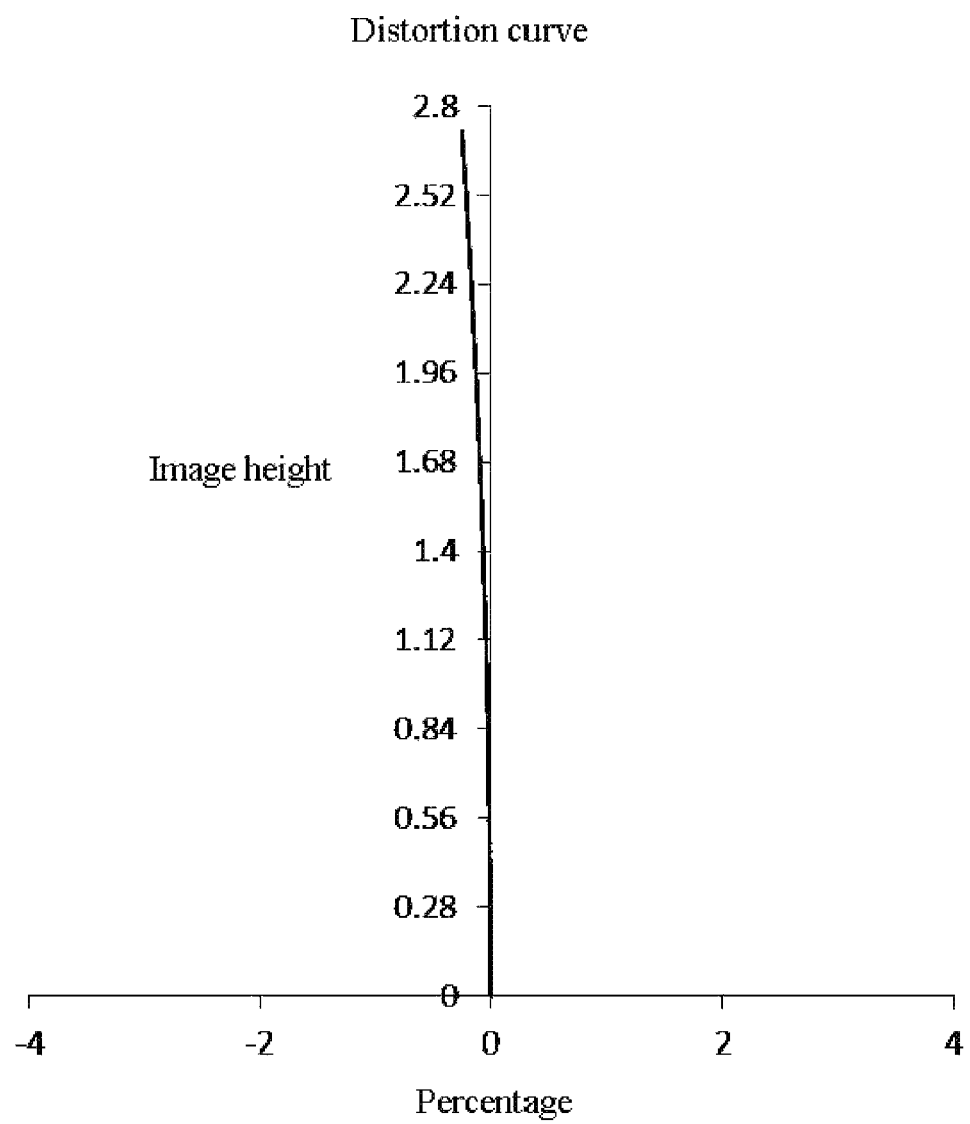
Figure 4D:
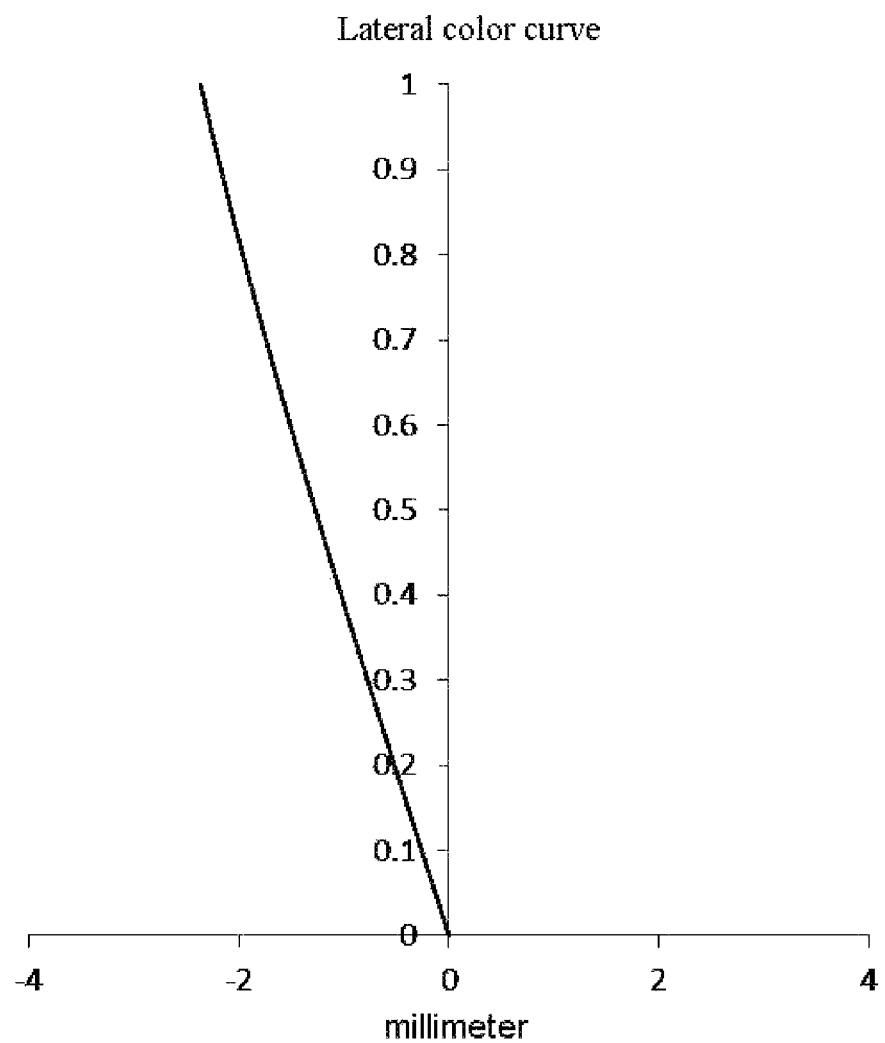
Figure 5A:
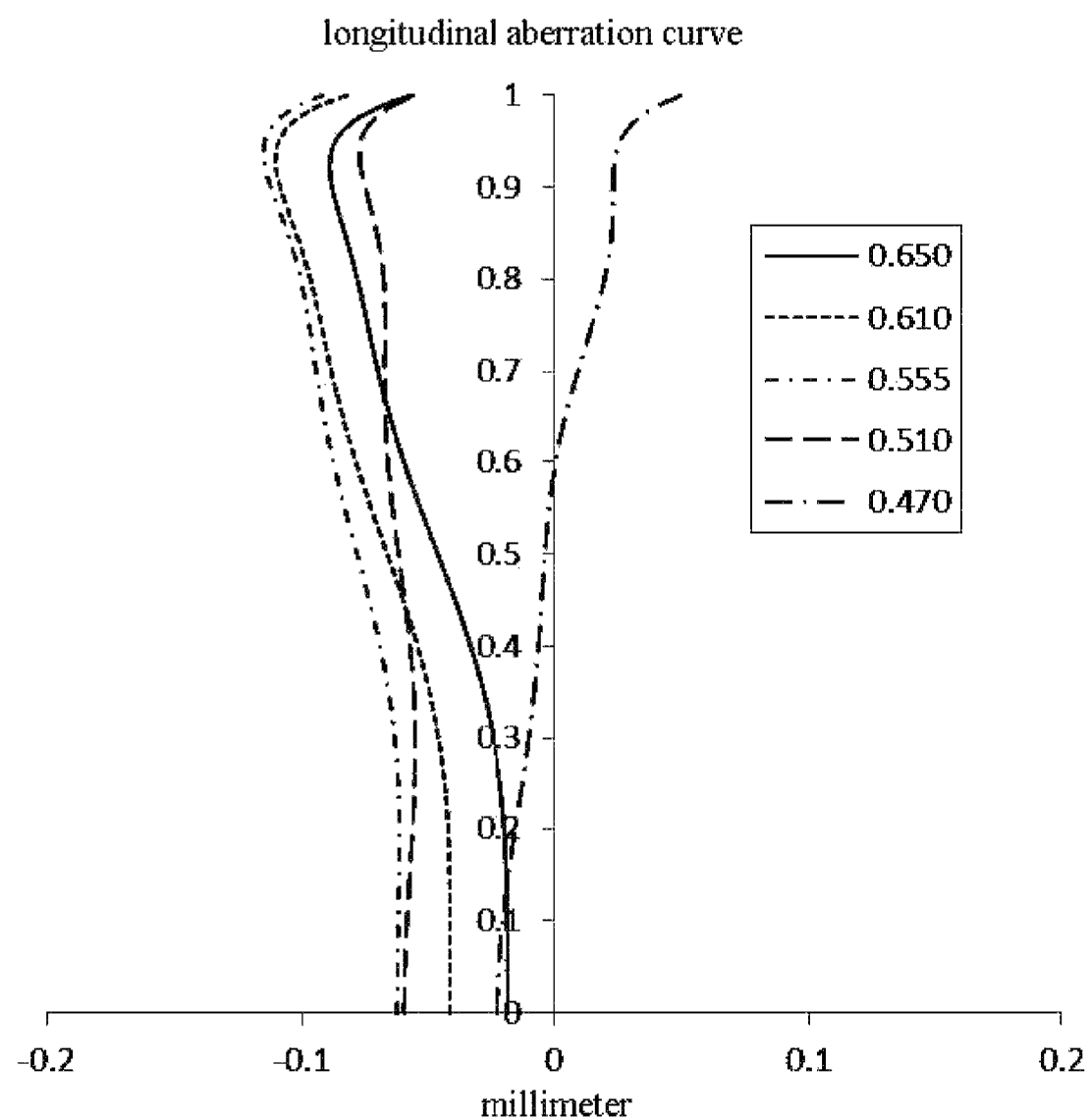
FIG. 5A to FIG. 5D show a longitudinal aberration curve, astigmatism curve, distortion curve and lateral color curve of a zoom lens group in an intermediate state in a process of switching from a telephoto state to a wide-angle state according to embodiment 1 respectively.
Figure 5B:
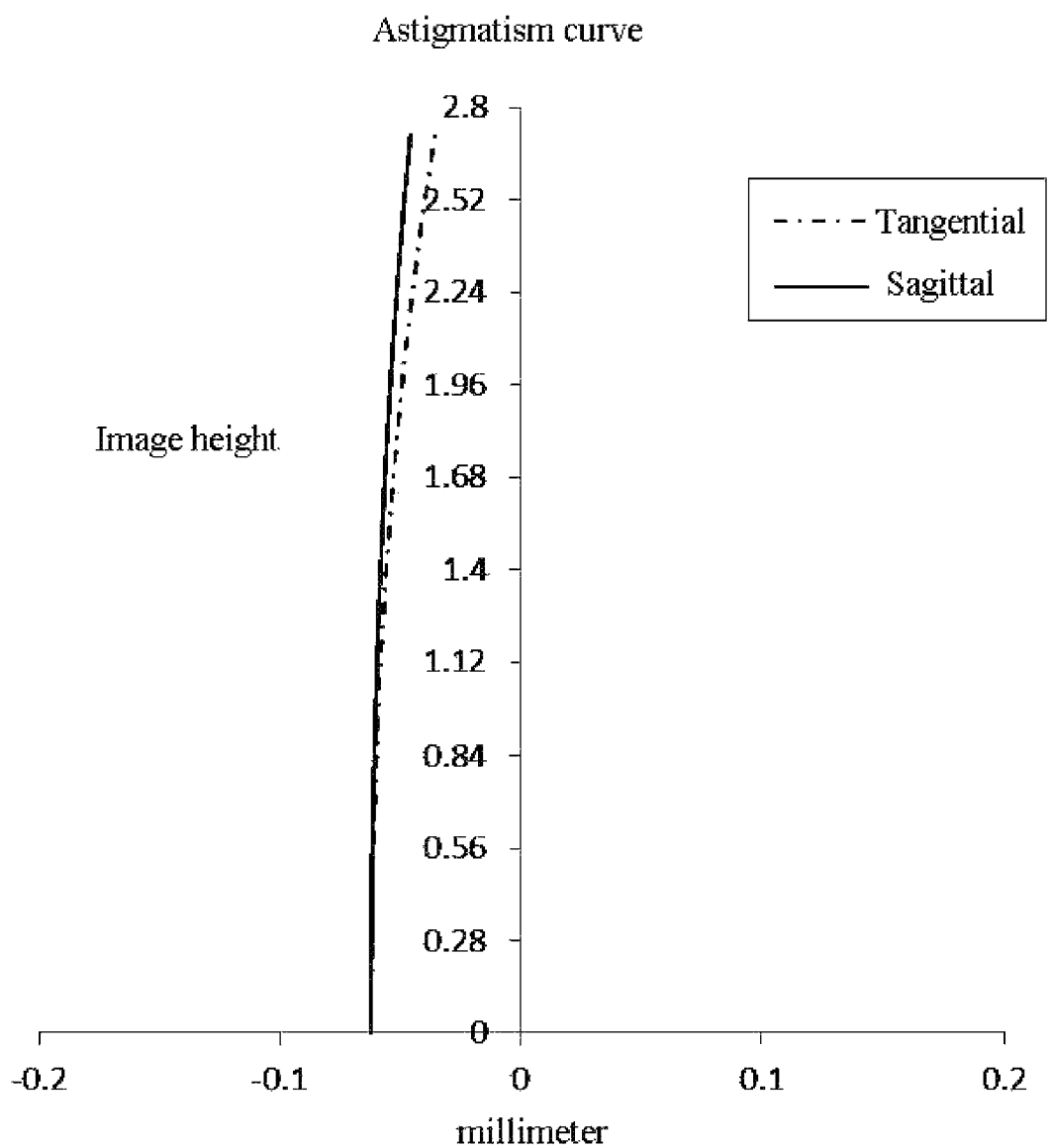
Figure 5C:
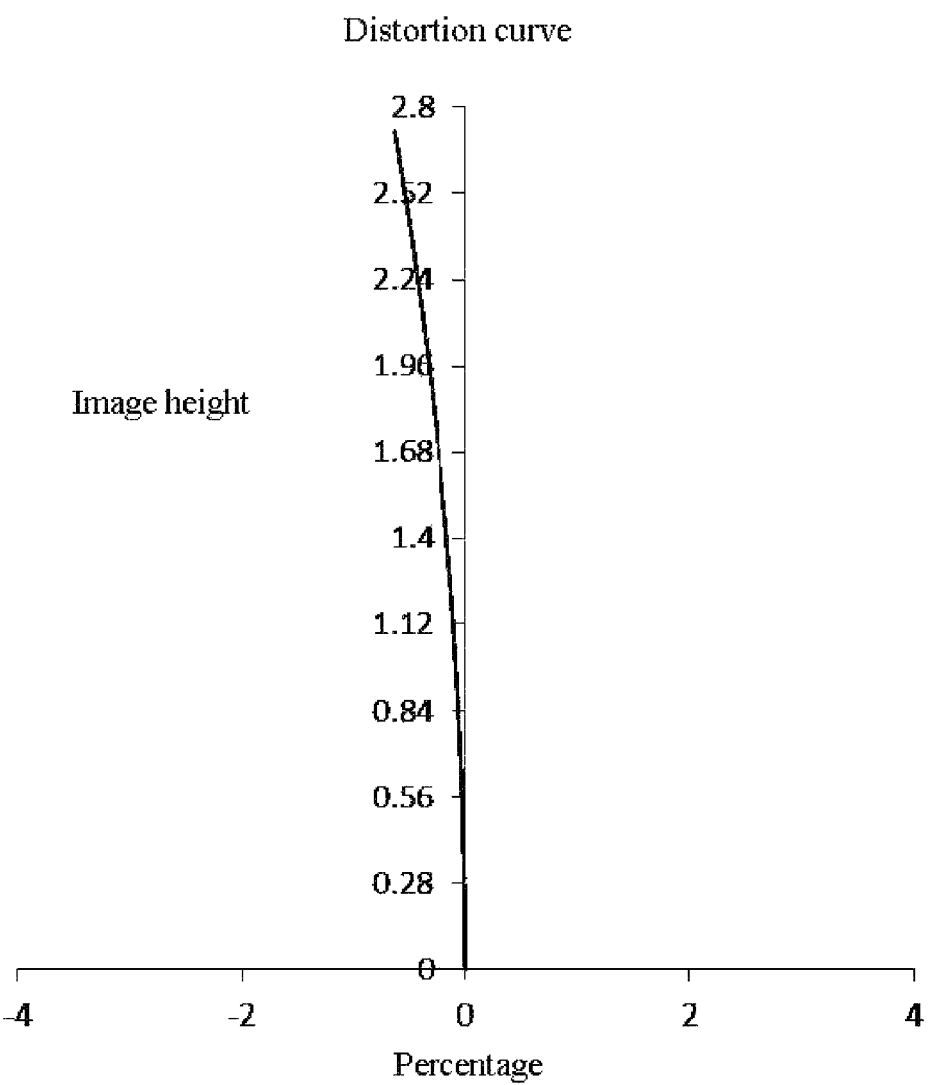
Figure 5D:
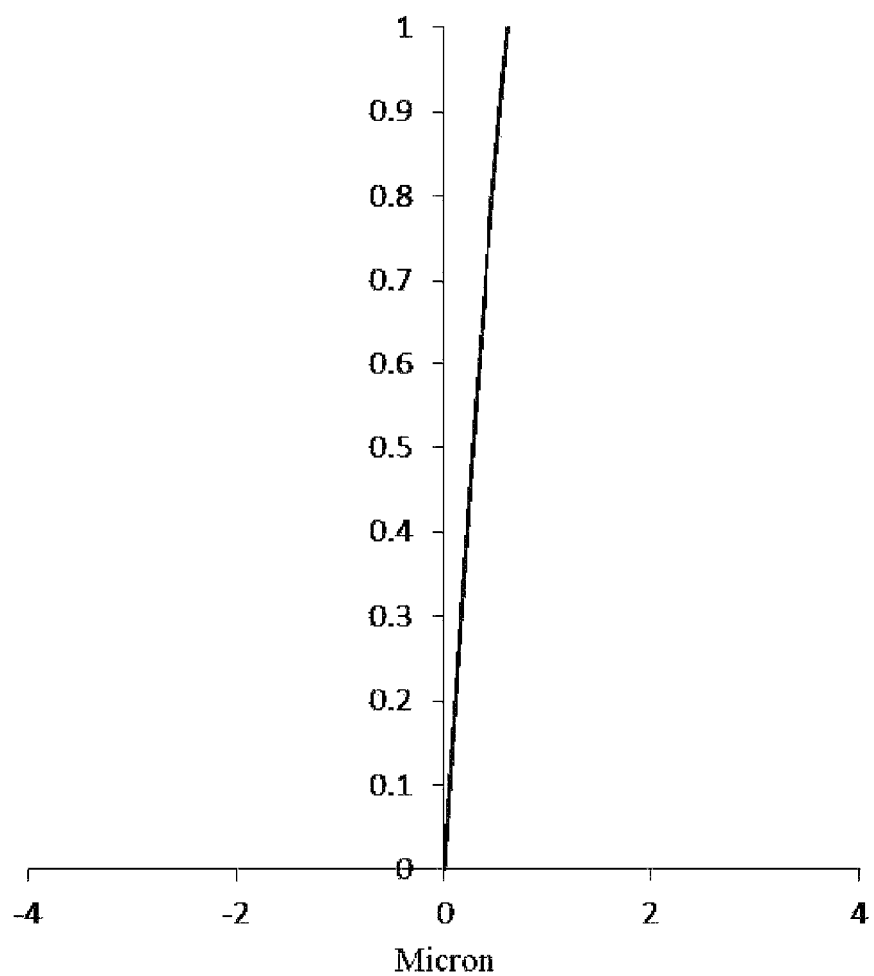
Figure 6A:
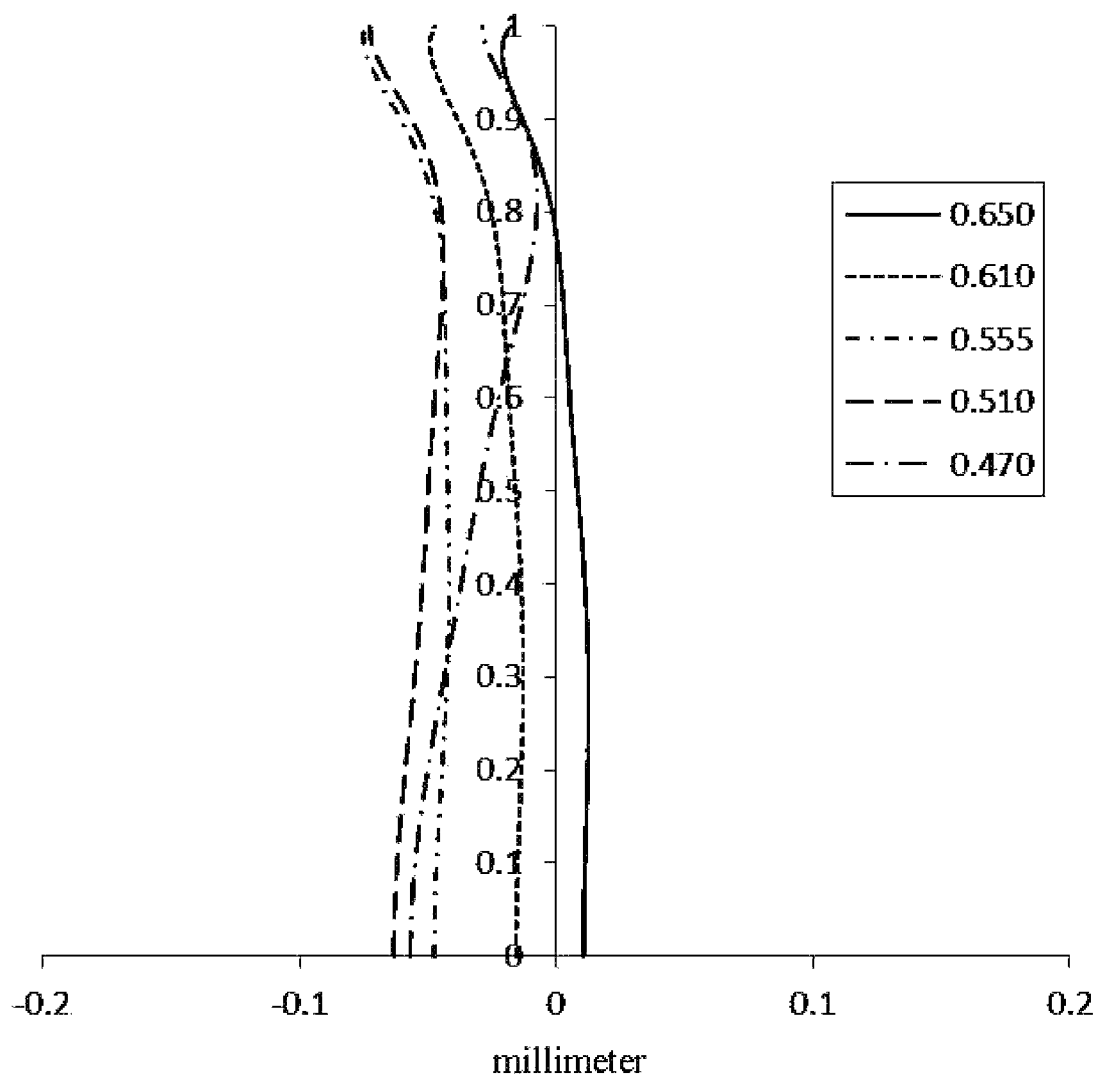
FIG. 6A to FIG. 6D show a longitudinal aberration curve, astigmatism curve, distortion curve and lateral color curve of a zoom lens group in a wide-angle state according to embodiment 1 respectively.
Figure 6B:
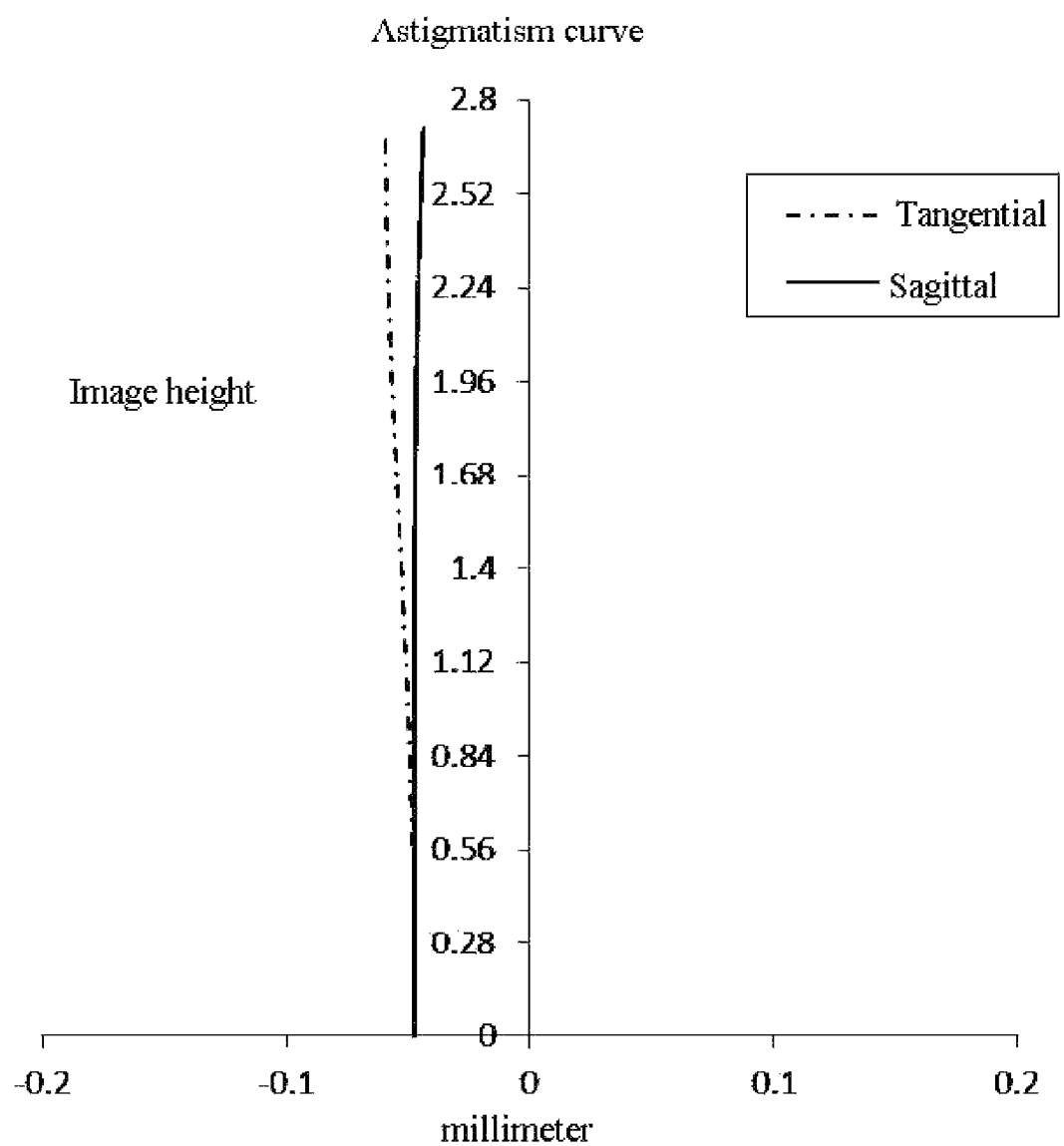
Figure 6C:
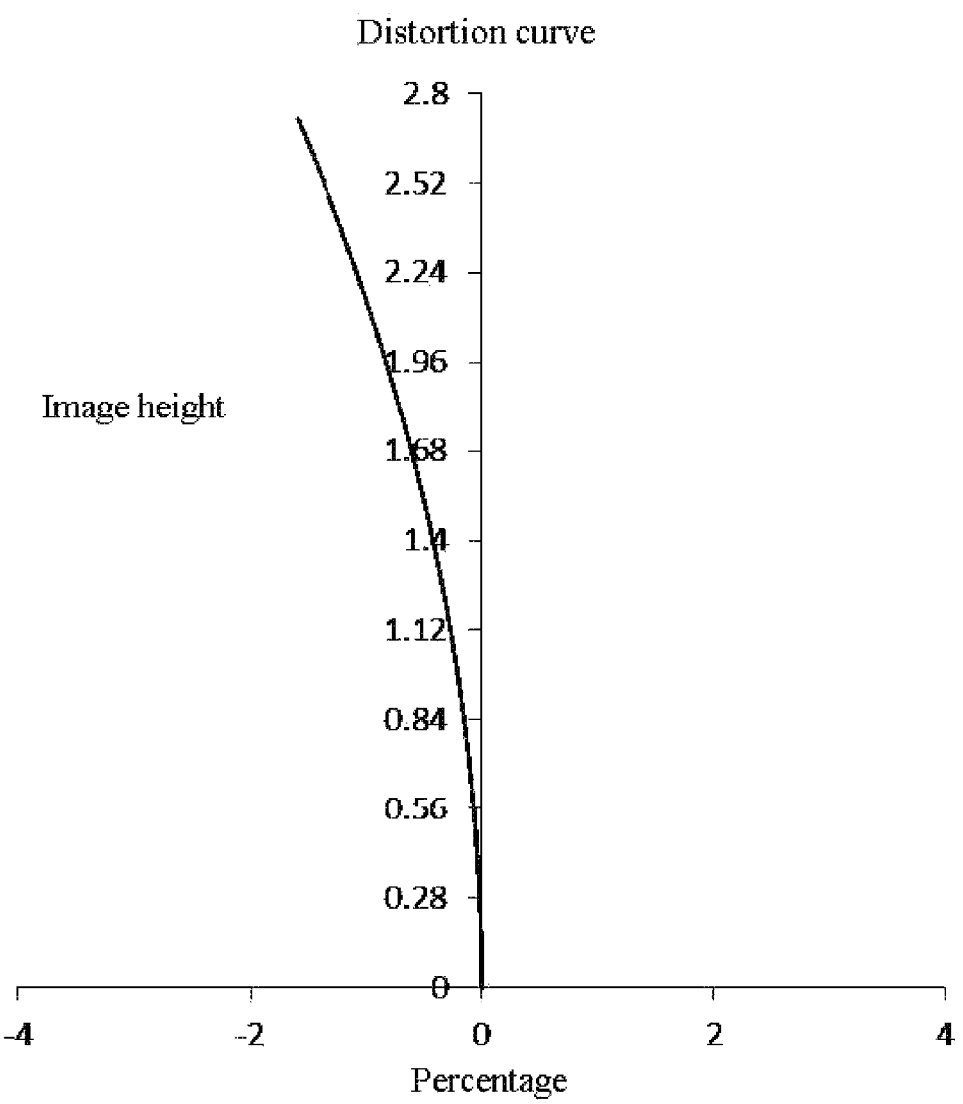
Figure 6D:
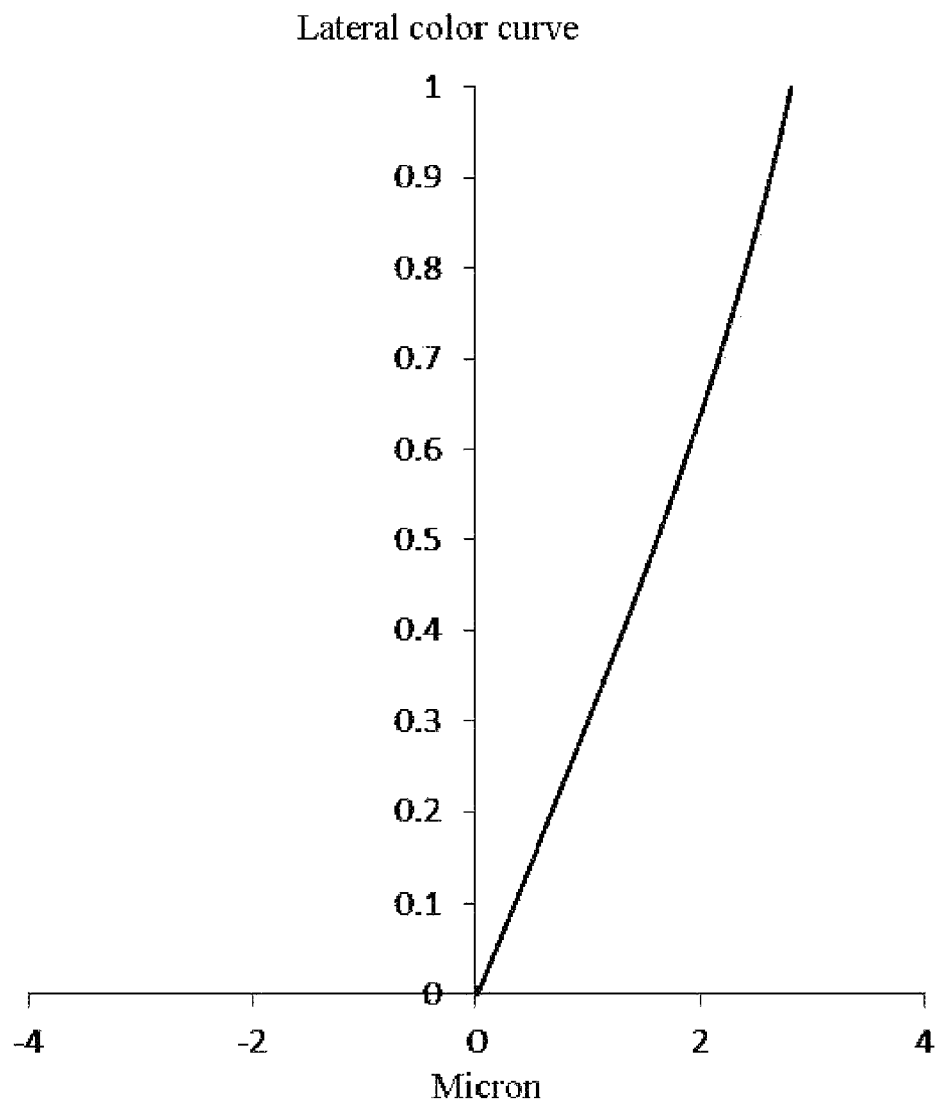

FIG. 4A, FIG. 5A and FIG. 6A show on-axis color curves of a zoom lens group in a telephoto state, an intermediate state and a wide-angle state according to embodiment 1 respectively, and represent converging focus deviations of light of different wavelengths passing through the lens. FIG. 4B, FIG. 5B and FIG. 6B show astigmatism curves of a zoom lens group in a telephoto state, an intermediate state and a wide-angle state according to embodiment 1 respectively, and represent tangential image surface curves and sagittal image surface curves. FIG. 4C, FIG. 5C and FIG. 6C show distortion curves of a zoom lens group in a telephoto state, an intermediate state and a wide-angle state according to embodiment 1 respectively, and represent distortion values corresponding to different image heights. FIG. 4D, FIG. 5D and FIG. 6D show lateral color curves of a zoom lens group in a telephoto state, an intermediate state and a wide-angle state according to embodiment 1 respectively, and represent deviations of different image heights of light passing through the lens on the imaging surface. According to FIG. 4A to FIG. 6D, it can be seen that high imaging quality of the zoom lens group provided in embodiment 1 may be achieved in each state.

An object-side surface S3 of the second lens E2 is a concave surface, while an image-side surface S4 is a concave surface. An object-side surface S5 of the third lens E3 is a convex surface, while an image-side surface S6 is a convex surface. An object-side surface S7 of the fourth lens E4 is a convex surface, while an image-side surface S8 is a concave surface. An object-side surface S9 of the fifth lens E5 is a convex surface, while an image-side surface S10 is a convex surface. An object-side surface S10 of the sixth lens E6 is a concave surface, while an image-side surface S11 is a concave surface. An object-side surface S12 of the seventh lens E7 is a concave surface, while an image-side surface S13 is a convex surface. The optical filter E8 has an object-side surface S14 and an image-side surface S15. Light from an object sequentially penetrates through each of the surfaces S1 to S15 and is finally imaged on the imaging surface S16.

Table 4 is a basic parameter table of the zoom lens group of embodiment 2, and units of the curvature radius and the thickness/distance therein are all millimeter (mm).

TABLE 4

| Surface number | Surface type | Curvature radius | Thickness/ distance | Refractive index | Abbe number | Conic coefficient |
|---|---|---|---|---|---|---|
| OBJ | Spherical | Infinite | Infinite | | | |
| S1 | Spherical | −57.9533 | 10.0000 | 1.52 | 64.2 | |
| S2 | Spherical | −154.2460 | 0.6000 | | | |
| S3 | Spherical | −14.1402 | 1.0000 | 1.63 | 62.4 | |
| S4 | Spherical | 71.9797 | D4 | | | |
| S5(STO) | Spherical | 7.3617 | 4.2200 | 1.76 | 50.1 | |
| S6 | Spherical | −49.7170 | 0.5405 | | | |
| S7 | Aspherical | 16.4368 | 0.8408 | 1.67 | 20.4 | 0.0000 |
| S8 | Aspherical | 5.9880 | D8 | | | 0.0000 |
| S9 | Spherical | 15.1670 | 1.8982 | 1.69 | 42.0 | |
| S10 | Spherical | −7.6371 | 0.6000 | 1.57 | 69.1 | |
| S11 | Spherical | 6320.1960 | D11 | | | |
| S12 | Spherical | −19.9598 | 1.3000 | 1.92 | 21.5 | |
| S13 | Spherical | −1433.7000 | 11.9393 | | | |
| S14 | Spherical | Infinite | 0.2100 | 1.52 | 64.2 | |
| S15 | Spherical | Infinite | 0.2900 | | | |
| S16 | Spherical | Infinite | | | | |

Embodiment 2

Figure 7:
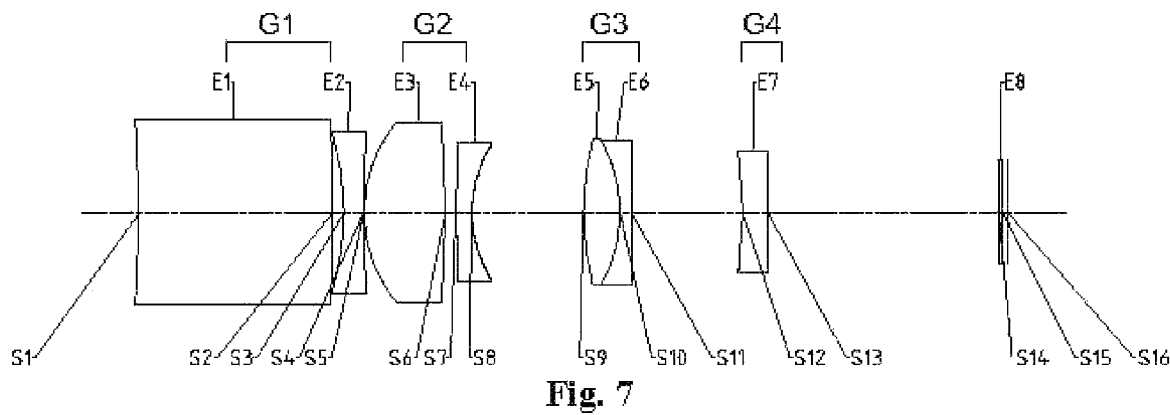
FIG. 7 shows a structure diagram of a zoom lens group in a telephoto state according to embodiment 2 of the disclosure.
Figure 8:
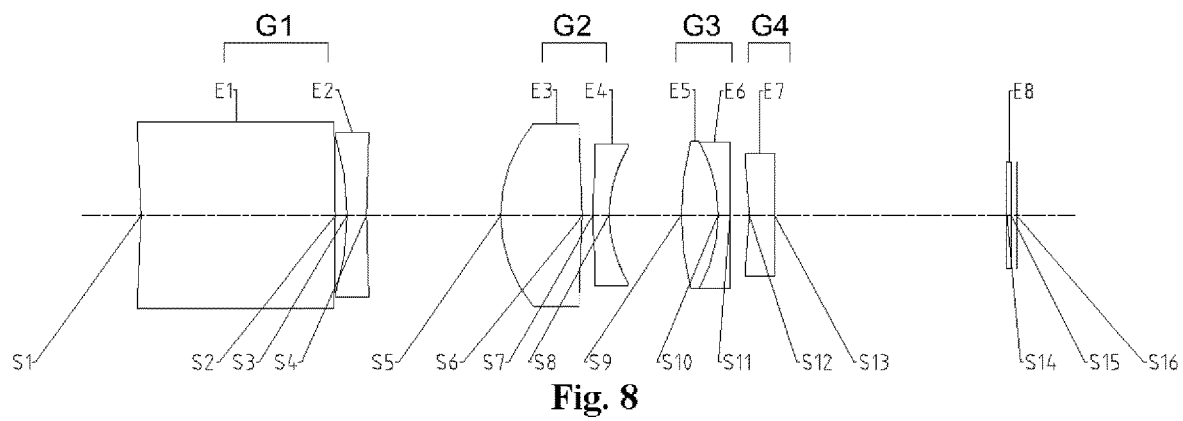
FIG. 8 shows a structure diagram of a zoom lens group in an intermediate state in a process of switching from a telephoto state to a wide-angle state according to embodiment 2 of the disclosure.
Figure 9:
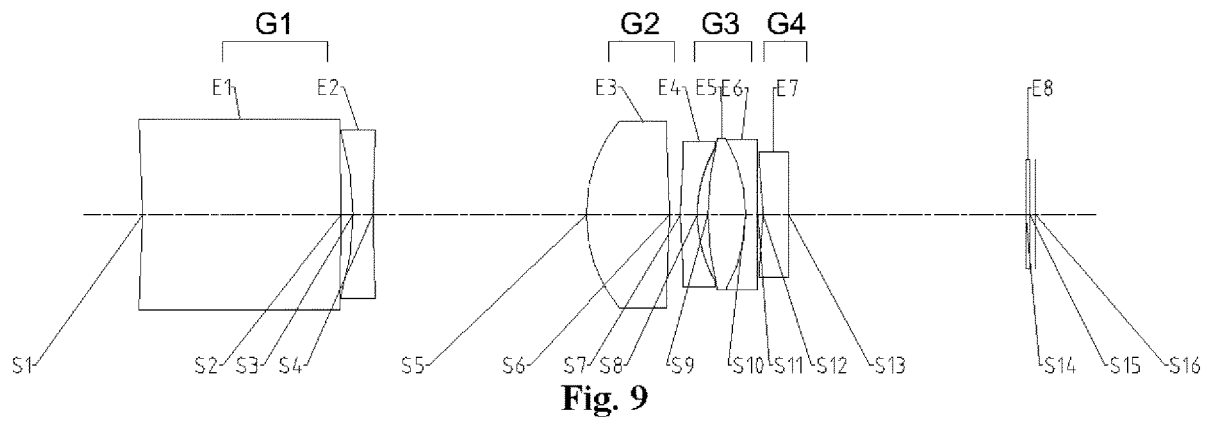
FIG. 9 shows a structure diagram of a zoom lens group in a wide-angle state according to embodiment 2 of the disclosure.

A zoom lens group according to embodiment 2 of the disclosure will be described below with reference to FIG. 7 to FIG. 12D. In the embodiment and the following embodiments, part of descriptions similar to those about embodiment are omitted for simplicity. FIG. 7 is a structure diagram of a zoom lens group in a telephoto state according to embodiment 2 of the disclosure. FIG. 8 is a structure diagram of a zoom lens group in an intermediate state in a process of switching from a telephoto state to a wide-angle state according to embodiment 2 of the disclosure. FIG. 9 is a structure diagram of a zoom lens group in a wide-angle state according to embodiment 2 of the disclosure.

As shown in FIG. 7 to FIG. 9, the zoom lens group sequentially includes, from an object side to an image side, a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S16.

An object-side surface S1 of the first lens E1 is a concave surface, while an image-side surface S2 is a convex surface.

In the example, a spacing distance D4 of the first lens group and the second lens group on an optical axis, a spacing distance D8 of the second lens group and the third lens group on the optical axis and a spacing distance D11 of the third lens group and the fourth lens group on the optical axis are changed to switch the zoom lens group from a telephoto state to a wide-angle state or from the wide-angle state to the telephoto state. A total effective focal length f, F-number Fno and maximum field of view FOV of the zoom lens group, a total length TTL of the zoom lens group and ImgH (ImgH is a half of a diagonal length of an effective pixel region on the imaging surface S16 of the zoom lens group) change with switching of the zoom lens group from the telephoto state to the wide-angle state or from the wide-angle state to the telephoto state.

Table 5 shows each parameter of the zoom lens group according to embodiment 2 in different states, units of f, TTL, ImgH, D4, D8 and D11 therein are all millimeter (mm), and the unit of FOV is degree) (°).

TABLE 5

| Each parameter | Telephoto state | Intermediate state | Wide-angle state |
|---|---|---|---|
| f | 28.02 | 16.37 | 12.25 |
| Fno | 3.81 | 3.34 | 2.77 |
| FOV | 11.1 | 19.1 | 25.7 |
| TTL | 45.00 | 45.00 | 45.00 |
| ImgH | 2.72 | 2.72 | 2.72 |
| D4 | 0.03 | 6.88 | 10.75 |
| D8 | 5.77 | 3.70 | 0.54 |
| D11 | 5.76 | 0.98 | 0.27 |

Table 6 shows high-order coefficients applied to each aspherical mirror surface in embodiment 2. A surface type of each aspherical surface may be defined by the formula (1) given in embodiment 1.

TABLE 6

| Surface number | A4 | A6 | A8 | A10 | A12 | A14 | A16 |
|---|---|---|---|---|---|---|---|
| S7 | −2.3900E−03 | 6.8623E−05 | −1.3503E−06 | 6.4360E−09 | −2.7500E−10 | 5.5339E−12 | −3.1488E−13 |
| S8 | −1.9200E−03 | 9.1762E−05 | −3.0886E−07 | −9.8462E−09 | 5.5977E−10 | −9.2928E−12 | 5.1821E−13 |

Figure 10A:
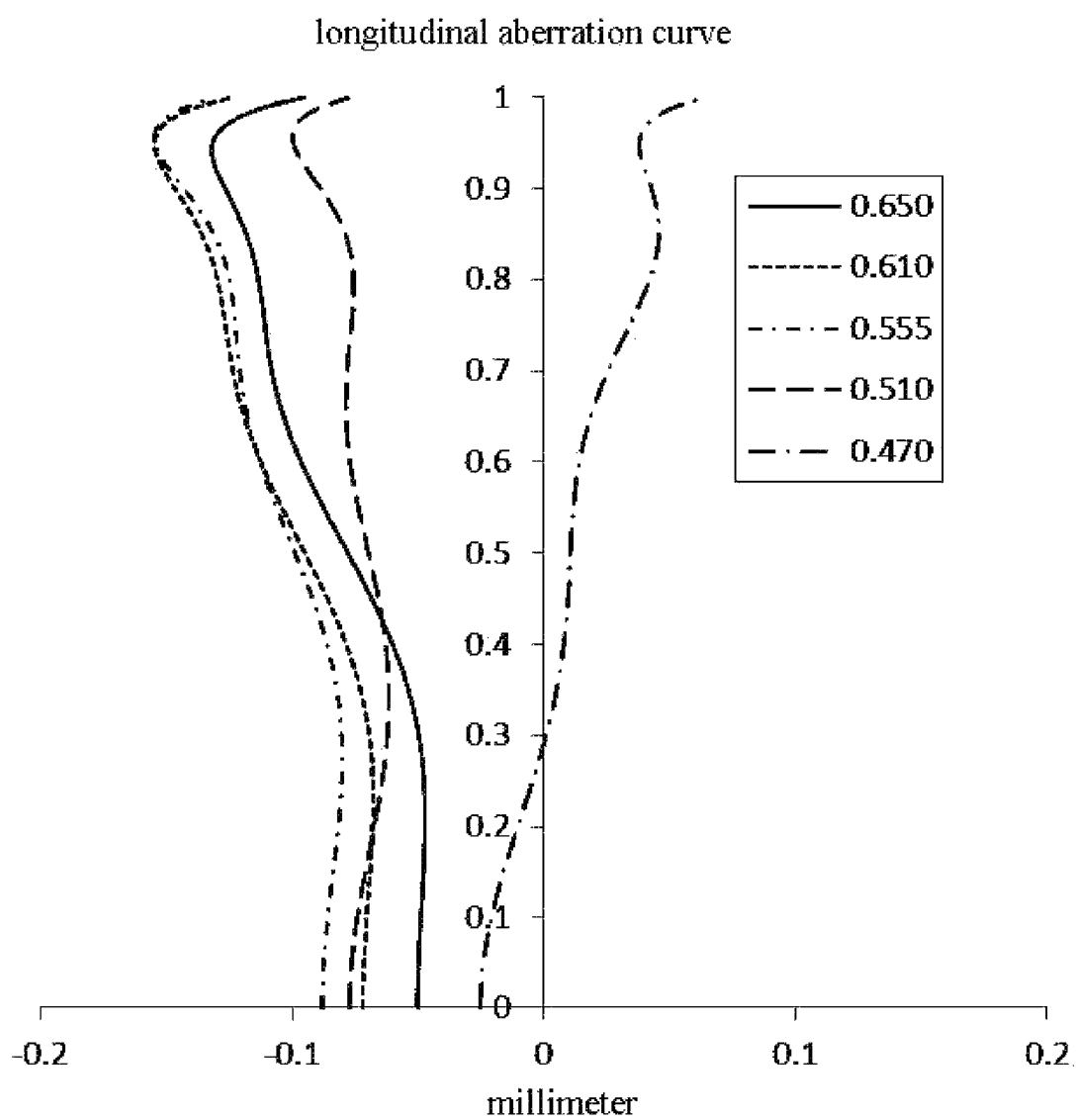
FIG. 10A to FIG. 10D show a longitudinal aberration curve, astigmatism curve, distortion curve and lateral color curve of a zoom lens group in a telephoto state according to embodiment 2 respectively.
Figure 10B:
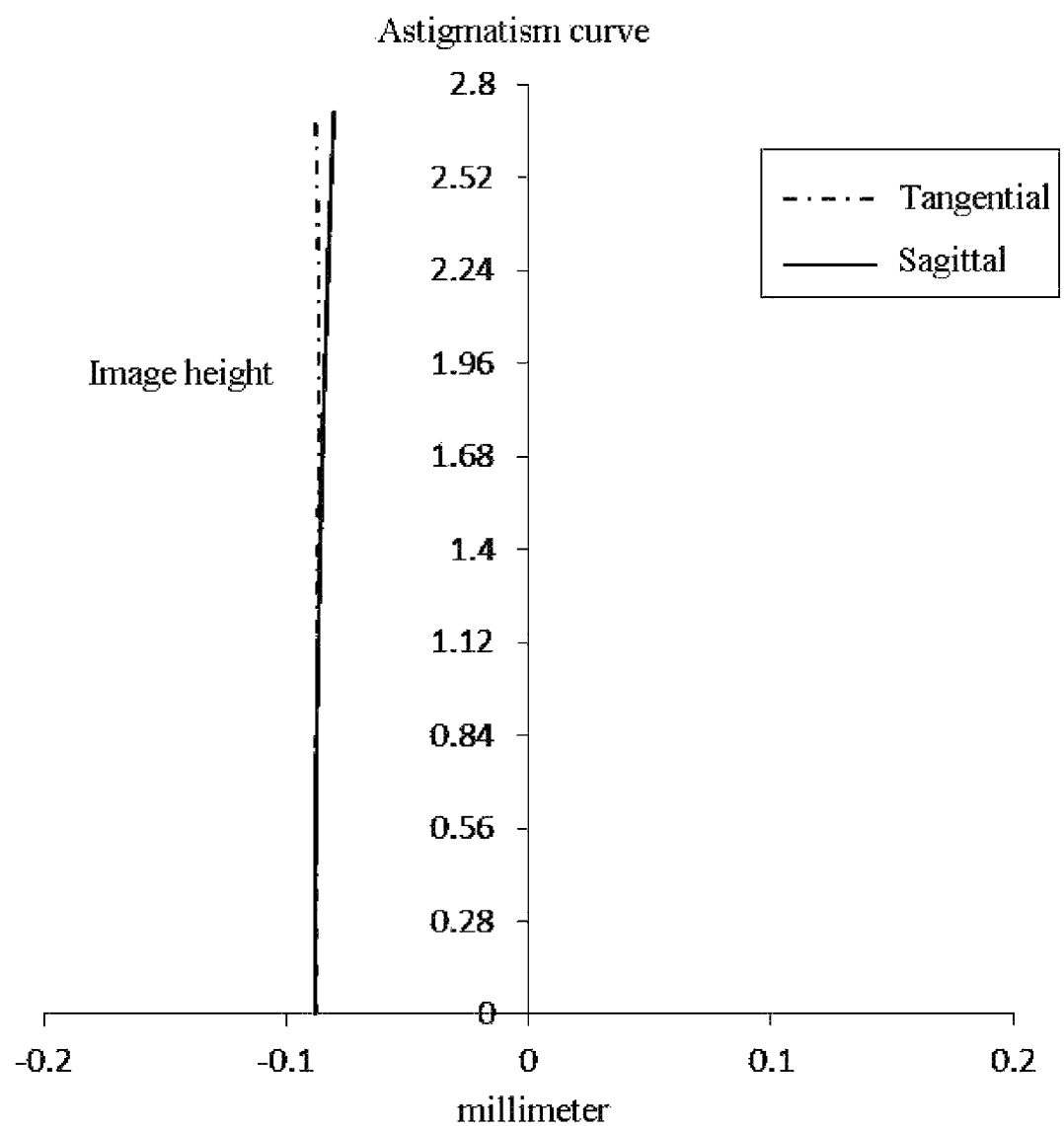
Figure 10C:
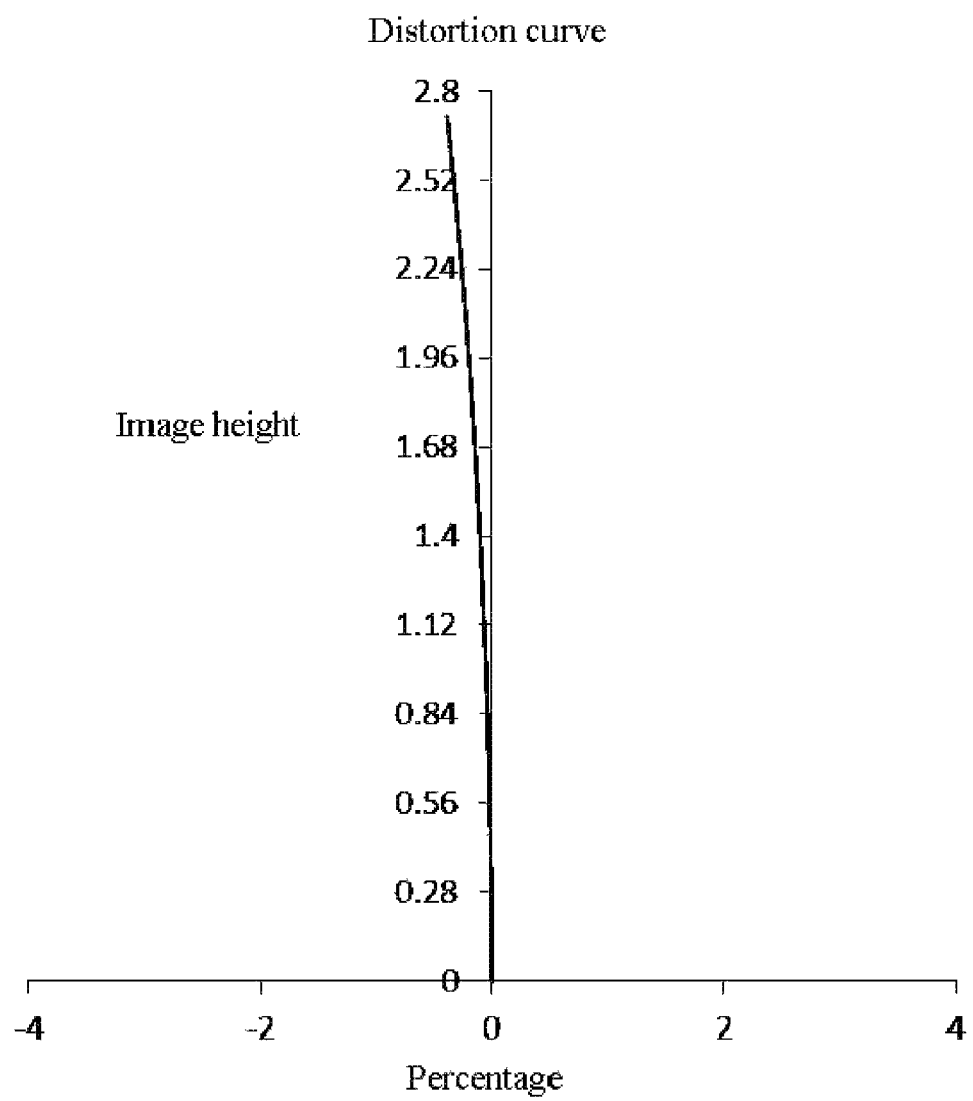
Figure 10D:
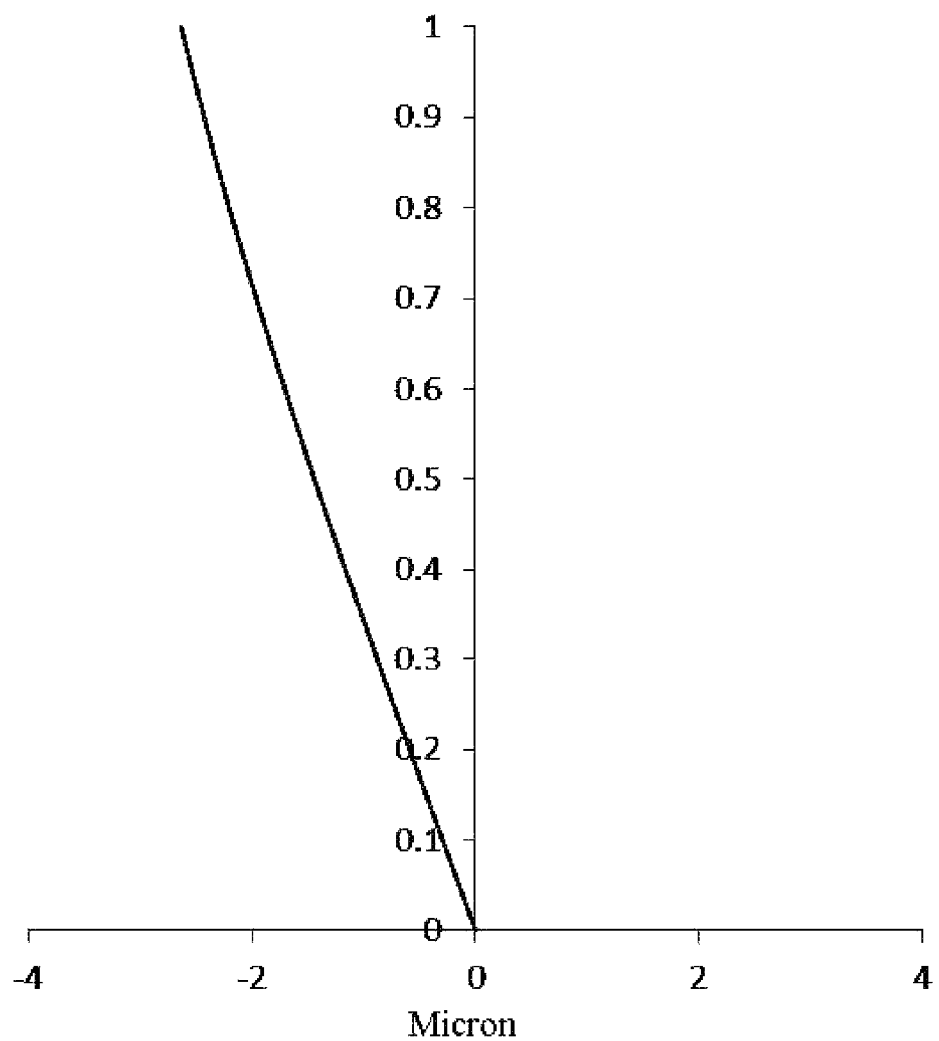
Figure 11A:
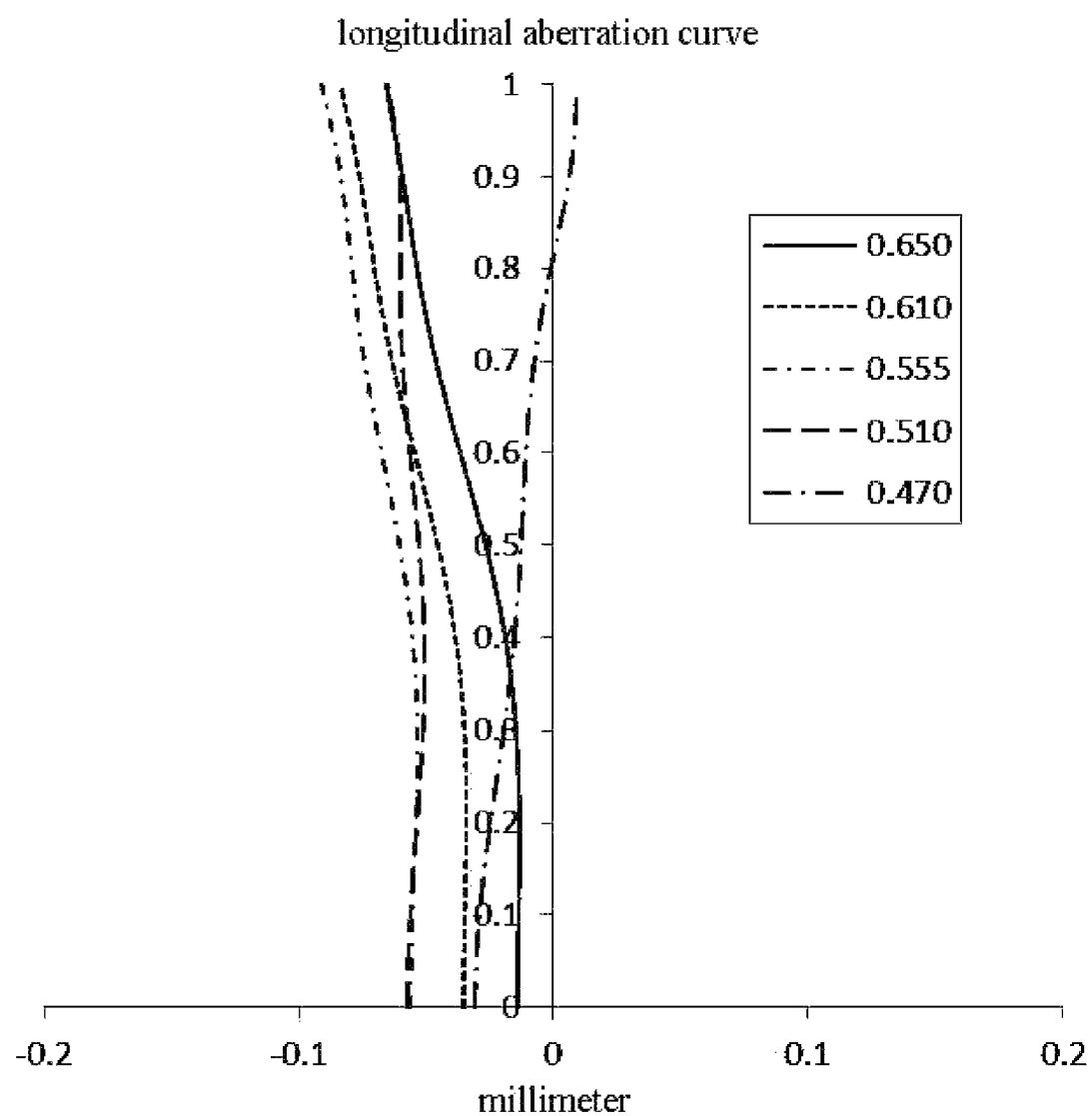
FIG. 11A to FIG. 11D show a longitudinal aberration curve, astigmatism curve, distortion curve and lateral color curve of a zoom lens group in an intermediate state in a process of switching from a telephoto state to a wide-angle state according to embodiment 2 respectively.
Figure 11B:
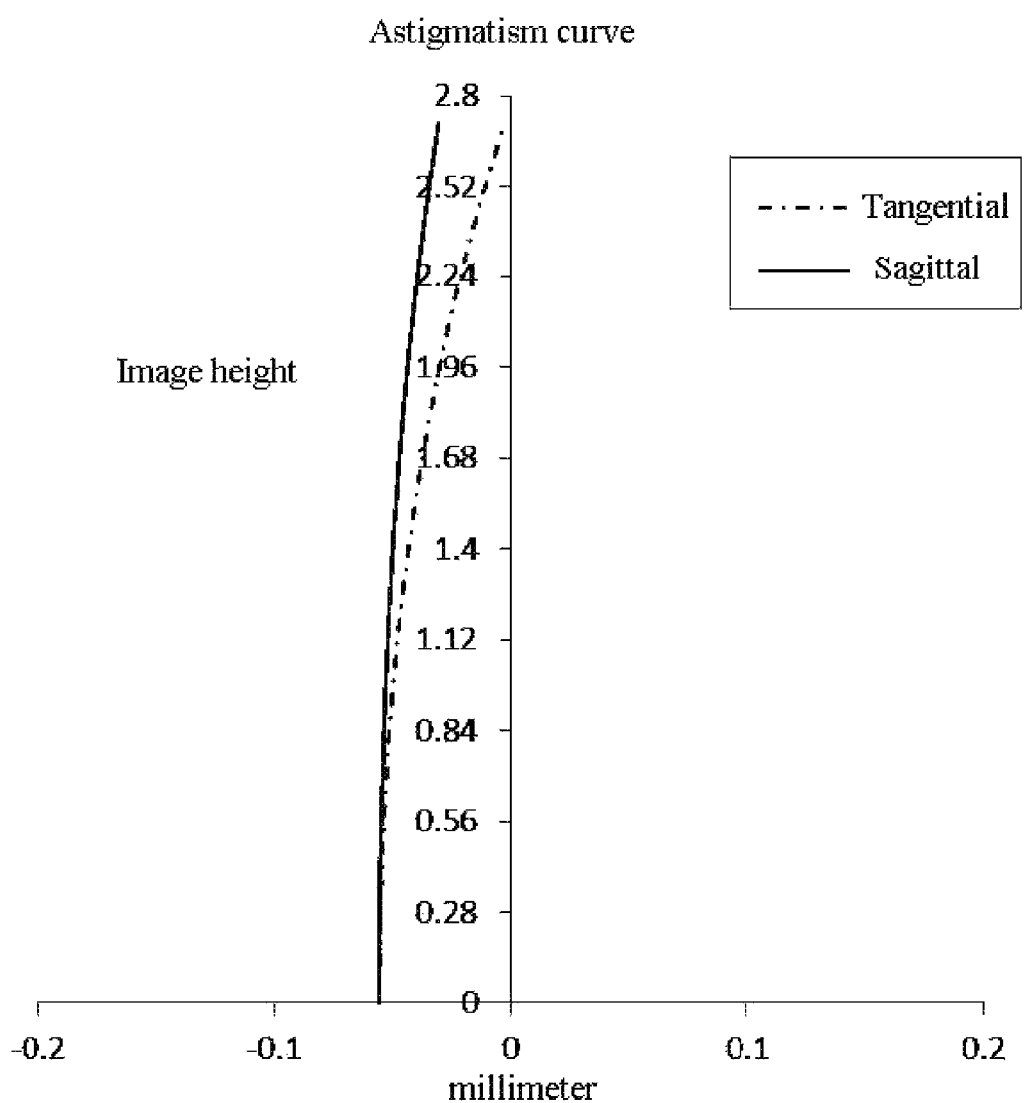
Figure 11C:
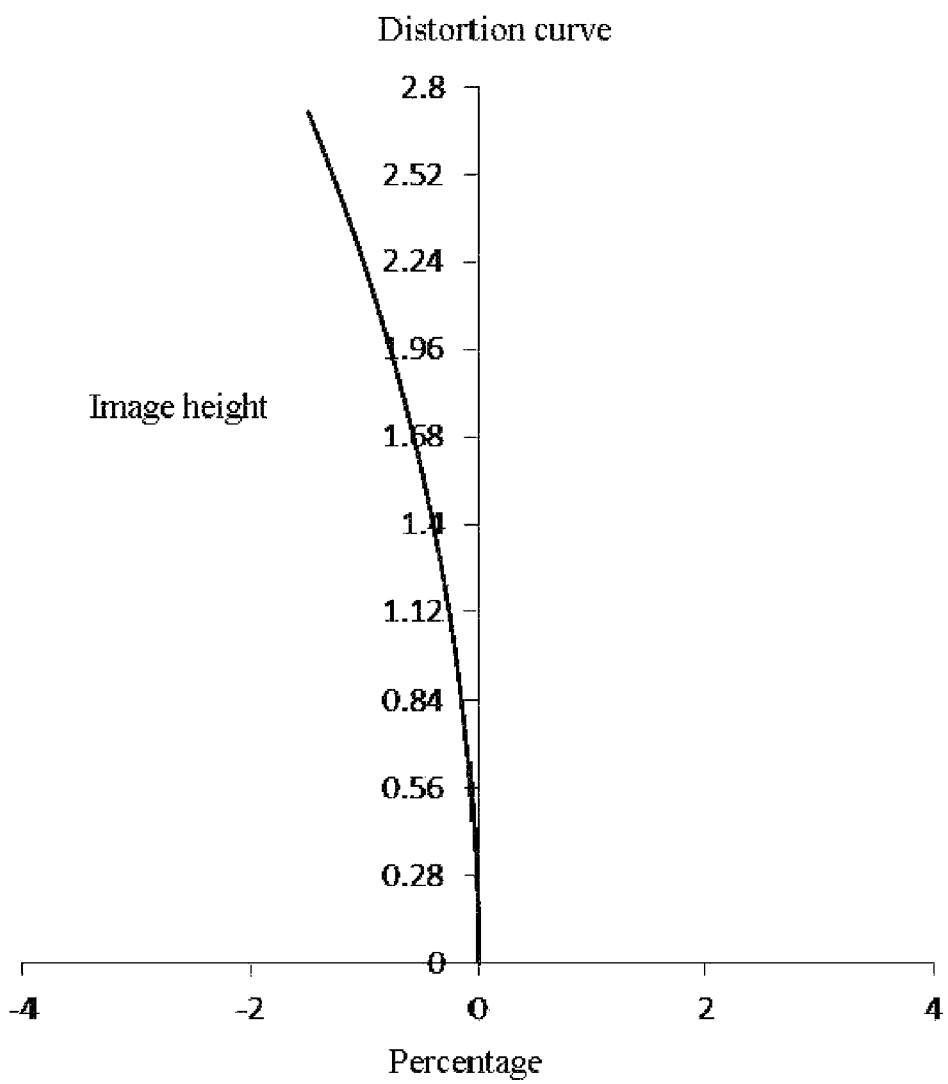
Figure 11D:
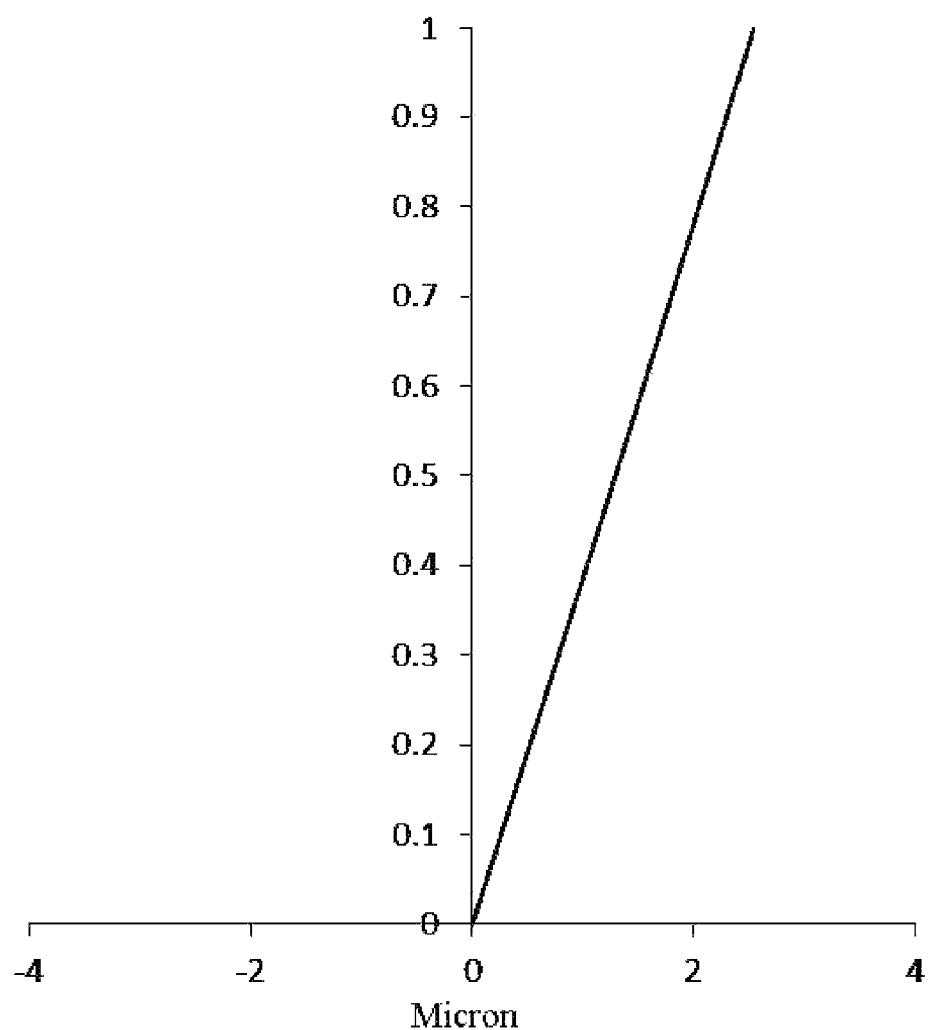
Figure 12A:
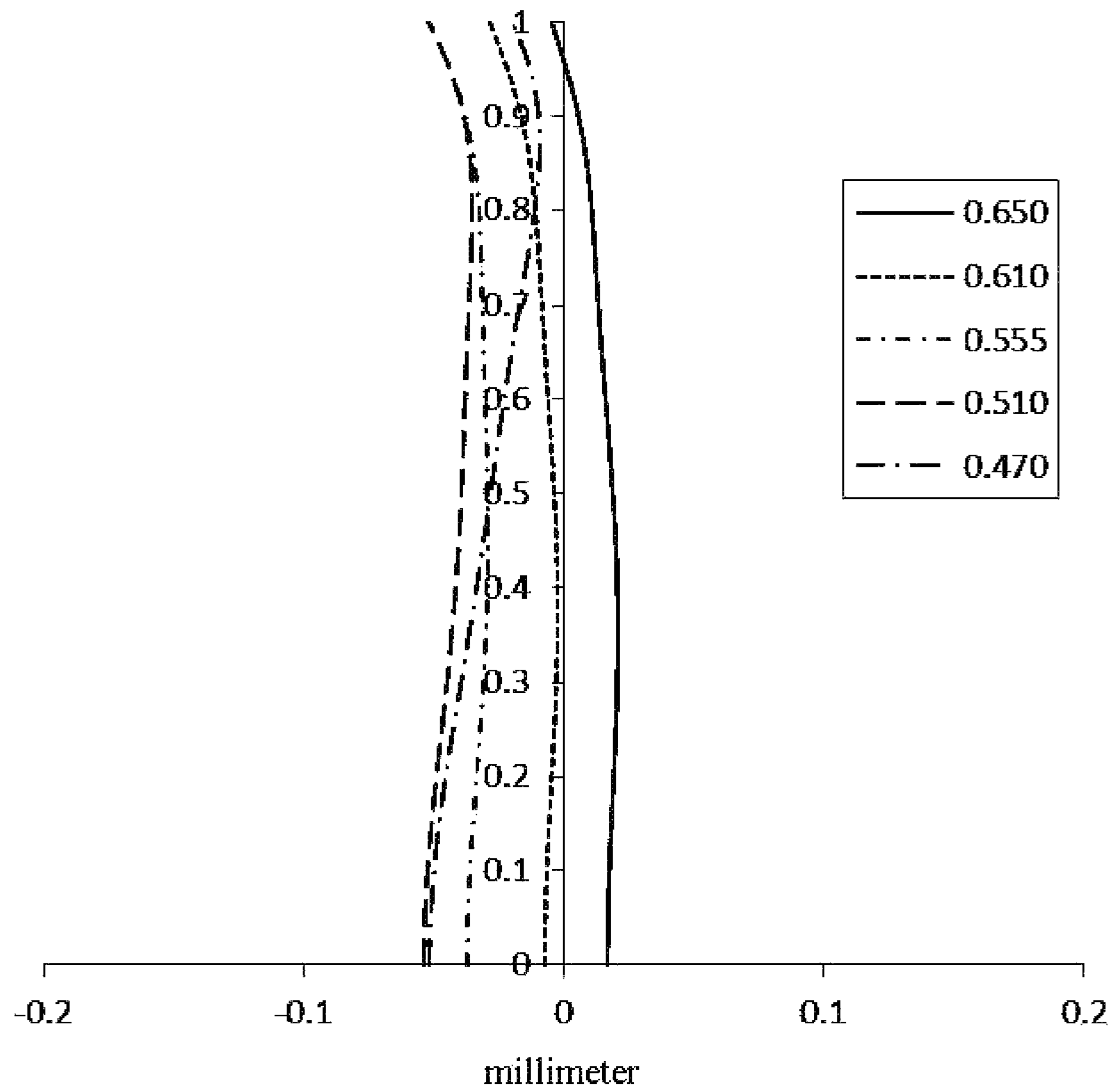
FIG. 12A to FIG. 12D show a longitudinal aberration curve, astigmatism curve, distortion curve and lateral color curve of a zoom lens group in a wide-angle state according to embodiment 2 respectively.
Figure 12B:
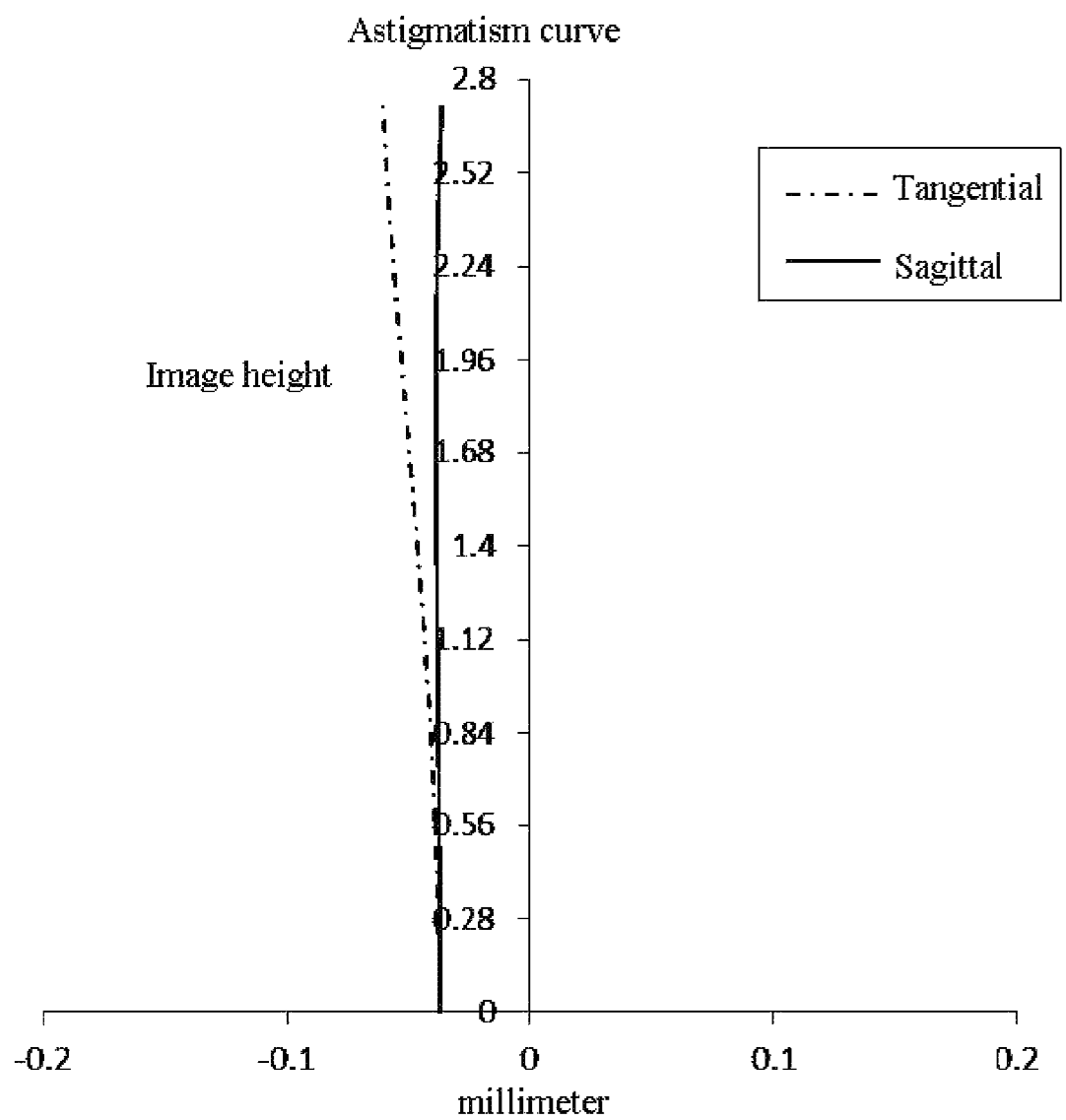
Figure 12C:
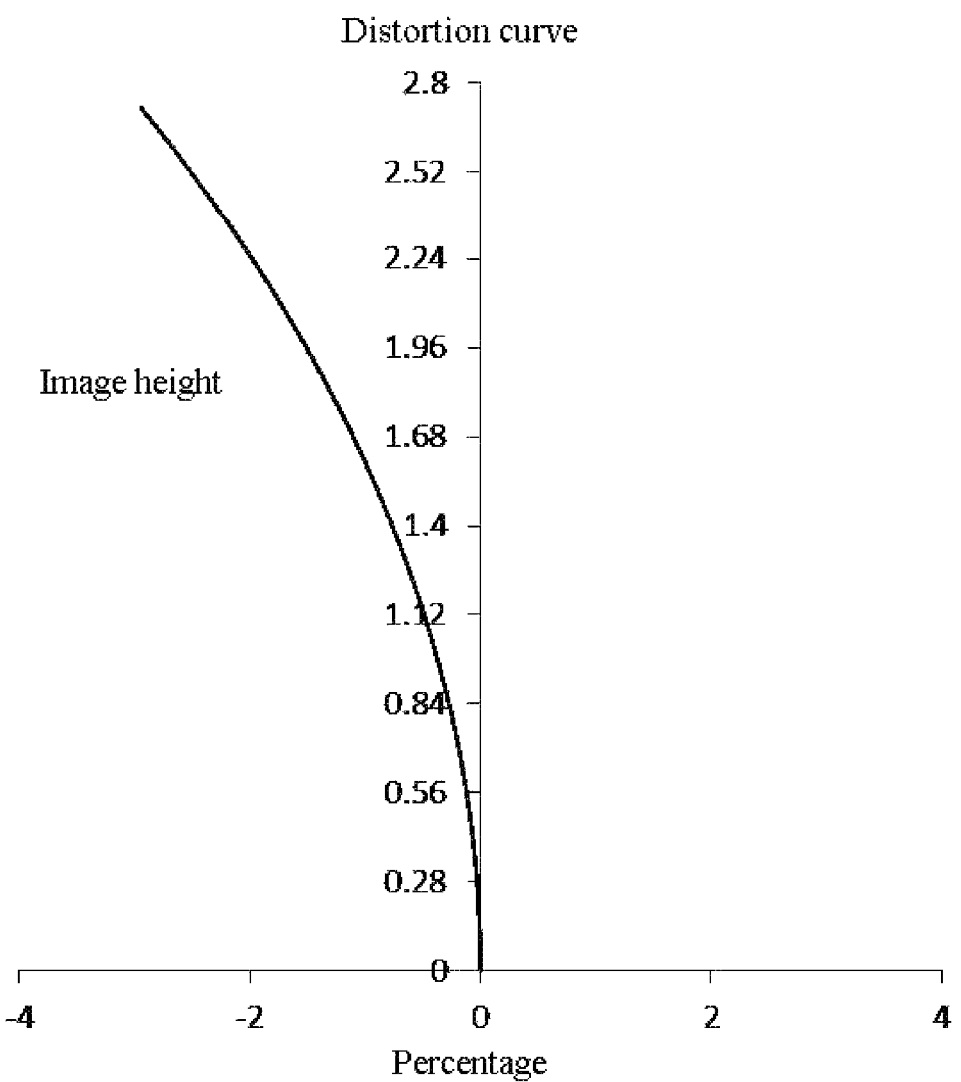
Figure 12D:
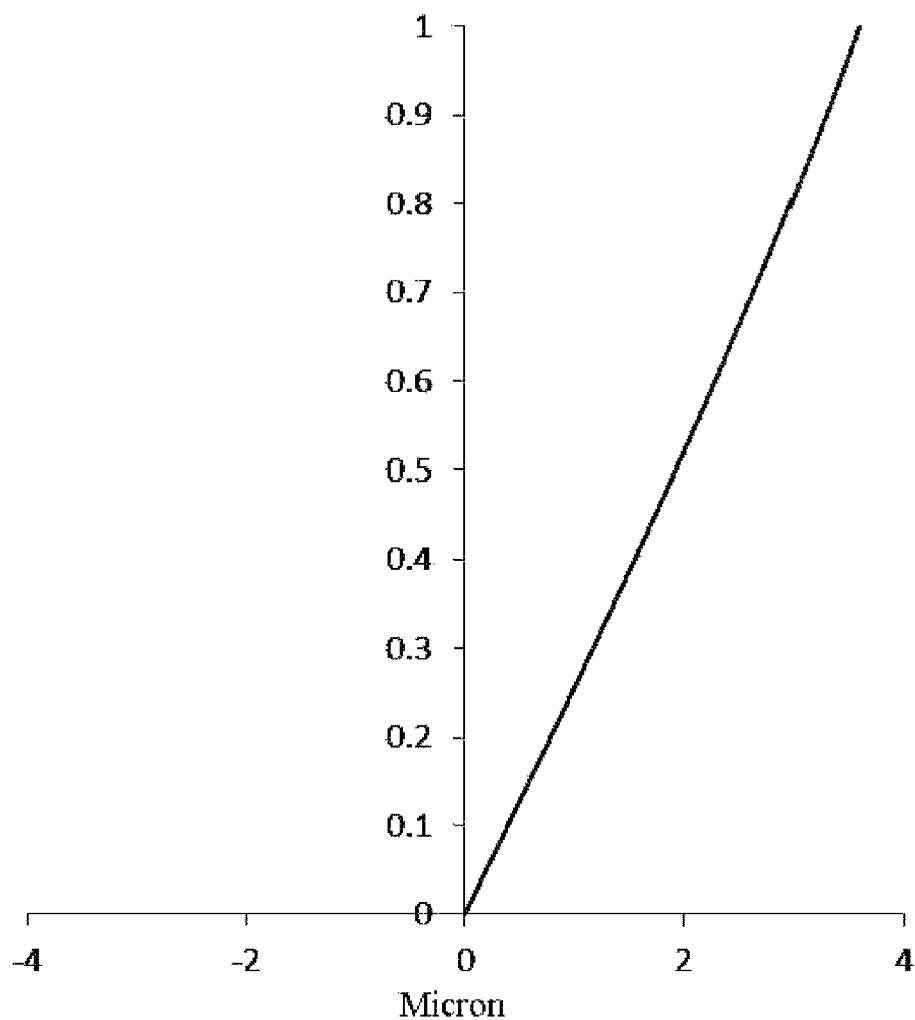

FIG. 10A, FIG. 11A and FIG. 12A show on-axis color curves of a zoom lens group in a telephoto state, an intermediate state and a wide-angle state according to embodiment 2 respectively, and represent converging focus deviations of light of different wavelengths passing through the lens. FIG. 10B, FIG. 11B and FIG. 12B show astigmatism curves of a zoom lens group in a telephoto state, an intermediate state and a wide-angle state according to embodiment 2 respectively, and represent tangential image surface curves and sagittal image surface curves. FIG. 10C, FIG. 11C and FIG. 12C show distortion curves of a zoom lens group in a telephoto state, an intermediate state and a wide-angle state according to embodiment 2 respectively, and represent distortion values corresponding to different image heights. FIG. 10D, FIG. 11D and FIG. 12D show lateral color curves of a zoom lens group in a telephoto state, an intermediate state and a wide-angle state according to embodiment 2 respectively, and represent deviations of different image heights of light passing through the lens on the imaging surface. According to FIG. 10A to FIG. 12D, it can be seen that high imaging quality of the zoom lens group provided in embodiment 2 may be achieved in each state.

Embodiment 3

Figure 13:
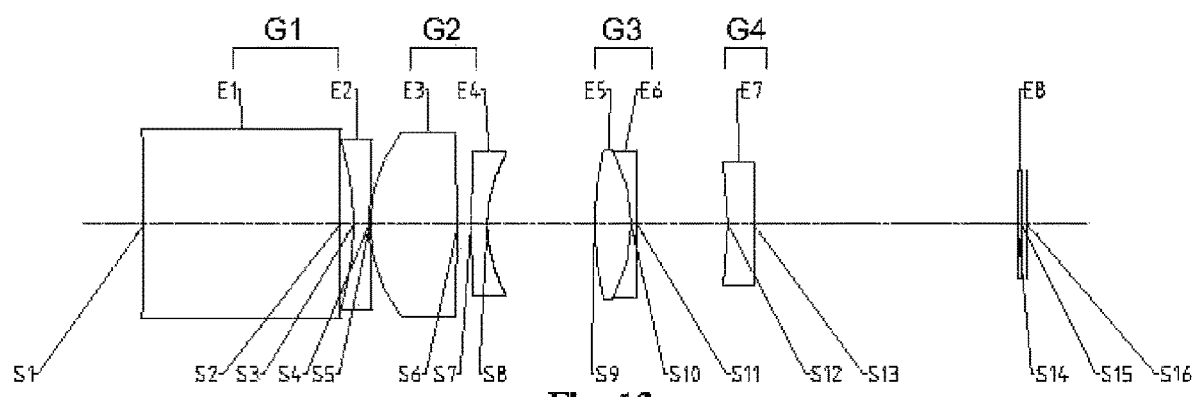
FIG. 13 shows a structure diagram of a zoom lens group in a telephoto state according to embodiment 3 of the disclosure.
Figure 14:
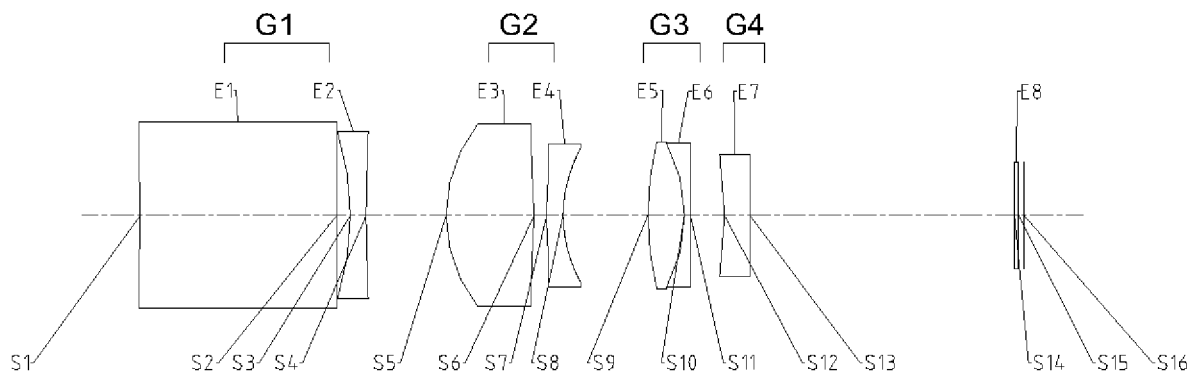
FIG. 14 shows a structure diagram of a zoom lens group in an intermediate state in a process of switching from a telephoto state to a wide-angle state according to embodiment 3 of the disclosure.
Figure 15:
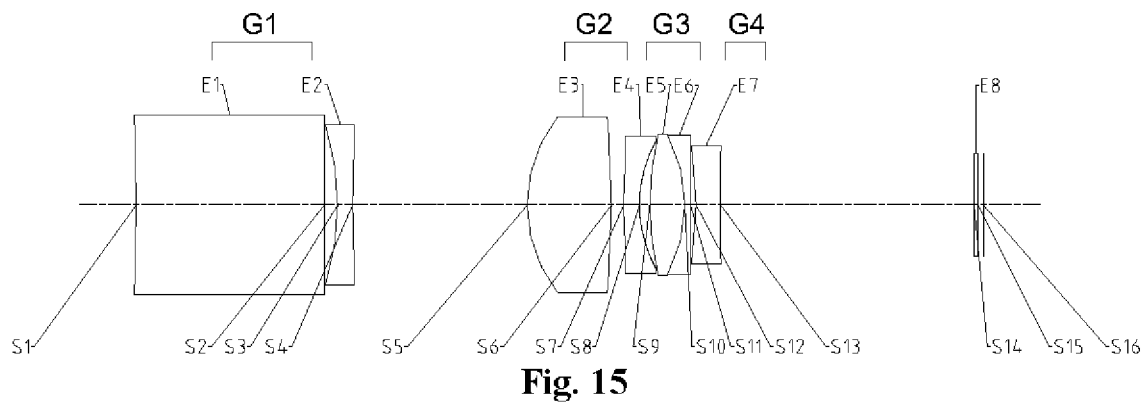
FIG. 15 shows a structure diagram of a zoom lens group in a wide-angle state according to embodiment 3 of the disclosure.

A zoom lens group according to embodiment 3 of the disclosure will be described below with reference to FIG. 13 to FIG. 18D. FIG. 13 is a structure diagram of a zoom lens group in a telephoto state according to embodiment 3 of the disclosure. FIG. 14 is a structure diagram of a zoom lens group in an intermediate state in a process of switching from a telephoto state to a wide-angle state according to embodiment 3 of the disclosure. FIG. 15 is a structure diagram of a zoom lens group in a wide-angle state according to embodiment 3 of the disclosure.

As shown in FIG. 13 to FIG. 15, the zoom lens group sequentially includes, from an object side to an image side, a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S16.

An object-side surface S1 of the first lens E1 is a concave surface, while an image-side surface S2 is a concave surface. An object-side surface S3 of the second lens E2 is a concave surface, while an image-side surface S4 is a concave surface. An object-side surface S5 of the third lens E3 is a convex surface, while an image-side surface S6 is a convex surface. An object-side surface S7 of the fourth lens E4 is a convex surface, while an image-side surface S8 is a concave surface. An object-side surface S9 of the fifth lens E5 is a convex surface, while an image-side surface S10 is a convex surface. An object-side surface S10 of the sixth lens E6 is a concave surface, while an image-side surface S11 is a concave surface. An object-side surface S12 of the seventh lens E7 is a concave surface, while an image-side surface S13 is a concave surface. The optical filter E8 has an object-side surface S14 and an image-side surface S15. Light from an object sequentially penetrates through each of the surfaces S1 to S15 and is finally imaged on the imaging surface S16.

Table 7 is a basic parameter table of the zoom lens group of embodiment 3, and units of the curvature radius and the thickness/distance therein are all millimeter (mm).

TABLE 7

| Surface number | Surface type | Curvature radius | Thickness/ distance | Material Refractive index | Material Abbe number | Conic coefficient |
|---|---|---|---|---|---|---|
| OBJ | Spherical | Infinite | Infinite | | | |
| S1 | Spherical | −145.4100 | 10.0000 | 1.52 | 64.2 | |
| S2 | Spherical | 381.1596 | 0.6997 | | | |
| S3 | Spherical | −14.3470 | 0.8000 | 1.60 | 65.3 | |
| S4 | Spherical | 83.3314 | D4 | | | |
| S5(STO) | Spherical | 7.6216 | 4.4687 | 1.75 | 52.3 | |
| S6 | Spherical | −51.0603 | 0.6524 | | | |
| S7 | Aspherical | 18.2569 | 0.8383 | 1.67 | 20.4 | 0.0000 |
| S8 | Aspherical | 6.3542 | D8 | | | 0.0000 |

TABLE 7-continued

| Surface number | Surface type | Curvature radius | Thickness/ distance | Material Refractive index | Abbe number | Conic coefficient |
|---|---|---|---|---|---|---|
| S9 | Spherical | 16.0267 | 1.8626 | 1.70 | 38.6 | |
| S10 | Spherical | −7.9158 | 0.3000 | 1.55 | 72.1 | |
| S11 | Spherical | 1354.5570 | D11 | | | |
| S12 | Spherical | −20.2974 | 1.3000 | 1.92 | 21.5 | |
| S13 | Spherical | 600.4542 | 13.4557 | | | |
| S14 | Spherical | Infinite | 0.2100 | 1.52 | 64.2 | |
| S15 | Spherical | Infinite | 0.2900 | | | |
| S16 | Spherical | Infinite | | | | |

In the example, a spacing distance D4 of the first lens group and the second lens group on an optical axis, a spacing distance D8 of the second lens group and the third lens group on the optical axis and a spacing distance D11 of the third lens group and the fourth lens group on the optical axis are changed to switch the zoom lens group from a telephoto state to a wide-angle state or from the wide-angle state to the telephoto state. A total effective focal length f, F-number Fno and maximum field of view FOV of the zoom lens group, a total length TTL of the zoom lens group and ImgH (ImgH is a half of a diagonal length of an effective pixel region on the imaging surface S16 of the zoom lens group) change with switching of the zoom lens group from the telephoto state to the wide-angle state or from the wide-angle state to the telephoto state.

Table 8 shows each parameter of the zoom lens group according to embodiment 3 in different states, units of f, TTL, ImgH, D4, D8 and D11 therein are all millimeter (mm), and the unit of FOV is degree)(°).

TABLE 8

| Each parameter | Telephoto state | Intermediate state | Wide-angle state |
|---|---|---|---|
| f | 29.90 | 21.94 | 14.97 |
| Fno | 3.81 | 3.34 | 2.77 |
| FOV | 10.4 | 14.2 | 20.9 |
| TTL | 45.00 | 45.00 | 45.00 |
| ImgH | 2.72 | 2.72 | 2.72 |
| D4 | 0.03 | 4.07 | 9.27 |
| D8 | 5.48 | 4.31 | 0.55 |
| D11 | 4.61 | 1.74 | 0.30 |

Table 9 shows high-order coefficients applied to each aspherical mirror surface in embodiment 3. A surface type of each aspherical mirror surface may be defined by the formula (1) given in embodiment 1.

TABLE 9

| Surface number | A4 | A6 | A8 | A10 | A12 | A14 | A16 |
|---|---|---|---|---|---|---|---|
| S7 | −2.2700E−03 | 6.4089E−05 | −1.2382E−06 | 5.9809E−09 | −2.1424E−10 | 3.6939E−12 | −2.1899E−13 |
| S8 | −1.7900E−03 | 8.6324E−05 | −5.2203E−07 | −1.1815E−09 | 1.3198E−10 | 6.4118E−12 | 0.0000E+00 |

Figure 16A:
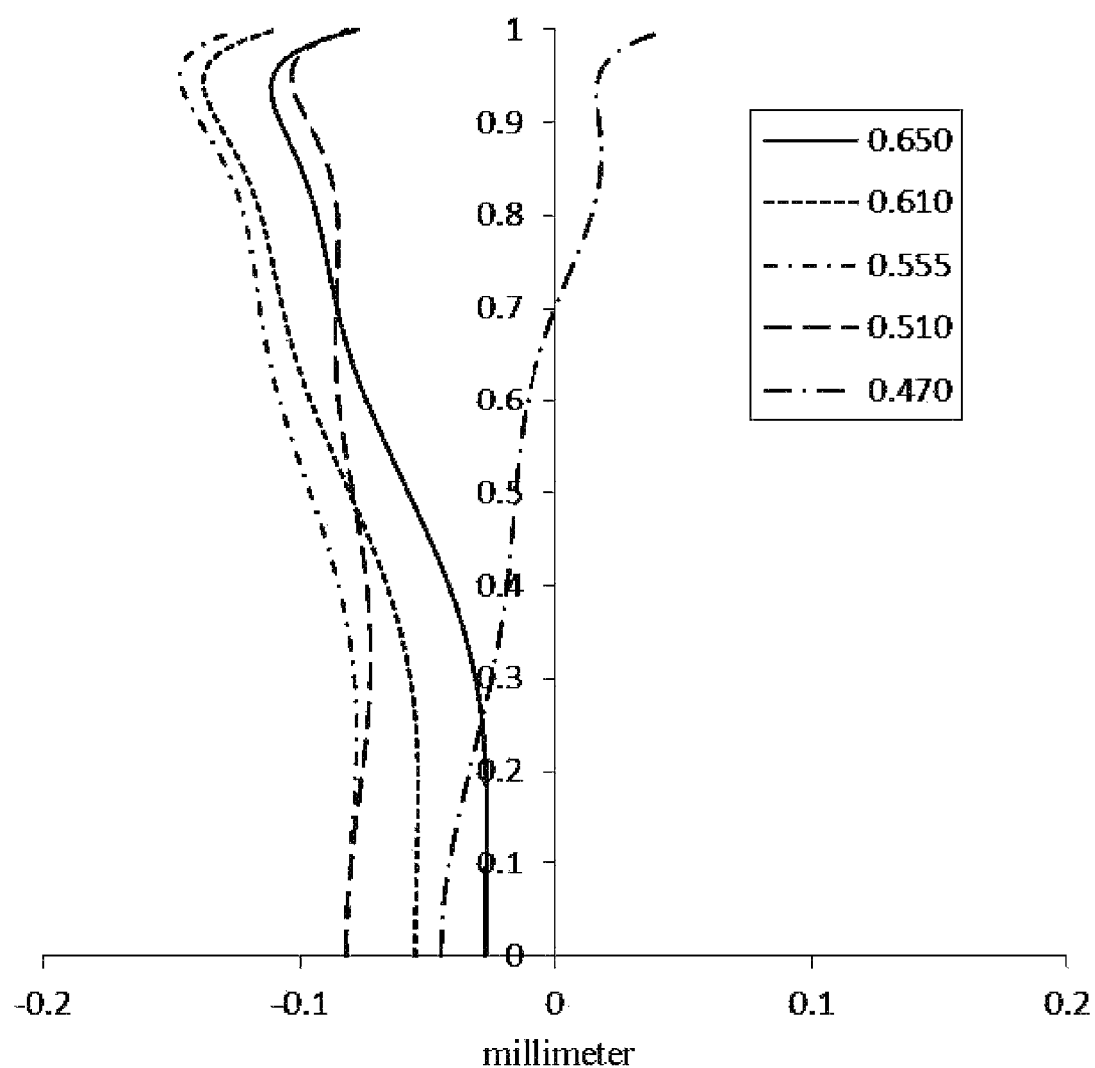
FIG. 16A to FIG. 16D show a longitudinal aberration curve, astigmatism curve, distortion curve and lateral color curve of a zoom lens group in a telephoto state according to embodiment 3 respectively.
Figure 16B:
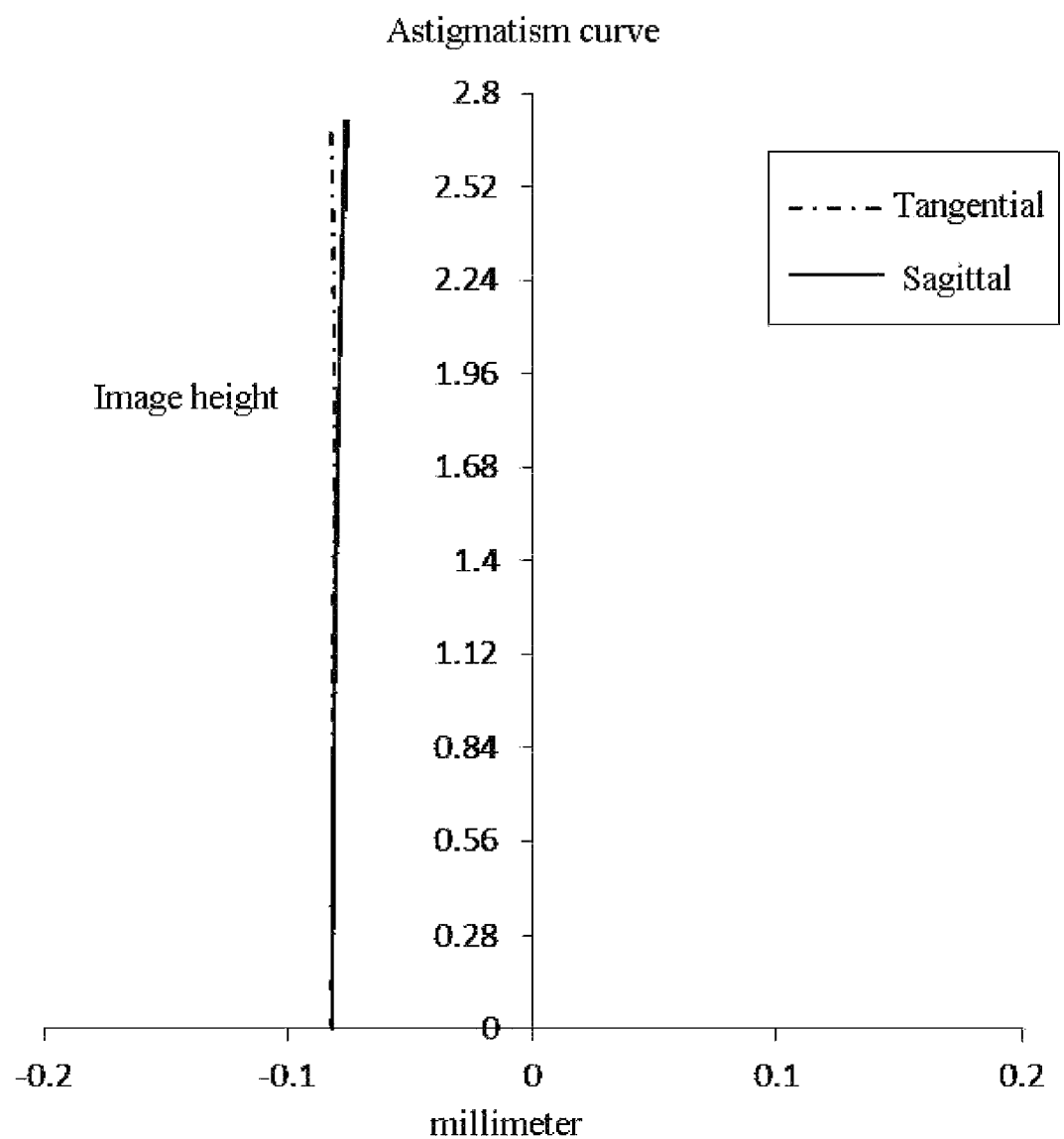
Figure 16C:
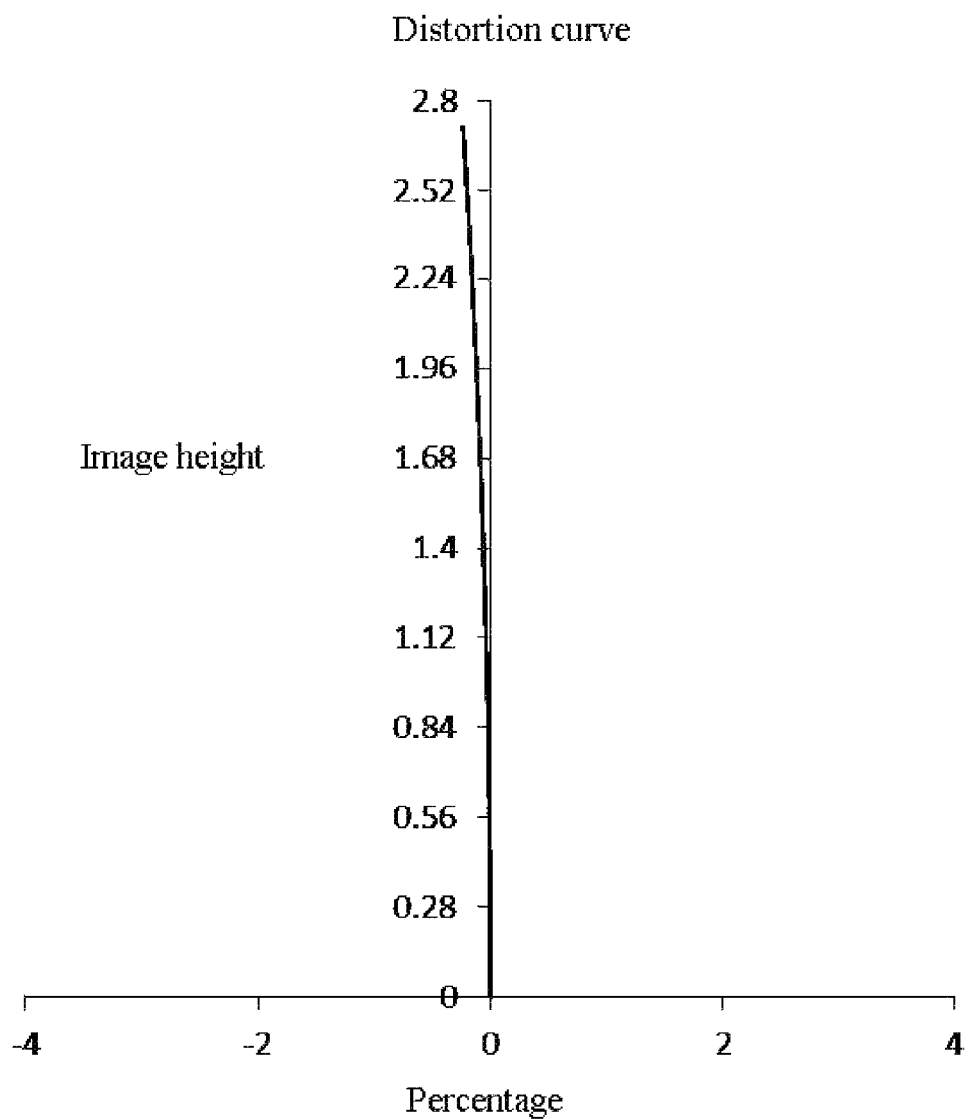
Figure 16D:
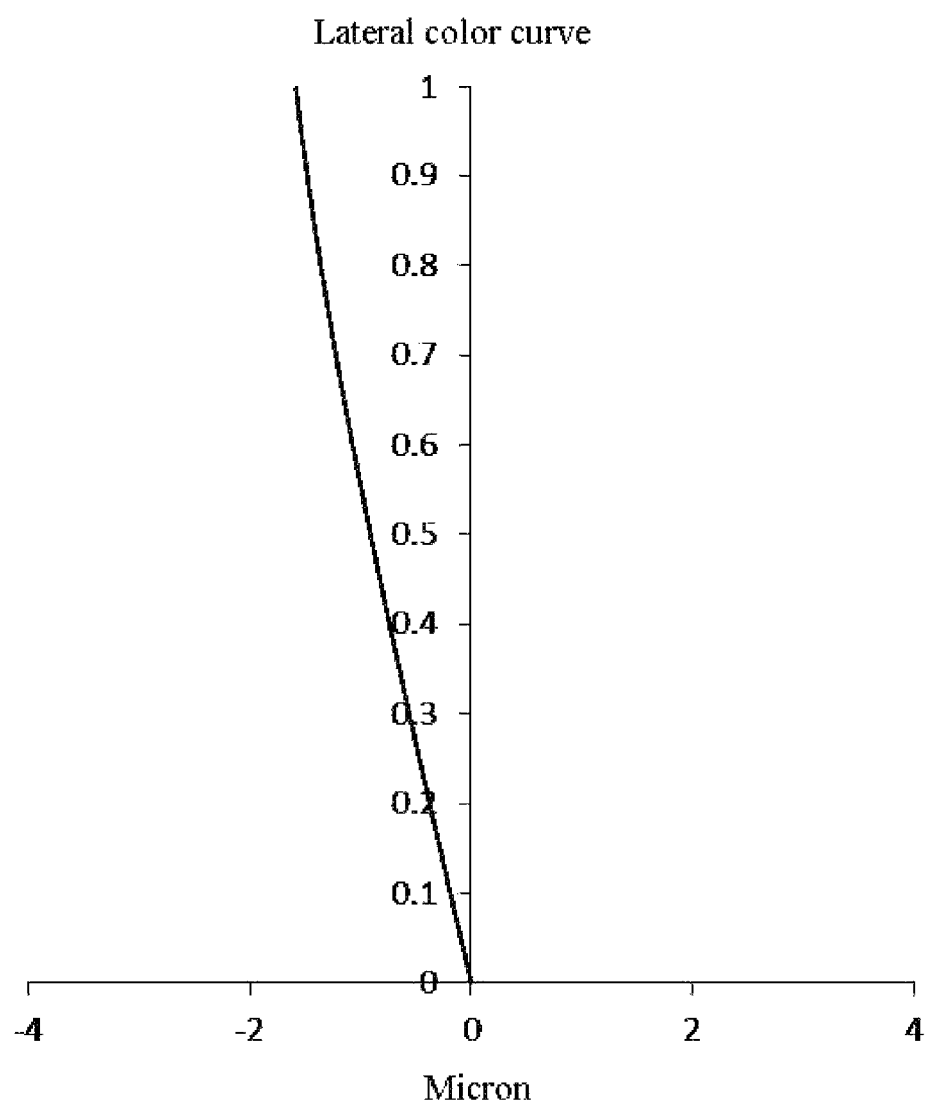
Figure 17A:
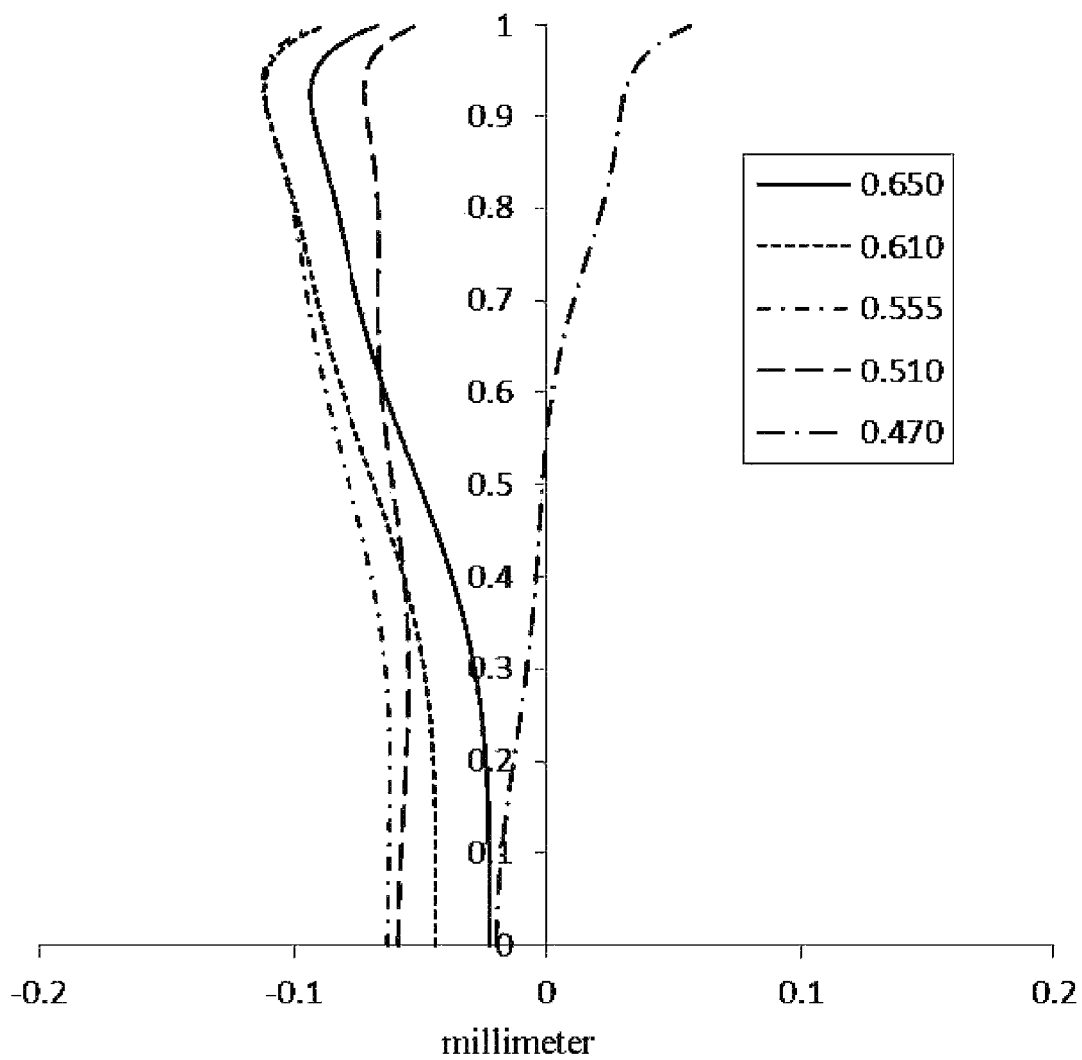
FIG. 17A to FIG. 17D show a longitudinal aberration curve, astigmatism curve, distortion curve and lateral color curve of a zoom lens group in an intermediate state in a process of switching from a telephoto state to a wide-angle state according to embodiment 3 respectively.
Figure 17B:
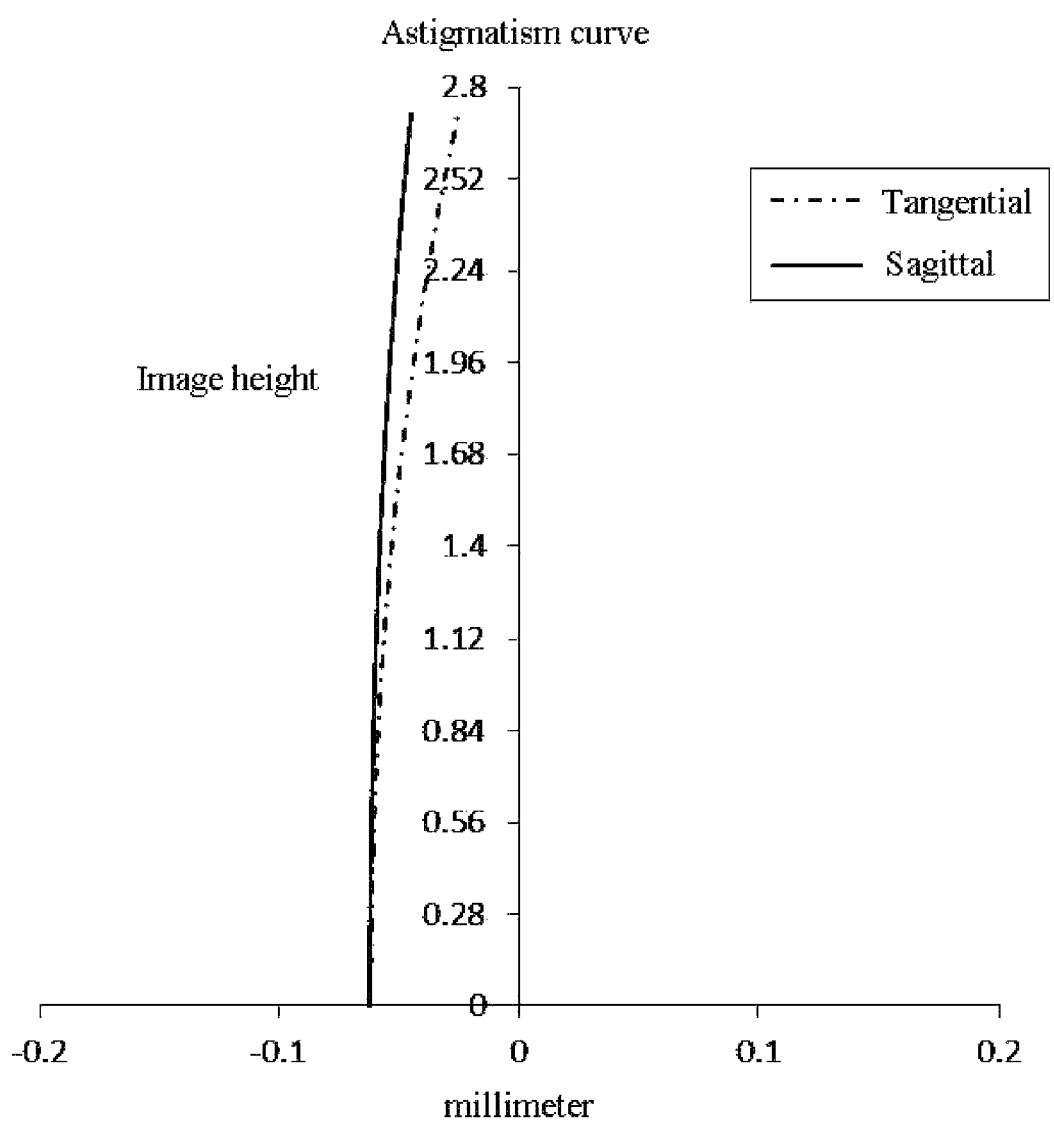
Figure 17C:
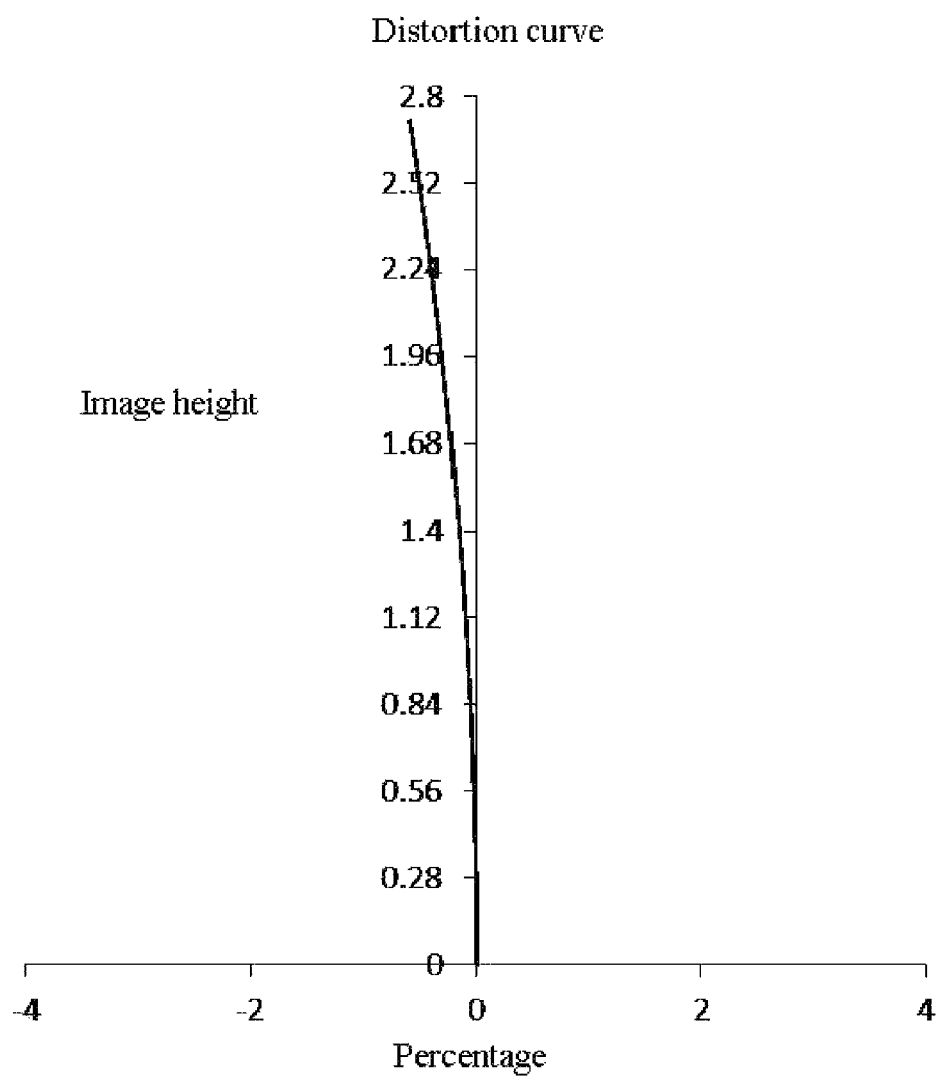
Figure 17D:
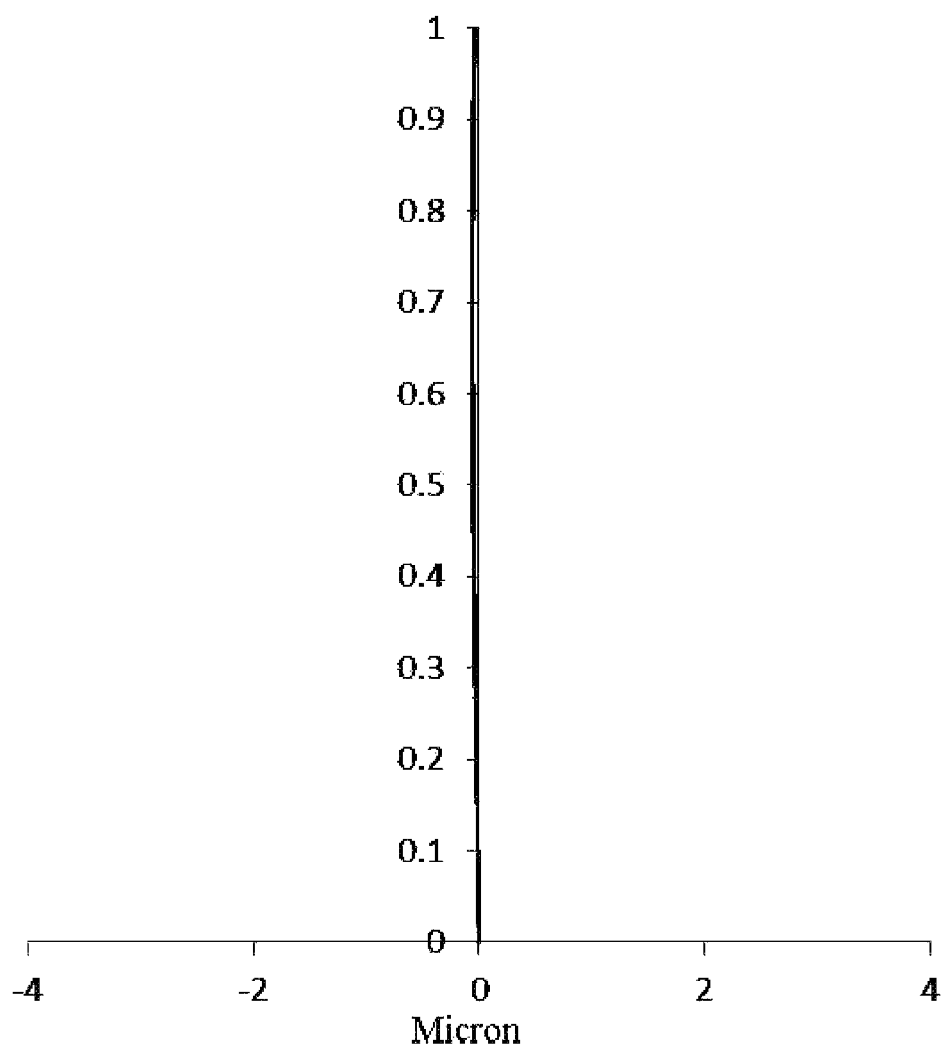
Figure 18A:
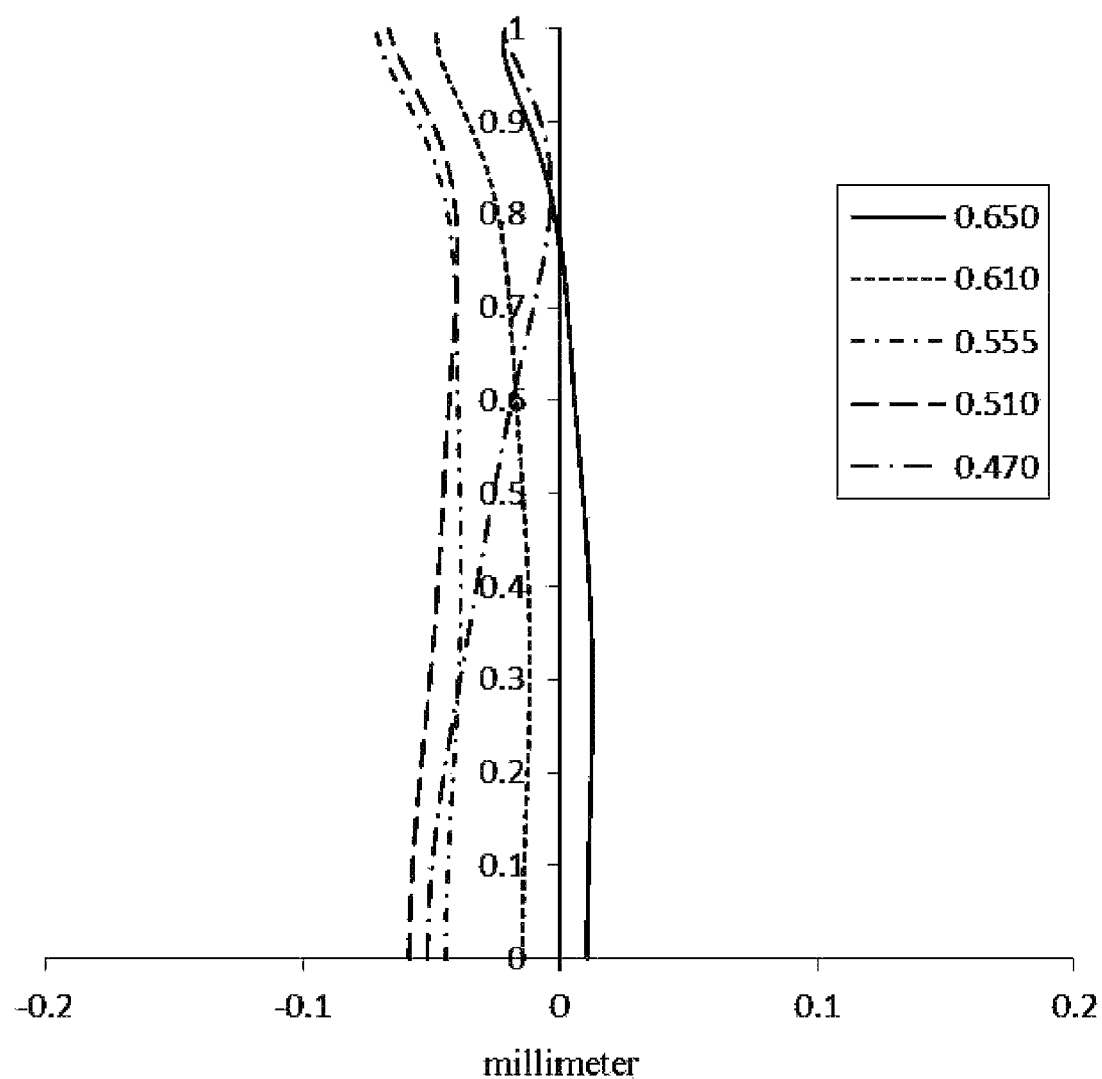
FIG. 18A to FIG. 18D show a longitudinal aberration curve, astigmatism curve, distortion curve and lateral color curve of a zoom lens group in a wide-angle state according to embodiment 3 respectively.
Figure 18B:
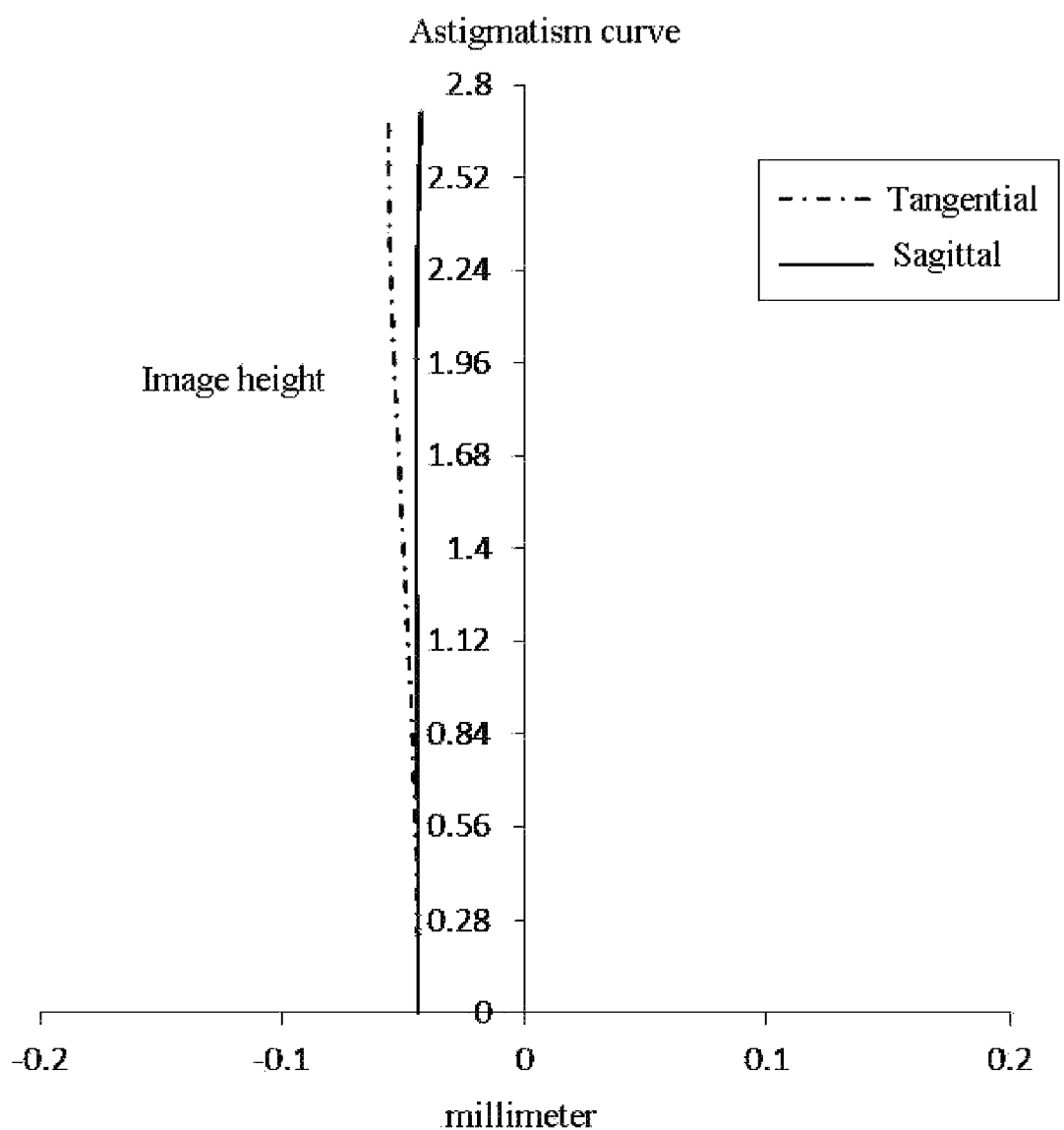
Figure 18C:
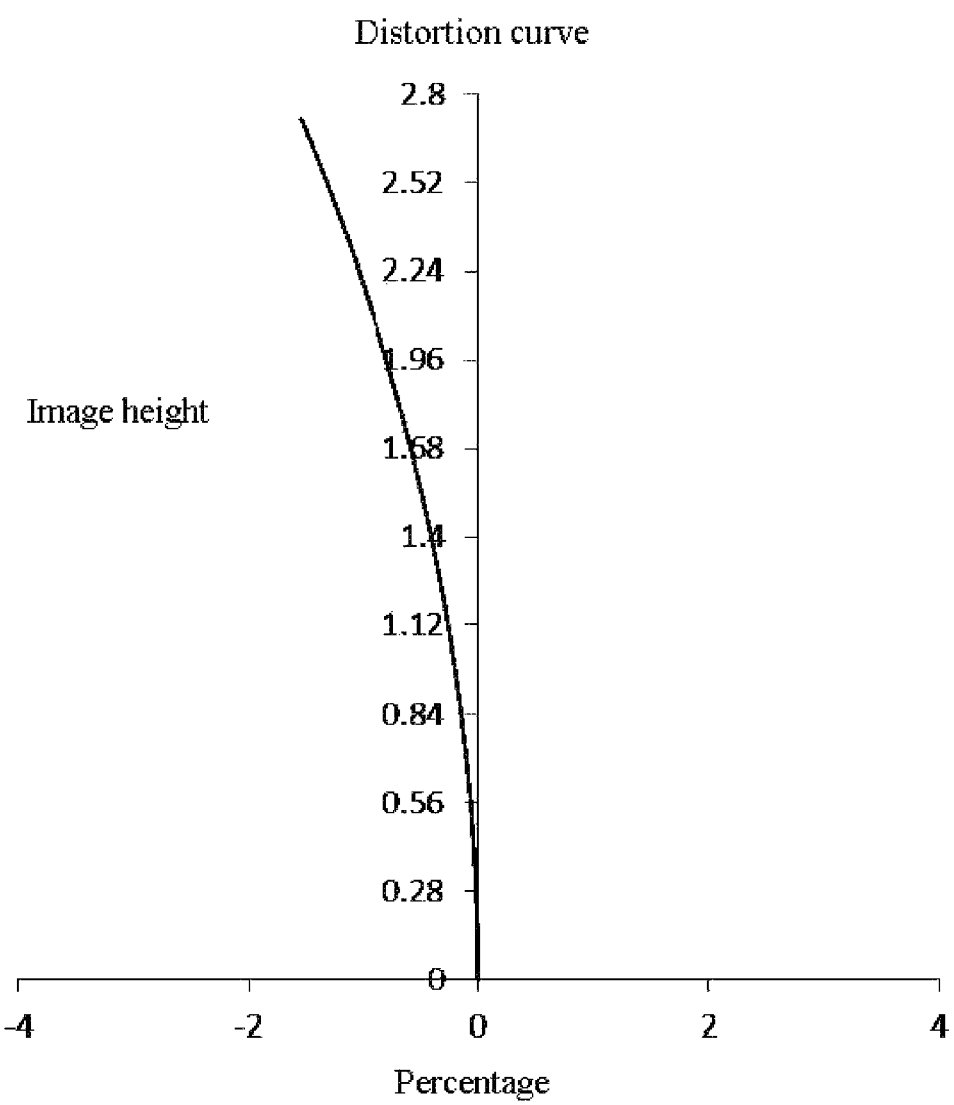
Figure 18D:
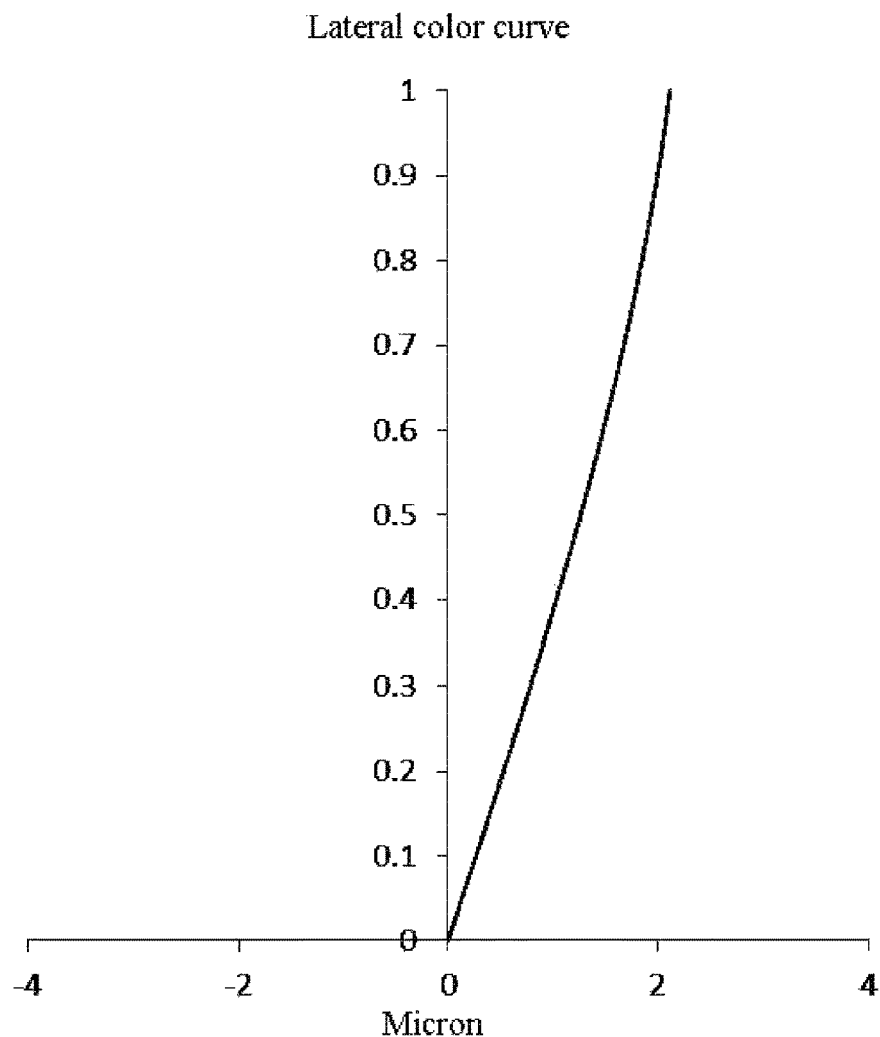

FIG. 16A, FIG. 17A and FIG. 18A show on-axis color curves of a zoom lens group in a telephoto state, an intermediate state and a wide-angle state according to embodiment 3 respectively, and represent converging focus deviations of light of different wavelengths passing through the lens. FIG. 16B, FIG. 17B and FIG. 18B show astigmatism curves of a zoom lens group in a telephoto state, an intermediate state and a wide-angle state according to embodiment 3 respectively, and represent tangential image surface curves and sagittal image surface curves. FIG. 16C, FIG. 17C and FIG. 18C show distortion curves of a zoom lens group in a telephoto state, an intermediate state and a wide-angle state according to embodiment 3 respectively, and represent distortion values corresponding to different image heights. FIG. 16D, FIG. 17D and FIG. 18D show lateral color curves of a zoom lens group in a telephoto state, an intermediate state and a wide-angle state according to embodiment 3 respectively, and represent deviations of different image heights of light passing through the lens on the imaging surface. According to FIG. 16A to FIG. 18D, it can be seen that high imaging quality of the zoom lens group provided in embodiment 3 may be achieved in each state.

Embodiment 4

Figure 19:
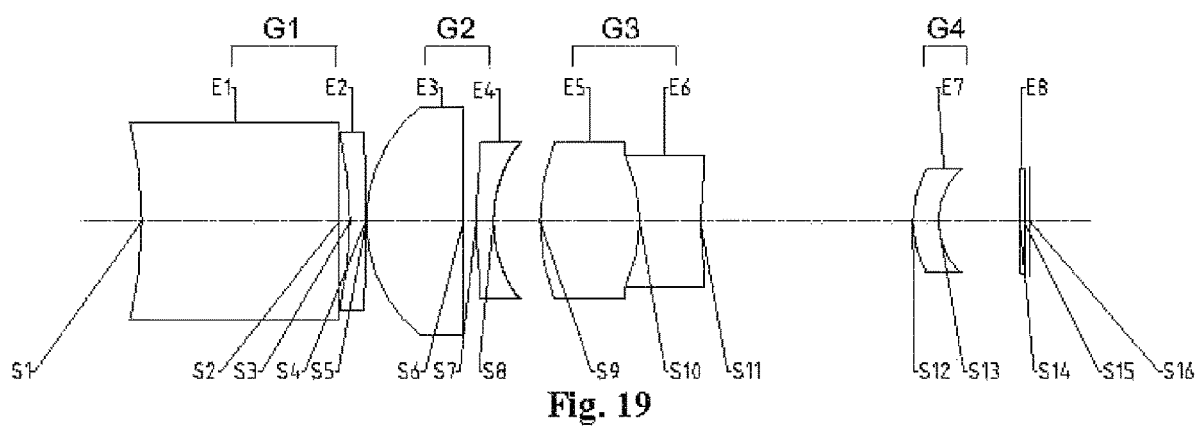
FIG. 19 shows a structure diagram of a zoom lens group in a telephoto state according to embodiment 4 of the disclosure.
Figure 20:
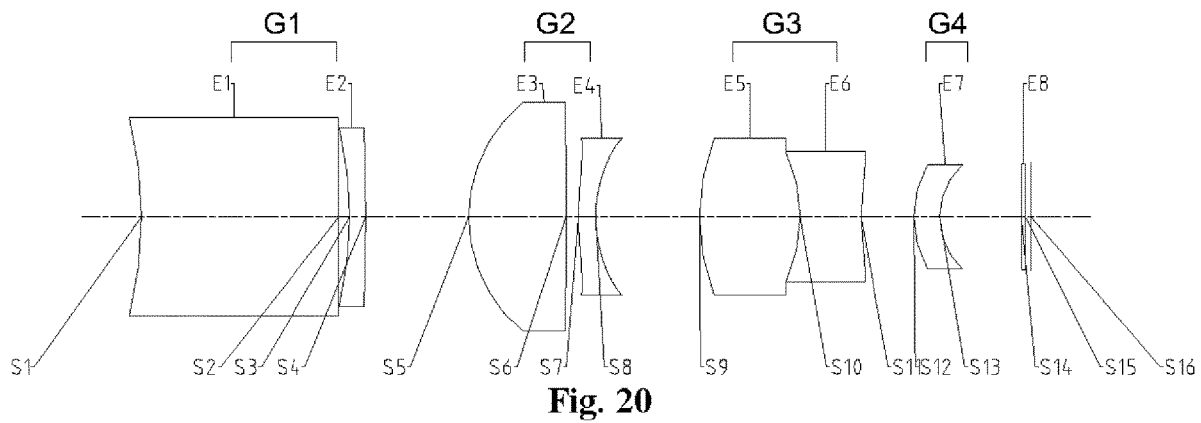
FIG. 20 shows a structure diagram of a zoom lens group in an intermediate state in a process of switching from a telephoto state to a wide-angle state according to embodiment 4 of the disclosure.
Figure 21:
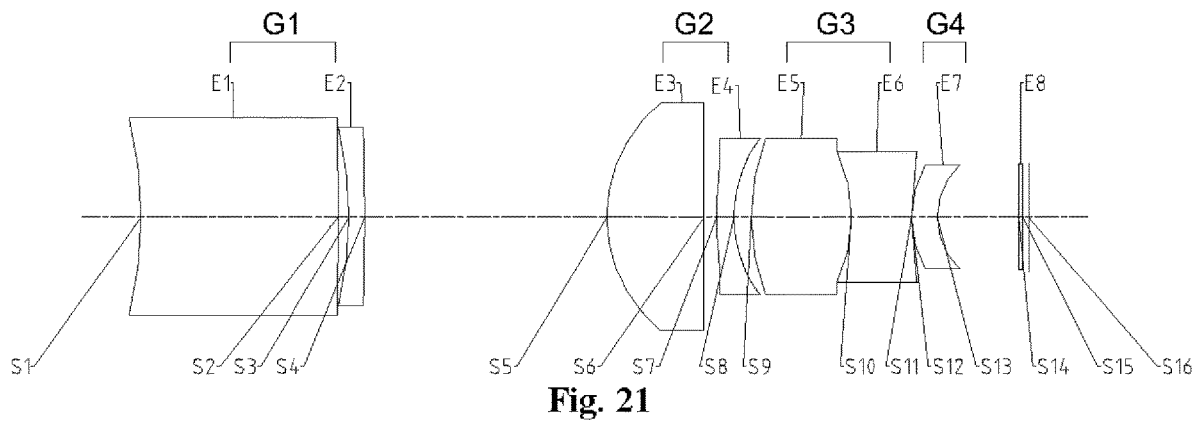
FIG. 21 shows a structure diagram of a zoom lens group in a wide-angle state according to embodiment 4 of the disclosure.

A zoom lens group according to embodiment 4 of the disclosure will be described below with reference to FIG. 19 to FIG. 24D. FIG. 19 is a structure diagram of a zoom lens group in a telephoto state according to embodiment 4 of the disclosure. FIG. 20 is a structure diagram of a zoom lens group in an intermediate state in a process of switching from a telephoto state to a wide-angle state according to embodiment 4 of the disclosure. FIG. 21 is a structure diagram of a zoom lens group in a wide-angle state according to embodiment 4 of the disclosure.

As shown in FIG. 19 to FIG. 21, the zoom lens group sequentially includes, from an object side to an image side, a first lens group G1 (a first lens E1 and a second lens E2), a second lens group G2 (a third lens E3 and a fourth lens E4), a third lens group G3 (a fifth lens E5 and a sixth lens E6), a fourth lens group G4 (a seventh lens E7), an optical filter E8 and an imaging surface S16.

An object-side surface S1 of the first lens E1 is a concave surface, while an image-side surface S2 is a convex surface. An object-side surface S3 of the second lens E2 is a concave surface, while an image-side surface S4 is a convex surface. An object-side surface S5 of the third lens E3 is a convex surface, while an image-side surface S6 is a convex surface. An object-side surface S7 of the fourth lens E4 is a convex surface, while an image-side surface S8 is a concave surface. An object-side surface S9 of the fifth lens E5 is a convex surface, while an image-side surface S10 is a convex surface. An object-side surface S10 of the sixth lens E6 is a concave surface, while an image-side surface S11 is a concave surface. An object-side surface S12 of the seventh lens E7 is a convex surface, while an image-side surface S13 is a concave surface. The optical filter E8 has an object-side surface S14 and an image-side surface S15. Light from an object sequentially penetrates through each of the surfaces S1 to S15 and is finally imaged on the imaging surface S16.

Table 10 is a basic parameter table of the zoom lens group of embodiment 4, and units of the curvature radius and the thickness/distance therein are all millimeter (mm).

TABLE 10

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Spherical | −20.8250 | 10.0000 | 1.52 | 64.2 | |
| S2 | Spherical | −783.5510 | 0.5482 | | | |
| S3 | Spherical | −19.1824 | 0.8000 | 1.75 | 52.3 | |
| S4 | Spherical | −145.5140 | D4 | | | |
| S5(STO) | Spherical | 7.4549 | 4.9152 | 1.76 | 47.6 | |
| S6 | Spherical | −680.2040 | 0.6333 | | | |
| S7 | Aspherical | 14.1801 | 0.8916 | 1.67 | 20.4 | 0.0000 |
| S8 | Aspherical | 6.0927 | D8 | | | 0.0000 |
| S9 | Spherical | 11.0755 | 5.0764 | 1.64 | 58.8 | |
| S10 | Spherical | −7.7682 | 3.0720 | 1.63 | 62.6 | |
| S11 | Spherical | 19.7134 | D11 | | | |
| S12 | Spherical | 5.2901 | 1.3000 | 1.58 | 42.9 | |
| S13 | Spherical | 3.5795 | 4.1205 | | | |
| S14 | Spherical | Infinite | 0.2100 | 1.52 | 64.2 | |
| S15 | Spherical | Infinite | 0.2900 | | | |
| S16 | Spherical | Infinite | | | | |

In the example, a spacing distance D4 of the first lens group and the second lens group on an optical axis, a spacing distance D8 of the second lens group and the third lens group on the optical axis and a spacing distance D11 of the third lens group and the fourth lens group on the optical axis are changed to switch the zoom lens group from a telephoto state to a wide-angle state or from the wide-angle state to the telephoto state. A total effective focal length f, F-number Fno and maximum field of view FOV of the zoom lens group, a total length TTL of the zoom lens group and ImgH (ImgH is a half of a diagonal length of an effective pixel region on the imaging surface S16 of the zoom lens group) change with switching of the zoom lens group from the telephoto state to the wide-angle state or from the wide-angle state to the telephoto state.

Table 11 shows each parameter of the zoom lens group according to embodiment 4 in different states, units of f, TTL, ImgH, D4, D8 and D11 therein are all millimeter (mm), and the unit of FOV is degree(°).

TABLE 11

| Each parameter | Telephoto state | Intermediate state | Wide-angle state |
|---|---|---|---|
| f | 27.18 | 15.71 | 9.09 |
| Fno | 3.81 | 2.85 | 1.96 |
| FOV | 10.9 | 19.2 | 34.2 |
| TTL | 45.00 | 45.00 | 45.00 |
| ImgH | 2.72 | 2.72 | 2.72 |

TABLE 11-continued

| Each parameter | Telephoto state | Intermediate state | Wide-angle state |
|---|---|---|---|
| D4 | 0.03 | 5.20 | 12.28 |
| D8 | 2.34 | 5.25 | 0.86 |
| D11 | 10.77 | 2.70 | 0.00 |

Table 12 shows high-order coefficients $A_4$, $A_6$, $A_8$, $A_{10}$, $A_{12}$, $A_{14}$, $A_{16}$, $A_{18}$ and $A_{20}$ applied to each aspherical mirror surface in embodiment 4. A surface type of each aspherical mirror surface may be defined by the formula (1) given in embodiment 1.

TABLE 12

| Surface number | A4 | A6 | A8 | A10 | A12 |
|---|---|---|---|---|---|
| S7 | −2.3600E−03 | 6.2320E−05 | −1.1313E−06 | 4.4893E−09 | −5.8635E−11 |
| S8 | −1.8800E−03 | 8.1984E−05 | 5.1453E−07 | −2.6891E−08 | 9.2734E−11 |

| Surface number | A14 | A16 | A18 | A20 |
|---|---|---|---|---|
| S7 | −6.0481E−12 | 1.8487E−13 | −5.9618E−15 | 0.0000E+00 |
| S8 | 6.7969E−11 | −4.2829E−12 | 1.5966E−13 | −2.2922E−15 |

Figure 22A:
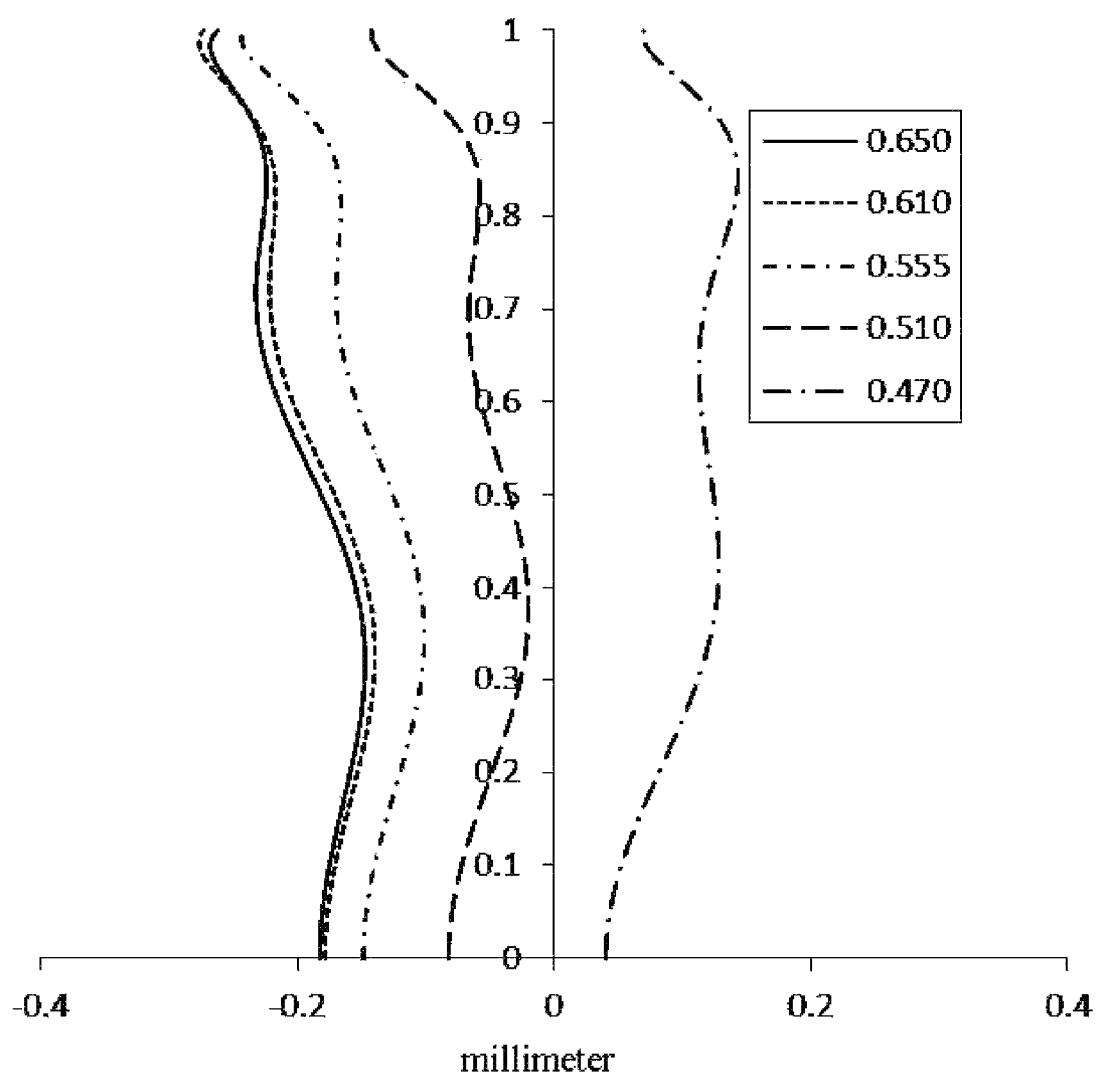
FIG. 22A to FIG. 22D show a longitudinal aberration curve, astigmatism curve, distortion curve and lateral color curve of a zoom lens group in a telephoto state according to embodiment 4 respectively.
Figure 22B:
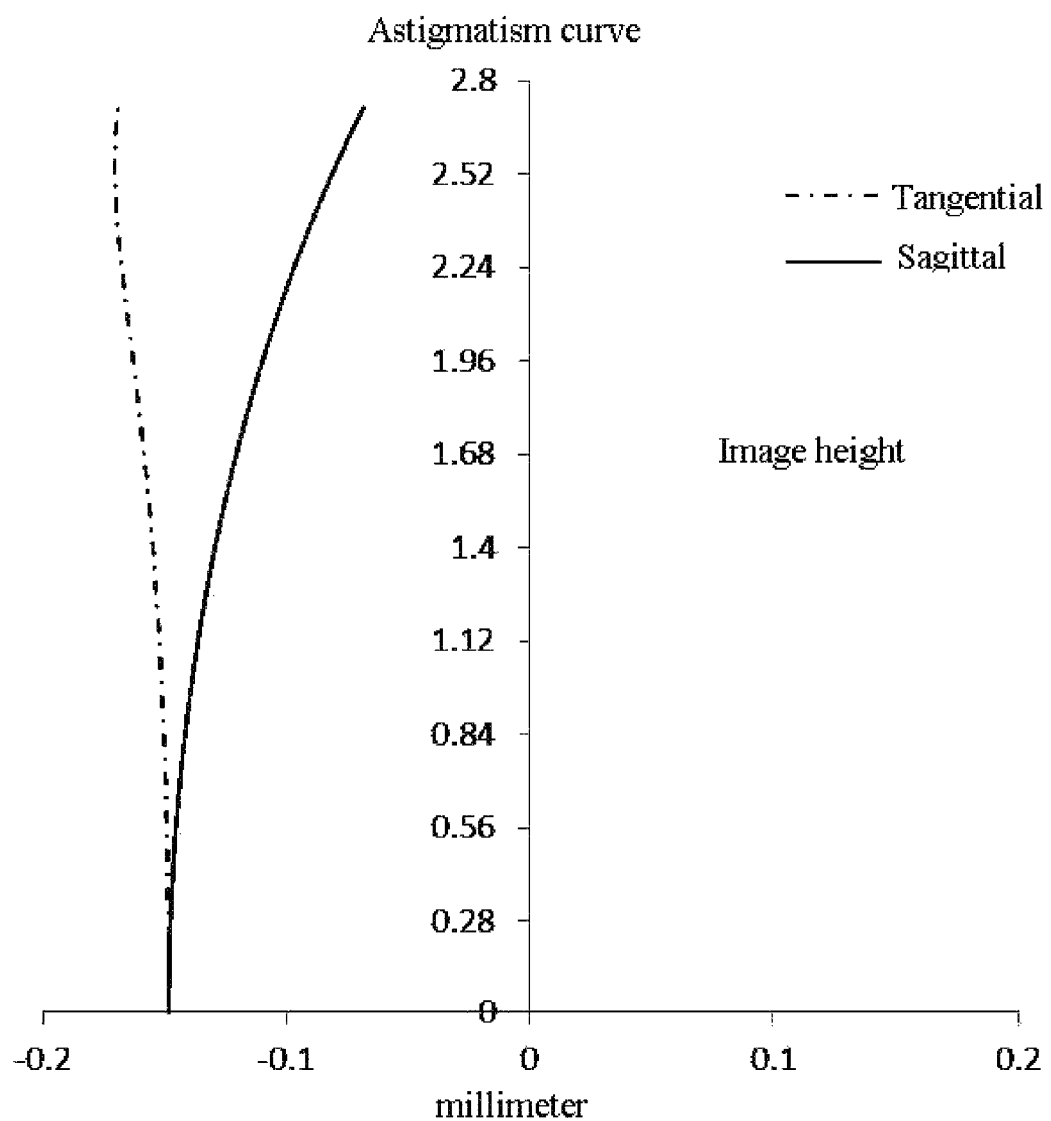
Figure 22C:
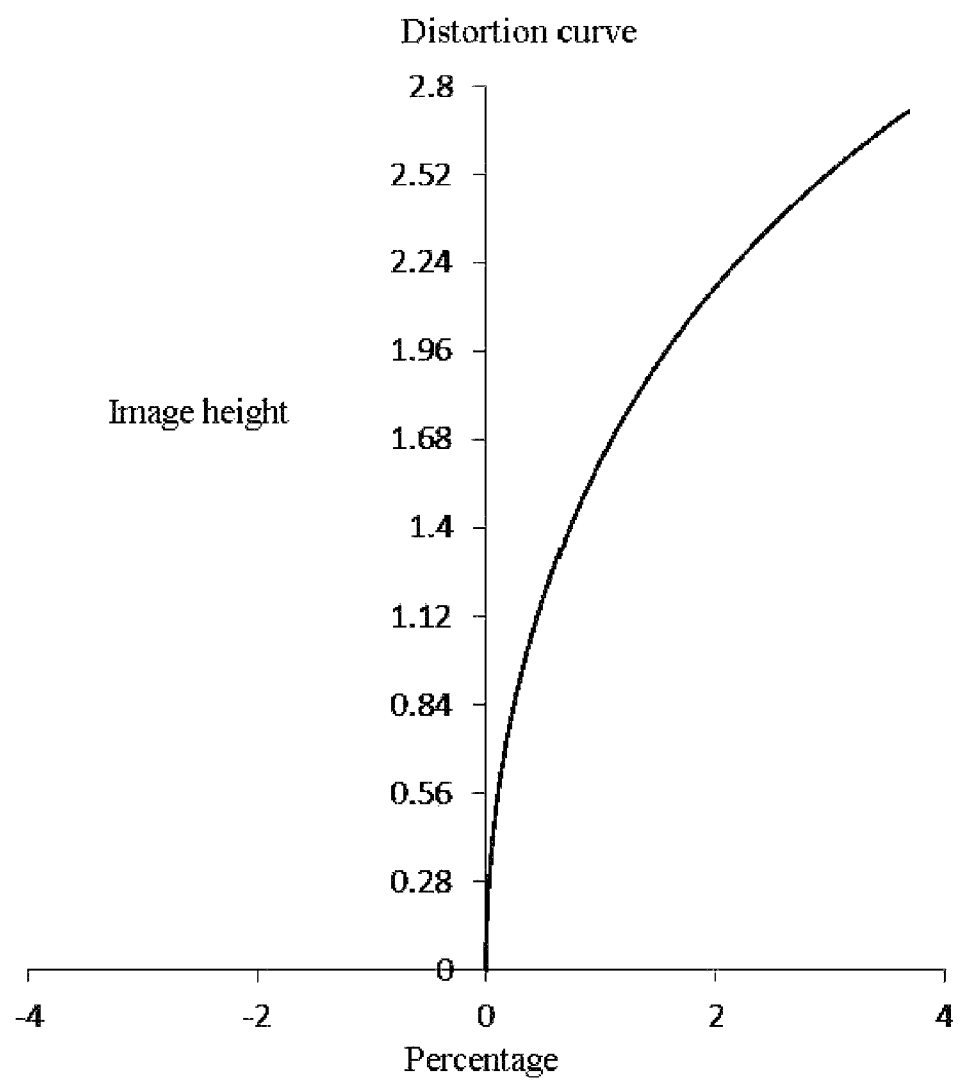
Figure 22D:
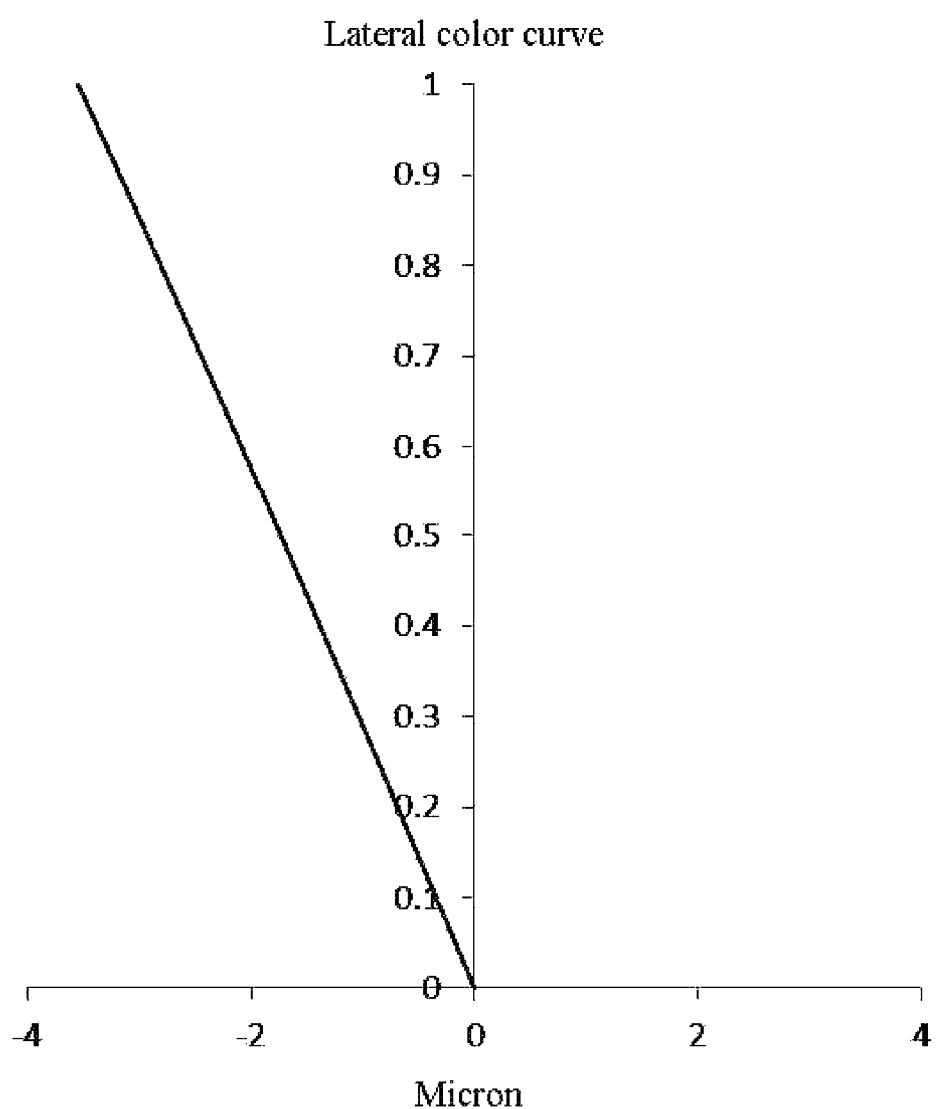
Figure 23A:
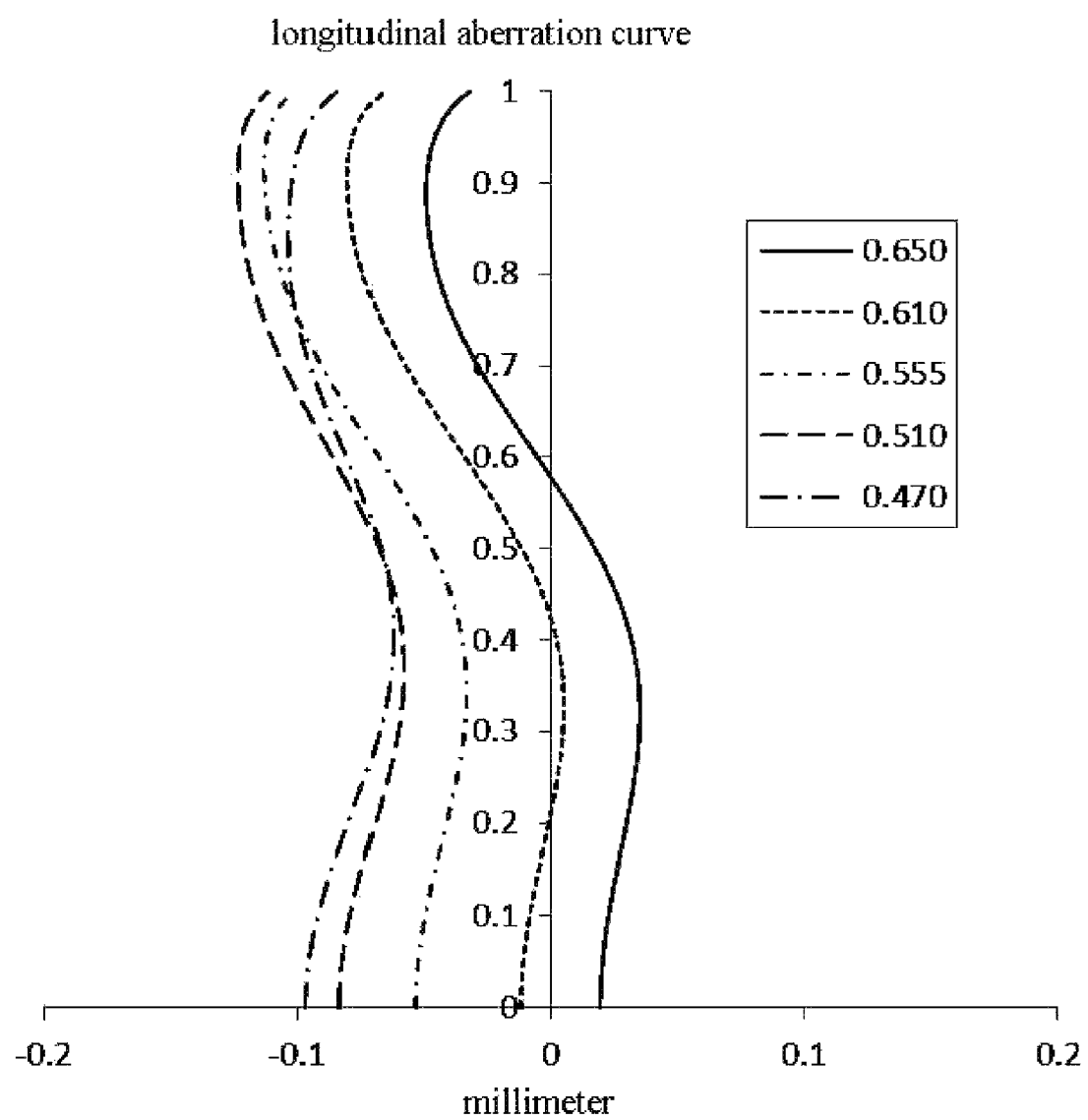
FIG. 23A to FIG. 23D show a longitudinal aberration curve, astigmatism curve, distortion curve and lateral color curve of a zoom lens group in an intermediate state in a process of switching from a telephoto state to a wide-angle state according to embodiment 4 respectively.
Figure 23B:
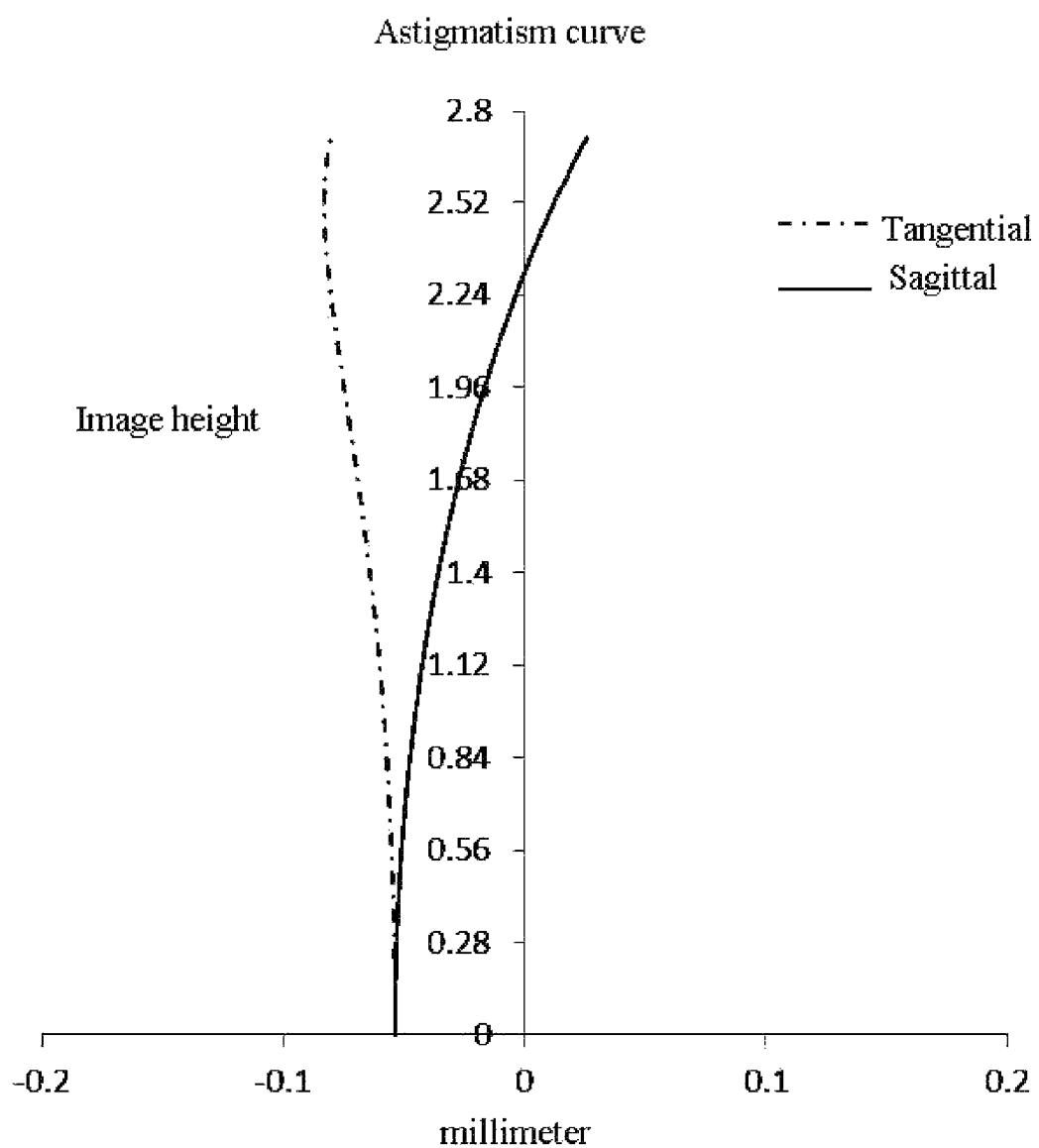
Figure 23C:
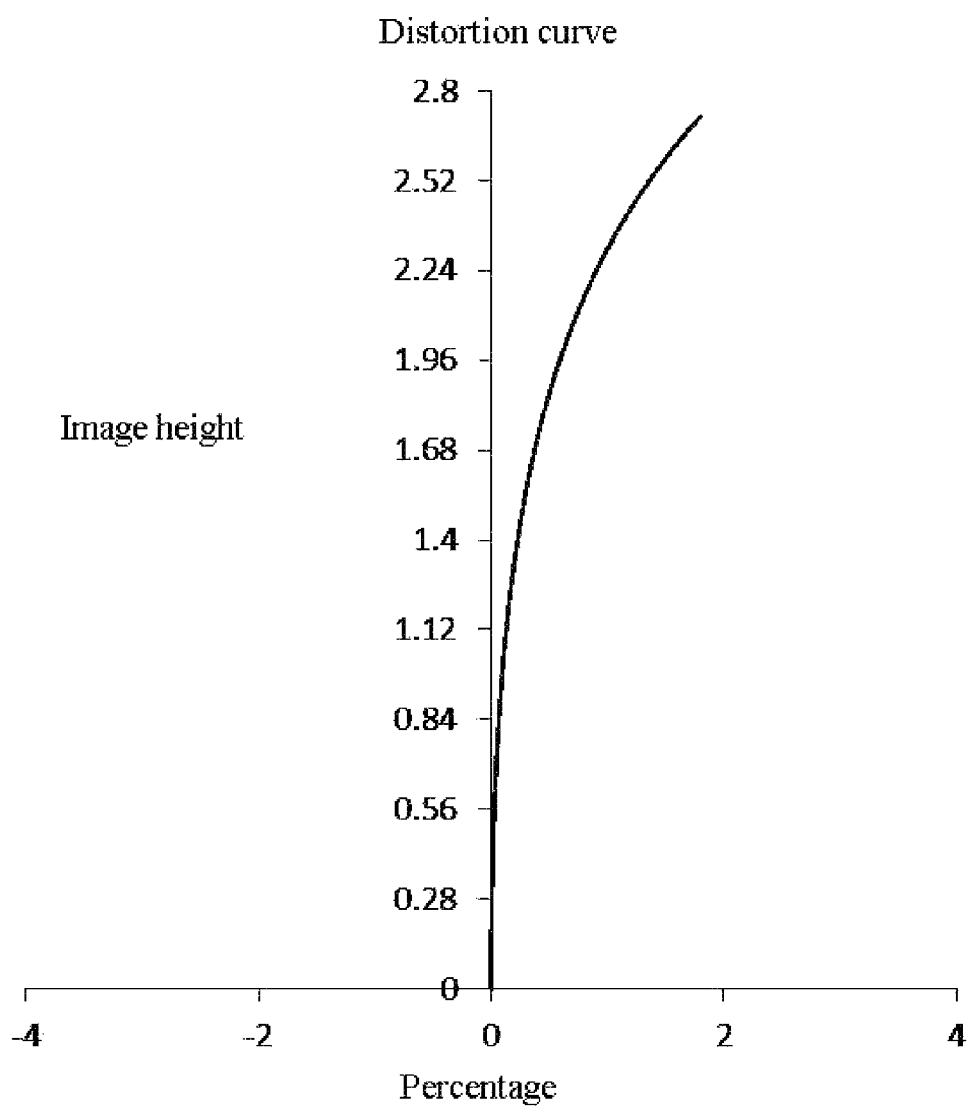
Figure 23D:
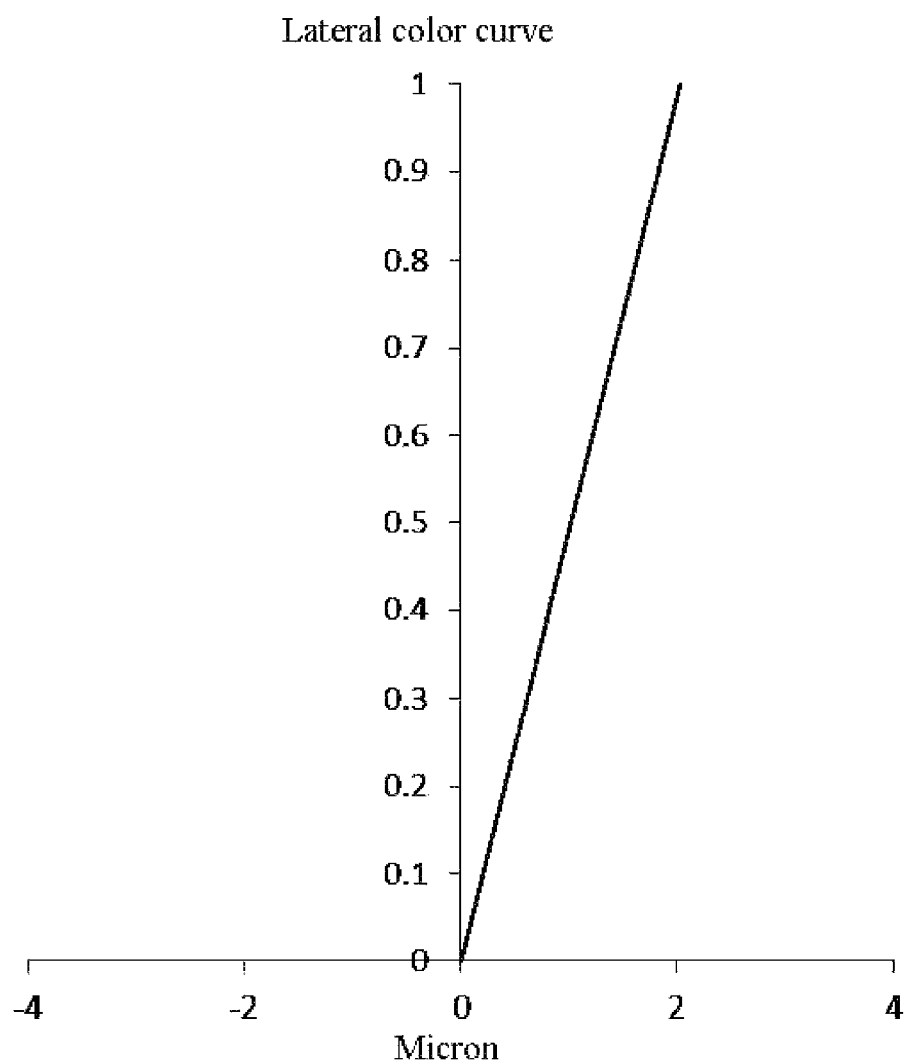
Figure 24A:
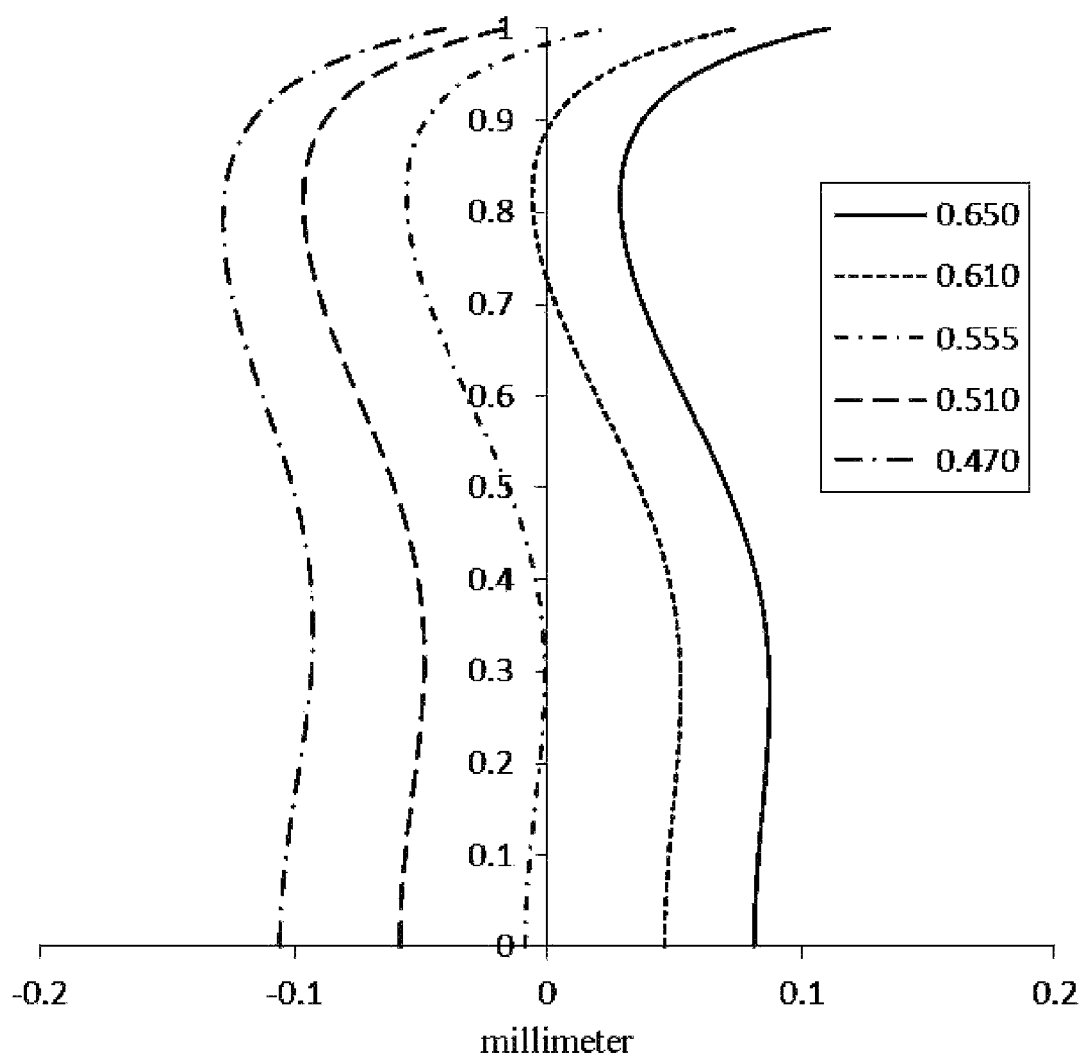
FIG. 24A to FIG. 24D show a longitudinal aberration curve, astigmatism curve, distortion curve and lateral color curve of a zoom lens group in a wide-angle state according to embodiment 4 respectively.
Figure 24B:
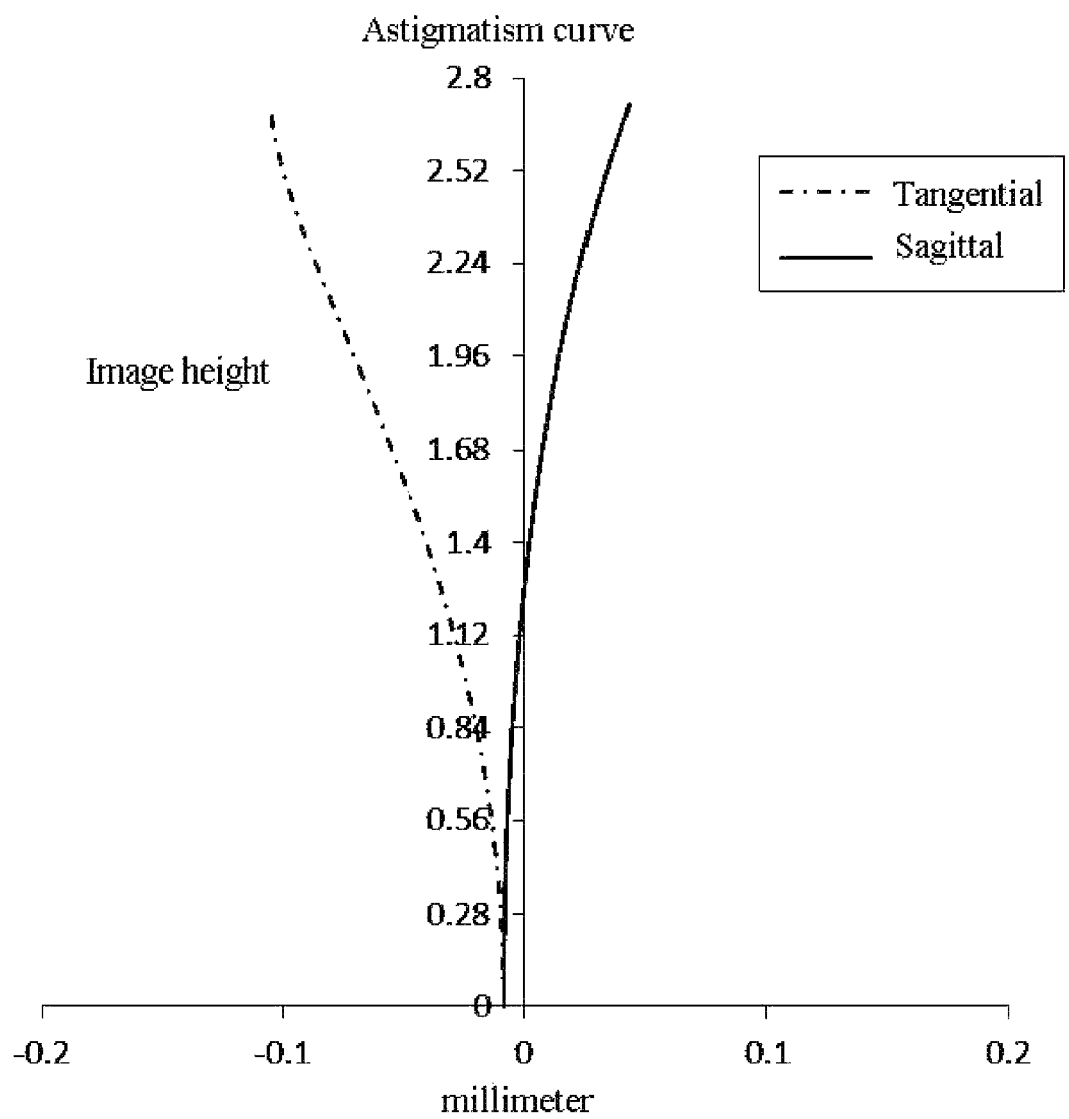
Figure 24C:
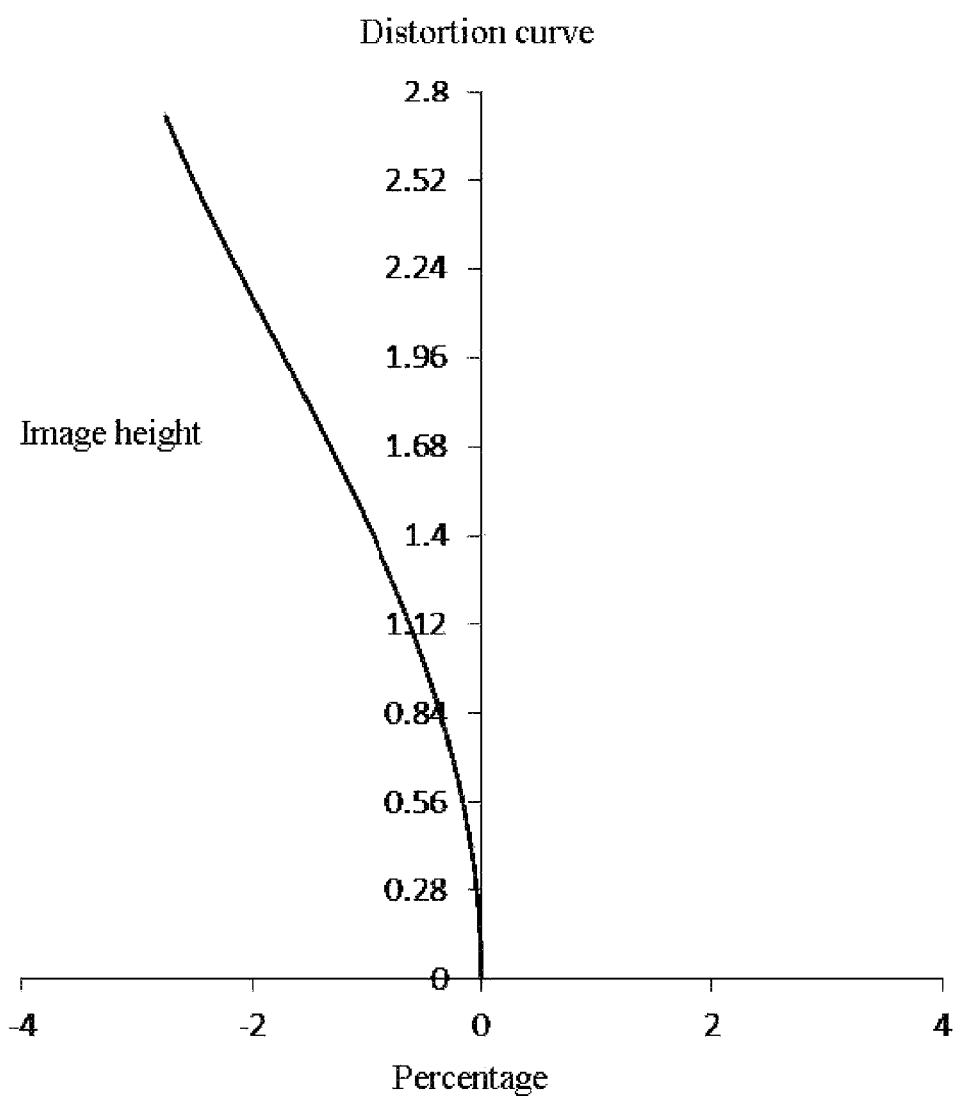
Figure 24D:
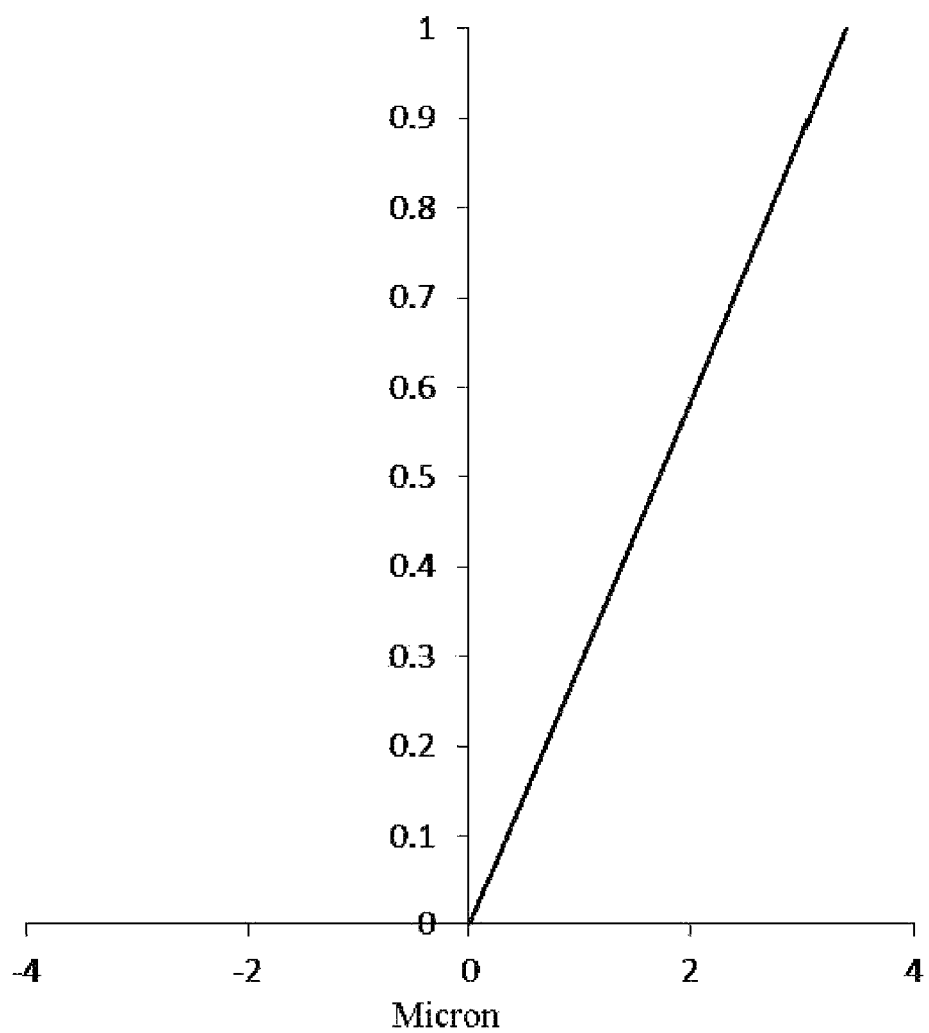

FIG. 22A, FIG. 23A and FIG. 24A show on-axis color curves of a zoom lens group in a telephoto state, an intermediate state and a wide-angle state according to embodiment 4 respectively, and represent converging focus deviations of light of different wavelengths passing through the lens. FIG. 22B, FIG. 23B and FIG. 24B show astigmatism curves of a zoom lens group in a telephoto state, an intermediate state and a wide-angle state according to embodiment 4 respectively, and represent tangential image surface curves and sagittal image surface curves. FIG. 22C, FIG. 23C and FIG. 24C show distortion curves of a zoom lens group in a telephoto state, an intermediate state and a wide-angle state according to embodiment 4 respectively, and represent distortion values corresponding to different image heights. FIG. 22D, FIG. 23D and FIG. 24D show lateral color curves of a zoom lens group in a telephoto state, an intermediate state and a wide-angle state according to embodiment 4 respectively, and represent deviations of different image heights of light passing through the lens on the imaging surface. According to FIG. 22A to FIG. 24D, it can be seen that high imaging quality of the zoom lens group provided in embodiment 4 may be achieved in each state.

From the above, embodiment 1 to embodiment 4 meet a relationship shown in Table 13 respectively.

TABLE 13

| Conditional expression | embodiment | | | |
|---|---|---|---|---|
| | 1 | 2 | 3 | 4 |
| F1/F4 | 0.78 | 0.73 | 0.85 | 0.59 |
| F2/F3 | 0.84 | 0.82 | 0.86 | 0.51 |
| FT/FW | 1.97 | 2.29 | 2.00 | 2.99 |
| (FT + FM + FW)/f11 | −0.35 | −0.30 | −0.33 | −1.25 |
| (f31 − f32)/(f21 − f22) | 0.84 | 0.90 | 0.92 | 0.62 |
| FOVT (°) | 10.4 | 11.1 | 10.4 | 10.9 |
| (R7 − R8)/(R7 + R8) | 0.48 | 0.47 | 0.48 | 0.40 |
| (CT3 + CT4)/CT1 | 0.56 | 0.51 | 0.53 | 0.58 |
| (CT1 + T12) (mm) | 10.15 | 10.60 | 10.70 | 10.55 |
| f12/R1 | 0.51 | 0.32 | 0.14 | 1.40 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned zoom lens group.

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. A zoom lens group, sequentially comprising, from an object side to an image side along an optical axis:
   a first lens group with negative refractive power, comprising a first lens and a second lens, wherein the first lens has negative refractive power, and an object-side surface thereof is a concave surface;
   a second lens group with positive refractive power, comprising a third lens and a fourth lens;
   a third lens group with positive refractive power, comprising a fifth lens and a sixth lens, wherein the fifth lens and the sixth lens are cemented to form a cemented lens; and
   a fourth lens group with negative refractive power, comprising a seventh lens, wherein
   a spacing distance of the first lens group and the second lens group on an optical axis, a spacing distance of the second lens group and the third lens group on the optical axis and a spacing distance of the third lens group and the fourth lens group on the optical axis are changed to switch the zoom lens group from a telephoto state to a wide-angle state, a center thickness CT3 of the third lens on the optical axis, a center thickness CT4 of the fourth lens on the optical axis and a center thickness CT1 of the first lens on the optical axis meet $0.4<(CT3+CT4)/CT1<0.6$.

2. The zoom lens group as claimed in claim 1, wherein an effective focal length F1 of the first lens group and an effective focal length F4 of the fourth lens group meet $0.5<F1/F4<0.9$.

3. The zoom lens group as claimed in claim 1, wherein an effective focal length F2 of the second lens group and an effective focal length F3 of the third lens group meet $0.5<F2/F3<1.0$.

4. The zoom lens group as claimed in claim 1, wherein a total effective focal length FT of the zoom lens group in the telephoto state and a total effective focal length FW of the zoom lens group in the wide-angle state meet $1.9<FT/FW<3$.

5. The zoom lens group as claimed in claim 1, wherein the total effective focal length FT of the zoom lens group in the telephoto state, a total effective focal length FM of the zoom lens group in an intermediate state in a process of switching from the telephoto state to the wide-angle state, the total effective focal length FW of the zoom lens group in the wide-angle state and an effective focal length f11 of the first lens meet $-1.3<(FT+FM+FW)/f11<-0.2$.

6. The zoom lens group as claimed in claim 1, wherein an effective focal length f31 of the fifth lens, an effective focal length f32 of the sixth lens, an effective focal length f21 of the third lens and an effective focal length f22 of the fourth lens meet $0.6<(f31-f32)/(f21-f22)<1.0$.

7. The zoom lens group as claimed in claim 1, wherein a maximum field of view FOVT of the zoom lens group in the telephoto state meets $10°<FOVT<15°$.

8. The zoom lens group as claimed in claim 1, wherein a curvature radius R7 of an object-side surface of the fourth lens and a curvature radius R8 of an image-side surface of the fourth lens meet $0.3<(R7-R8)/(R7+R8)<0.5$.

9. The zoom lens group as claimed in claim 1, wherein a center thickness CT1 of the first lens on the optical axis and a spacing distance T12 of the first lens and the second lens on the optical axis meet $9.0 \text{ mm}<CT1+T12<11.0 \text{ mm}$.

10. The zoom lens group as claimed in claim 1, wherein an effective focal length f12 of the second lens and a curvature radius R1 of the object-side surface of the first lens meet $0.1<f12/R1<1.5$.

* * * * *